United States Patent [19]

San Soucie et al.

[11] Patent Number: 5,369,778
[45] Date of Patent: Nov. 29, 1994

[54] DATA PROCESSOR THAT CUSTOMIZES PROGRAM BEHAVIOR BY USING A RESOURCE RETRIEVAL CAPABILITY

[75] Inventors: Marc San Soucie, Tyngsboro; Carolyn E. Surprenant, Dracut; Thomas Fitzgerald, Lowell; Susan Walker, Arlington, all of Mass.

[73] Assignee: Wang Laboratories, Inc., Lowell, Mass.

[21] Appl. No.: 127,981

[22] Filed: Sep. 27, 1993

Related U.S. Application Data

[63] Continuation of Ser. No. 915,775, Jul. 16, 1992, abandoned, which is a continuation of Ser. No. 88,176, Aug. 21, 1987, abandoned.

[51] Int. Cl.$^5$ ............................................. G06F 15/403
[52] U.S. Cl. ............................... 395/800; 364/419.19; 364/942.51; 364/942.3; 364/DIG 2; 395/500; 395/600
[58] Field of Search .................. 364/DIG. 1, DIG. 2, 364/419; 395/200, 275, 500, 600, 700, 800

[56] References Cited

U.S. PATENT DOCUMENTS

| | | | |
|---|---|---|---|
| 4,183,083 | 1/1980 | Chatfield | 364/200 |
| 4,266,271 | 5/1981 | Chamoff et al. | 364/200 |
| 4,394,727 | 7/1983 | Hoffman et al. | 364/200 |
| 4,394,730 | 7/1983 | Suzuki et al. | 364/200 |
| 4,481,577 | 11/1984 | Forson | 364/200 |
| 4,566,078 | 1/1986 | Crabtree | 364/419 |
| 4,584,644 | 4/1986 | Larner | 364/200 |
| 4,595,980 | 6/1986 | Innes | 364/419 |
| 4,604,686 | 8/1986 | Reiter et al. | 364/200 |
| 4,648,046 | 3/1987 | Copenhaver et al. | 395/131 |
| 4,688,195 | 8/1987 | Thompson et al. | 395/12 |
| 4,719,574 | 1/1988 | Duback et al. | 364/468 |
| 4,742,482 | 5/1988 | Inskeep et al. | 364/900 |
| 4,771,380 | 9/1988 | Kris | 364/200 |
| 4,805,134 | 2/1989 | Calo et al. | 395/600 |
| 4,870,610 | 9/1989 | Belfer | 364/900 |
| 4,933,835 | 6/1990 | Sachs et al. | 364/200 |
| 4,974,191 | 11/1990 | Amirghodsi et al. | 395/275 |

OTHER PUBLICATIONS

Inside Mcintosh vol. I, Apple Computer, pp. I-101 to I-134.
BYTE, "The Lisa Computer System" vol. 8, No. 2, Feb. 1983; pp. 33-50.
BYTE, "The Apple Macintosh Computer" vol. 9, No. 2, Feb. 1984; pp. 30-54.
Inside Macintosh, volumes I, II, and III, "The Resource Manager", 1985, pp. I-103-I-113.

*Primary Examiner*—Thomas C. Lee
*Assistant Examiner*—Maria N. Von Buhr
*Attorney, Agent, or Firm*—Kenneth L. Milik

[57] ABSTRACT

A data processing system based on an extensible set of typed data objects and a corresponding set of "object managers," each of which is a program for operating with the data stored in a corresponding type of object. The object managers in general support at least a standard set of operations. Any program can effect performance of these standard operations on objects of any type by making a particular request; in response to such a request, an object manager that is suitable for performing the requested operation on the specified type of data is identified and caused to perform the requested operation. A mechanism is provided for linking data from one object into another object. A catalog includes both information about objects and about links between objects. Data interchange services are provided for communicating data between objects of different types, using a set of standard data interchange formats. A facility is provided to permit two processes that are to cooperate in a data interchange operation to identify each other and to identify data formats they have in common. A facility is provided for managing shared data in units of data known as "resources". Customized versions of resources can be created and co-exist with standard versions of the resources. A resource retrieval function determines whether a customized or a standard resource is to be returned in response to each request for a resource.

5 Claims, 9 Drawing Sheets

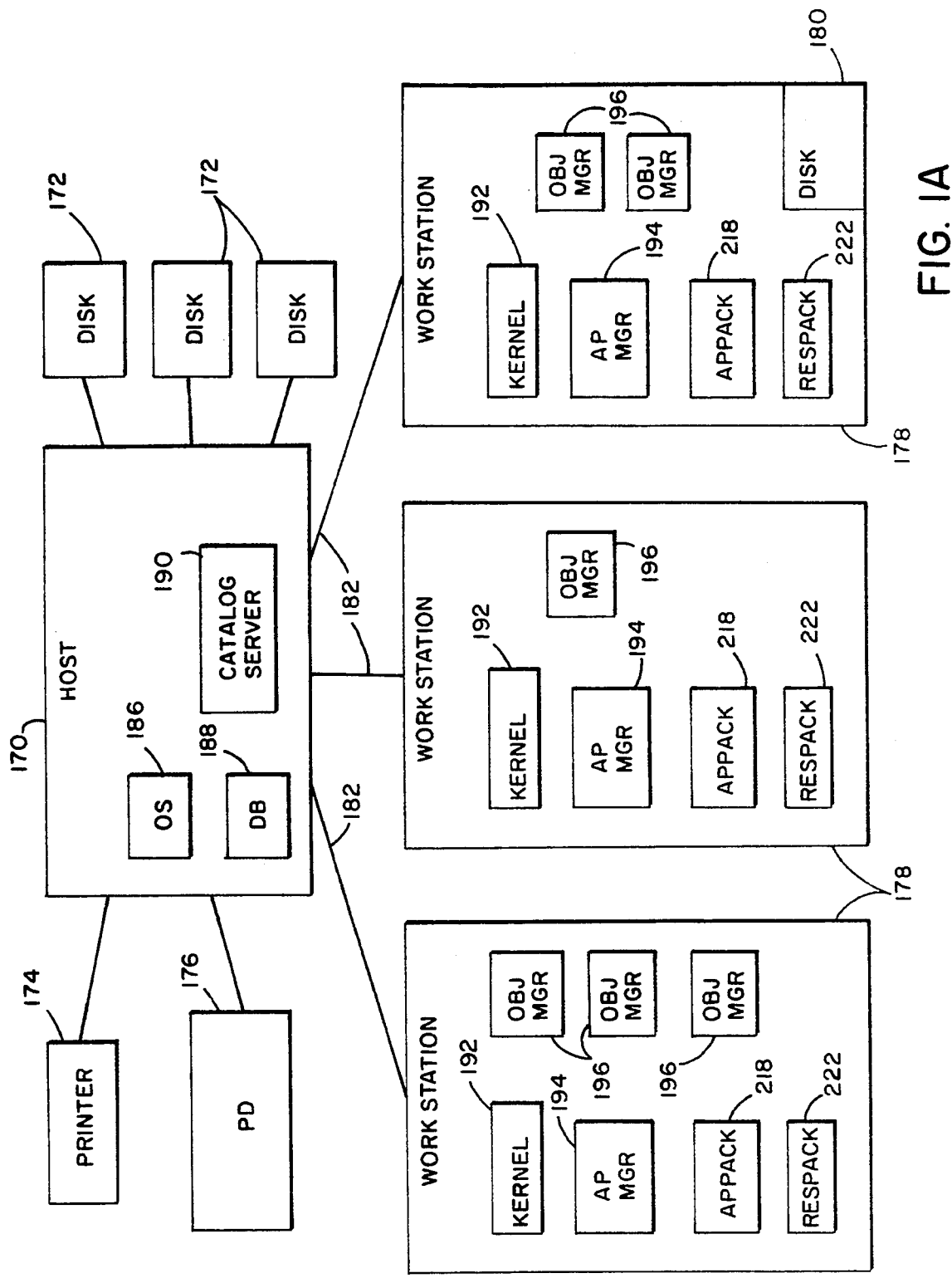

| OBJECT TABLE | | | |
|---|---|---|---|
| OBJECT IDENTIFIERS | OBJECT TYPE | OBJECT LOCATION | |
| | | | |
| | | | |
| | | | |
| | | | |
| | | | |
| | | | |
| 362 | 364 | 366 | |

FIG. 6

| LINK TABLE | | | | | |
|---|---|---|---|---|---|
| PARENT OBJECT IDENTIFIERS | LINK ID | CHILD OBJECT IDENTIFIERS | LINK TYPE | DATA LINK | COPY FLAG |
| | | | | | |
| | | | | | |
| | | | | | |
| | | | | | |
| | | | | | |
| 372 | 374 | 376 | 378 | 380 | 382 |

FIG. 7

DATA PROCESSOR THAT CUSTOMIZES PROGRAM BEHAVIOR BY USING A RESOURCE RETRIEVAL CAPABILITY

This is a continuation of copending application Ser. No. 07/915,775 filed on Jul. 16, 1992, now abandoned, which is a continuation of Ser. No. 088,176 filed on Aug. 21, 1987, now abandoned.

CROSS REFERENCE TO RELATED APPLICATIONS

The present patent application is related to a U.S. patent application to Dana Khoyi, et al., titled DATA INTEGRATION BY OBJECT MANAGEMENT, Ser. No. 088,622 filed Aug. 21, 1987, now U.S. Pat. No. 5,206,951.

FIELD OF THE INVENTION

The present invention relates to customizable computer systems, in particular, to systems with mechanisms for sharing data resources among different programs.

BACKGROUND OF THE INVENTION

There are a number of major, general problem areas which recur in data processing systems and these problem areas are growing increasingly demanding in contemporary systems as the range of types of data and information processing applications and numbers and types of users grow. These areas include, in particular, the integration of applications and data in a uniform system and environment, the ability to add new applications and data types to an existing system in a manner to integrate the new applications and data types with existing applications and data types; the ability to update applications and, in particular, the ability to translate programs and data from one language to another as business interests and data applications become international in scope; the ability of different users to share data, and in particular data in a timely form so that each user has the most recent version of a particular body of data; and the ability to transfer or exchange data from one form or data structure to another.

A user may want to include a graph in a document. One existing way to provide the ability for the user to edit the graph from within the context of the document is to augment a document editor with graph editing capabilities. This approach has the disadvantage that in order to integrate a further new type of data (e.g., a voice annotation) into documents, it is necessary to again modify the document editor. In fact, each editor must be separately extended to handle each new type of data.

While certain systems of the prior art have attempted to solve these problems, for example, by constructing object based systems wherein all data types reside in standardized data structures referred to as "objects", the systems of the prior art have generally failed to adequately solve these problems. In particular, the systems of the prior art have generally fallen into one of two classes. In the first and older class of system, there has been little constraint upon data types and applications programs with the result that, while it is easy to add new applications and data types, it is difficult to provide an integrated system and user environment and very difficult to communicate data between users and data types. In the second and more recent class of system, such as the object based systems, there has been an attempt to provide a defined system environment. This approach provides an integrated system and user environment which facilitates the ability to communicate between users and data types. A recurring problem with this class of system, however, is that the system definition itself, and the operating system type programs necessary to manage defined and object based systems inhibits the ability to add new applications and data types if they do not fit within the applications and data types initially envisioned and defined.

SUMMARY OF THE INVENTION

The system of the present invention includes a structure and mechanism for storing and executing programs which allows the programs to be customized, updated and modified, for example, translated into other languages, with minimum disruption to the program and reduced effort. In this regard, a program of any type may be regarded as being comprised of the executable code and of data which is used by the executable code but which is not itself executed. Examples of such data may include icons, language dependent text, messages, text fonts, forms, date and time and presentation formats. In the present system, a program's executable code and the program's data are separated, with the program's executable code residing in a program object or file and the program's data residing in a resource. A resource is a block of data which is used by the executable code of a program but which is not stored as a part of the program's executable code. A resource object is therefore a means for storing such program data separately and independently from the program with which it is associated. While the concept of resources is not limited to object based systems, in the present system all resources are stored in objects, as are all forms of data, and corresponding object managers are provided to operate upon the resource objects, so that the resources may be easily created and resource data easily modified.

The present invention includes a mechanism by which customized versions of resources are automatically substituted for standard resources when an appropriate customized resource exists. Programs of all types are designed to rely on the content of resources to control many different aspects of the behavior of the programs. When a customized resource is automatically substituted for a standard resource, a program using the resource behaves in a customized way. Thus, customization is made possible by using a single resource retrieval capability.

Other features, objects and advantages of the present invention will be understood by those of ordinary skill in the art after reading the following descriptions of a present implementation of the present invention, and after examining the drawing, wherein:

BRIEF DESCRIPTION OF THE DRAWING

FIGS. 1A, 1B, and 1C are diagrammatic representations of information processing systems which may incorporate the present invention;

FIG. 6 is a diagrammatic representation of an object table of the present invention;

FIG. 7 is a diagrammatic representation of a link table of the present invention;

DETAILED DESCRIPTION

Figure 1B:
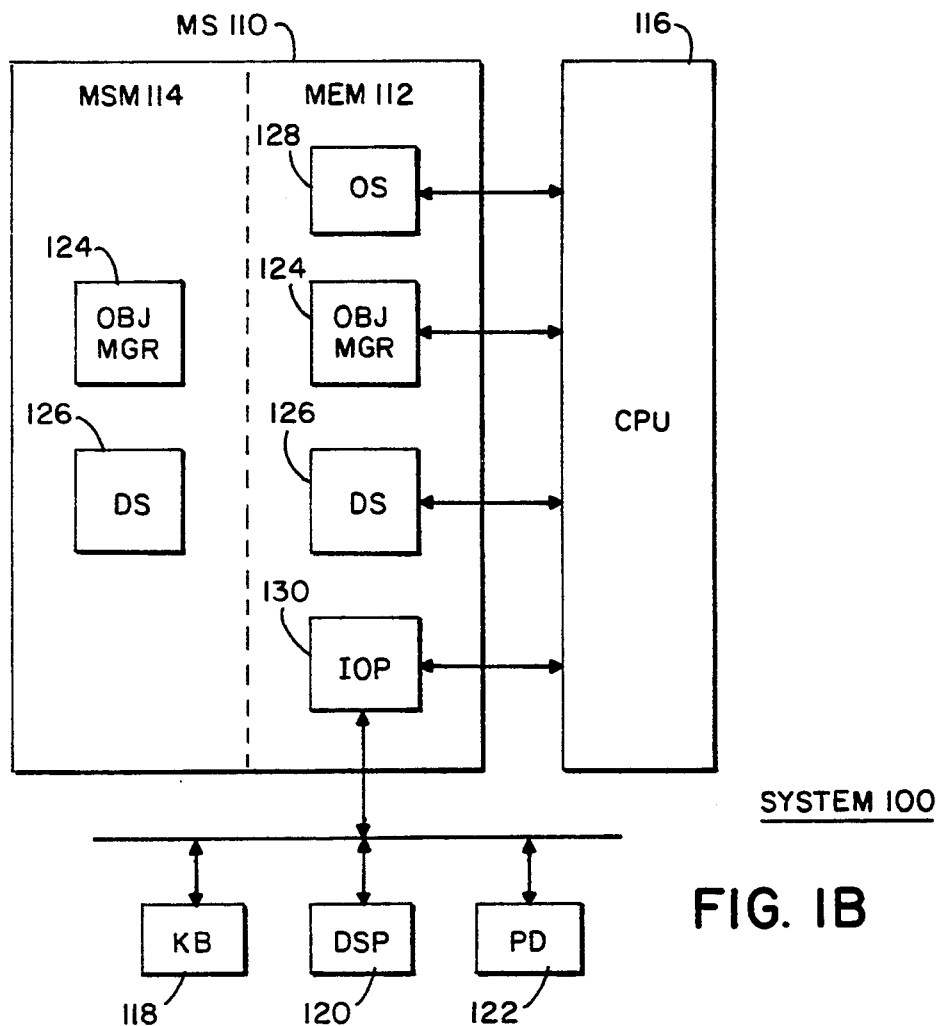

The following description presents the structure and operation of a computer system incorporating a presently preferred embodiment of the present invention.

OUTLINE OF DETAILED DESCRIPTION

1 Concepts
  1.1 Objects and Object Managers
    1.1.1 An Object Type: Folder
  1.2 Links
  1.3 Profiles
  1.4 Resources
  1.5 Operating System and Routine Packs
2 Architectural Overview
3 Objects and Files
4 Data Integration
  4.1 Appearance to User in Destination Object
  4.2 An Example Illustrating Certain Data Integration Concepts
5 Links
  5.1 Link Updating
    5.1.1 When Do Updates Occur?
    5.1.2 A Link Update Operation May Require Recursion
  5.2 Copying Data Having Embedded Links
  5.3 Link Markers
  5.4 Link Specifications
  5.5 Freezing Objects and Links
6 Physical Organization (FIGS. 1A, 1B, and 1C)
7 Some Elements of an Illustrative System
8 System Data Structures
  8.1 System Database
    8.1.1 Object Type Table
    8.1.2 Object Manager Table
    8.1.3 Object Prototype Table
    8.1.4 Customization Table
    8.1.5 Library Table
    8.1.6 Volume Table
    8.1.7 System Configuration Table
  8.2 Object Catalog
    8.2.1 Object Table
    8.2.2 Link Table
    8.2.3 File List Table
    8.2.4 Folder Table
    8.2.5 Field WIT File
    8.2.6 Object WIT File
    8.2.7 Deleted Objects Table
  8.3 Link Parallel Files
9 Object Manager Invocation
  9.1 Invocation by Direct use of the Kernel
  9.2 Startup Requests
  9.3 Invocation by APPACK
10 Object Manager Table (FIG. 3)
11 Object Prototype Table (FIG. 4)
12 Object Catalog (FIGS. 5, 6, and 7)
  12.1 Catalog Server Process
13 Links and Link Parallel Files (FIG. 8)
14 Copy, Move and Share
15 The Matchmaker
  15.1 Matchmaker Purpose and General Operation
  15.2 Matchmaker Protocols
    15.2.1 Source Protocol
    15.2.2 Place Protocol
    15.2.3 Processing UNDO after an Interobject MOVE Operation
16 Data Interchange (FIG. 9)
17 Resources
  17.1 Resource Files
  17.2 Resources (FIG. 10A)
  17.3 Resource Editor (FIG. 10B)
18 Resource Customization
  18.1 General Customization by Means of Customized Resources
  18.2 Customization IDs
19 APPACK Function Calls
  19.1 Invocation Services
    19.1.1 APrqstart()—Issue A Start Request
    19.1.2 APrqedit()—Issue An Edit Request
    19.1.3 APrqread()—Issue A Read Request
    19.1.4 APrqrun()—Issue A Run Request
    19.1.5 APrqcreate()—Issue A Create Request
    19.1.6 APrqchangelink()—Issue A Change Link Request
    19.1.7 APrqprint()—Issue A Print Request
    19.1.8 APrqupdate()—Issue A Link Update Request
    19.1.9 APrqcopy()—Copy An Object
    19.1.10 APrqdeletelink()—Delete A Link
    19.1.11 APrqrelocate()—Relocate An Object
    19.1.12 APrqimport()—Import A Foreign Object
    19.1.13 APinvoke()—Invoke An Application
  19.2 Operation Support
    19.2.1 APinit()—Initialize Application Request Processing
    19.2.2 APreply()—Reply To A Request
    19.2.3 APevinit()—Initialize APPACK Event Specification
    19.2.4 APevaction()—Set Action Code For APPACK Events
    19.2.5 APevremove()—Remove APPACK Event Specification
    19.2.6 APmsgtest()—Test An APPACK Message Event
    19.2.7 APrioinit()—Get A RIOID For An Active Operation
    19.2.8 APmsgwait()—Wait For An APPACK Message
    19.2.9 APoprequest()—Send An Operation Request
    19.2.10 APmsgrequest()—Interpret A Request Message
    19.2.11 APopfinish()—Terminate An Operation
  19.3 Matchmaker Operations
    19.3.1 APmmreserve()—Reserve The Matchmaker For An Operation
    19.3.2 APmmpost()—Post An Operation On The Matchmaker 19.3.3 APmmconnect()—Connect To Matched Application
19.4 Link Interchange
  19.4.1 LNXpinit()—Start Building Link Stream
  19.4.2 LNXprestart()—Reset Stream To Link
  19.4.3 LNXplink()—Put A Link Into The Stream
  19.4.4 LNXpnewlink()—Put A New Link Into The Stream
  19.4.5 LNXpfinish()—Finish Building Link Stream
  19.4.6 LNXginit()—Start Reading Link Stream
  19.4.7 LNXgrestart()—Reset Stream To Link
  19.4.8 LNXglink()—Get The Next Link In The Stream
  19.4.9 LNXgpeek()—Look At The Next Link In The Stream
  19.4.10 LNXgskip()—Skip The Next Link In The Stream
  19.4.11 LNXgfinish()—Finish Reading Link Stream
19.5 Text Interchange
  19.5.1 TXXpinit()—Start Building Text Stream
  19.5.2 TXXprestart()—Reset Stream To Text
  19.5.3 TXXpstring()—Put Text String Into The Stream
  19.5.4 TXXpchar()—Put Single Character Into The Stream
  19.5.5 TXXpfont()—Change Current Font
  19.5.6 TXXpattrs()—Set Text Attributes
  19.5.7 TXXpdiacritic()—Insert Diacritic Mark
  19.5.8 TXXpstrikethru()—Set Strike-Thru Character
  19.5.9 TXXpscript()—Set Script Offset
  19.5.10 TXXpvertical()—Put Vertical Move Down Command
  19.5.11 TXXphorizontal()—Put Horizontal Move Command
  19.5.12 TXXpspacing()—Put Interline Spacing Command
  19.5.13 TXXplanguage()—Put Change Language Command
  19.5.14 TXXplink()—Put A Link Into The Stream
  19.5.15 TXXpfinish()—Finish Building Text Stream
  19.5.16 TXXginit()—Start Reading Text Stream
  19.5.17 TXXgrestart()—Reset Stream To Vanilla Text
  19.5.18 TXXgnext()—Get Next Type Of Data In Input Stream
  19.5.19 TXXgstringsize()—Get Next String Length
  19.5.20 TXXgstring()—Get Text String From The Stream
  19.5.21 TXXgchar()—Get Character From The Stream
  19.5.22 TXXgfont()—Get The Current Font
  19.5.23 TXXgattrs()—Get Text Attributes
  19.5.24 TXXgdiacritic()—Get Diacritic Mark
  19.5.25 TXXgstrikethru()—Get Strike-Thru Character
  19.5.26 TXXgscript()—Get The Script Offset
  19.5.27 TXXgvertical()—Get Vertical Move Down
  19.5.28 TXXghorizontal()—Get horizontal move
  19.5.29 TXXgspacing()—Get Interline Spacing
  19.5.30 TXXglanguage()—Get Change Language Command From The Stream
  19.5.31 TXXgfinish()—Finish Reading Text Stream
19.6 Record Interchange
  19.6.1 REXpinit()—Start Building Vanilla Record Stream
  19.6.2 REXprestart()—Reset Stream to Vanilla Record
  19.6.3 REXpheader()—Build a Header Record
  19.6.4 REXprinit()—Start Record Descriptor
  19.6.5 REXpfdesc()—Build Field Descriptor
  19.6.6 REXprfini()—End Record Descriptor
  19.6.7 REXpdinit()—Start Data Record
  19.6.8 REXpdata()—Build Data Field
  19.6.9 REXpdfini()—End Data Record
  19.6.10 REXpfinish()—Finish Building Vanilla Record Stream
  19.6.11 REXginit()—Start Reading Vanilla Record Stream
  19.6.12 REXgrestart()—Reset Stream to Vanilla Record
  19.6.13 REXgtype()—Get Next Record Type
  19.6.14 REXgheader()—Get Header Record Information
  19.6.15 REXgfdesc()—Get Next Field Descriptor
  19.6.16 REXgdata()—Get Next Data Field
  19.6.17 REXgnext()—Skip to Next Record Type
  19.6.18 REXgfinish()—Finish Reading Vanilla Record Stream
20 RESPACK Function Calls
20.1 Resource File Access Functions
  20.1.1 RESfopen()—Open a Resource File
  20.1.2 RESfinit()—Open a List of Resource Files
  20.1.3 RESfclose()—Close a Resource File
20.2 Resource Access Functions
  20.2.1 RESget()—Get a Resource
  20.2.2 RESmget()—Get Multiple Resources
  20.2.3 RESpoint()—Get a Pointer to a Resource
  20.2.4 RESrelease()—Release a Resource
  20.2.5 RESread()—Read a Resource
  20.2.6 RESlookup()—Find Resource with Given Name
  20.2.7 RESgtinfo()—Get Information About Resource
20.3 Resource File Management Functions
  20.3.1 RESfcreate()—Create a Resource File
  20.3.2 RESfedit()—Modify a Resource File
  20.3.3 RESfview()—Peruse a Resource File
  20.3.4 RESfcommit()—Commit Modifications to File
  20.3.5 RESgtfinfo()—Get Information About File
  20.3.6 RESptfinfo()—Put Information About File
  20.3.7 RESavail()—Get Unused Resource ID
  20.3.8 RESgtnext()—Get Next Resource Information
  20.3.9 RESgtprev()—Get Previous Resource Information
  20.3.10 REScheckpt()—Checkpoint Resource File Updates
  20.3.11 RESrevert()—Revert to Last Checkpoint
  20.3.12 RESfreeze()—Freeze a Resource File Version
  20.3.13 RESgtfver()—Get Resource File Version Number
  20.3.14 RESptfver()—Put Resource File Version Number
20.4 Resource Editing Functions
  20.4.1 RESrdcur()—Read Current Version of Resource
  20.4.2 RESgtcur()—Get Current Resource Information 20.4.3 REScreate()—Create a Resource
20.4.4 RESwrite()—Write a Resource
20.4.5 RESrewrite()—Overwrite a Resource
20.4.6 RESptinfo()—Put Information About Resource
20.4.7 RESmove()—Move Resource to New Location
20.4.8 RESptnum()—Renumber a Resource
20.4.9 RESmerge()—Merge a Resource List into a File
20.4.10 RESdelete()—Delete a Resource 20.5 Resource Index Function
20.5.1 RESixinit()—Start Building a Resource Index
20.5.2 RESixprep()—Begin Modifying an Existing Index
20.5.3 RESixadd()—Add a Resource Index Entry
20.5.4 RESixdelete()—Delete a Resource Index Entry
20.5.5 RESixfini()—Finish Building a Resource Index
20.5.6 RESixlookup()—Look up a Resource Index Entry
20.5.7 RESixulookup()—Look up a USHORT Entry
20.5.8 RESixllookup()—Look up a ULONG Entry
20.5.9 RESixslookup()—Look up a String Entry
20.5.10 RESixufind()—Find a USHORT Entry
20.5.11 RESixlfind()—Find a ULONG Entry
20.5.12 RESixsfind()—Find a String Entry
20.5.13 RESixget()—Get an Entry in a Resource Index
20.5.14 RESixindex()—Get an Entry in a Resource Index
20.5.15 RESixinfo()—Get Info on a Resource Index 20.6 Batch Style Resource Creation Functions
20.6.1 REScrcreate()—Create a Batch Style Resource File
20.6.2 REScadd()—Add a Resource to a Resource File
20.6.3 REScclose()—Finish Resource File Building 20.7 User Profile Support Functions
20.7.1 RESptcustid()—Set Customization ID
20.7.2 RESsupedit()—Edit Resources in a Profile

1 CONCEPTS

1.1 Objects and Object Managers

The system of the present invention is a member of the general class of systems described as "object based". That is, information is stored in structures referred to as "objects". In the implementation of the present preferred embodiment most objects each correspond to one or more files of a conventional computer file system.

Further with regard to objects, the system of the present invention allows the use of an essentially unlimited variety of object "types", including the type previously described as a folder, wherein there may be a type of object for each form of data or information or operation to be performed by the system. That is, the system of the present invention defines only the minimal interface between an object and the system and does not define the internal structure or form of any object. As such, an object within the system of the present invention may be regarded as a general purpose container for data, programs or other information, with the internal structure or form of a particular object being defined by the requirements of the operation to be performed or the type of data or information to be stored therein.

Programs for operating upon objects are known as "object managers" or are sometimes referred to as "editors", "applications programs", or "applications". The term "application" is also used to refer to a collection of object managers that operate on a single object type. Each type of object has associated with it at least one object manager that is designed or intended as the primary means for operating upon the data or information stored in that type of object. For example, the system may support a "document type" object for word processing and there will be a word processing object manager associated with that object type. Similarly, a "data base type" object will have associated with it a data base object manager, which is the primary means for operating upon or with the data stored in the data base type object.

It should be noted, however, that the object managers for operating with a particular type of object are not limited to the primary object manager for that object type. Moreover, the particular object manager invoked to operate upon a particular object may depend upon the type of operation to be performed. The system of the present invention provides for a plurality of object managers to operate with any given object type and certain object managers, for example, certain utilities, may operate with more than one type of object. The primary object manager is simply the object manager which is invoked by default for operations upon a particular object type if the user does not select a different program.

Although typically an object manager will operate on the data of a single type of object, in certain cases it may be desirable to arrange a program to be an object manager for more than one object type. Further, there are various utility programs that perform operations that do not interpret object data (e.g. file copy) and that therefore can be used with various types of objects.

1.1.1 An Object Type: Folder

Folders are used as an organizational tool. Folder-type objects are used primarily for the links they contain. For example, a group of objects can be logically associated together by all being linked to a single folder object. Like any object, a folder can itself be linked into a folder. Associated with each folder is a file, which can contain information such as a user's comments about the purpose of the folder, instructions on what to do with the objects in the folder, etc. Often there will be no such data, as a typical folder's significance is only the list of objects linked to it; in this case, essentially all there is to the folder is its entries in the object catalog, primarily the entries in the Link Table.

Folders need no link markers because the links are not embedded in any data. Order among the links in a folder is determined not by the sequence in which link markers are embedded, but by the values of the Link IDs stored in the Link Table.

A Folder does not link any data from the objects to which it has links (i.e., a folder needs no link parallel file). Folders just use links to represent relationships among whole objects.

Each user of the system has a primary folder. This is the primary means by which a user gains access to resources of the system. There is a primary system folder, which is typically linked into each user's primary folder, giving each user access to certain common system resources. Further, all of the user primary folders are linked into the system folder.

1.2 Links

While information in the system is primarily contained within objects, objects, in turn, are related to one another through a mechanism referred to as "links". A link may be conceptually viewed as a means by which one object, referred to as a "child" object, is "connected" to another object, referred to as the "parent" object. Each object is, in some sense, a child object in that each object always has at least one link to it and is connected through that link to at least one parent object. In this regard, and as will be described in the following, each user has at least one primary parent object to which all other objects associated with that user are directly or indirectly linked. The terms "parent" and "child" refer to the direction of a link, are not meant to imply any hierarchy among linked objects.

It should be noted that, as described in the following descriptions, a link may also be used to link a portion of a child object to a parent object, as well as an entire child object. In addition, any number of objects, or portions of objects, may be chained together through links, and the sequence and direction of links is not hierarchically limited.

1.3 Profiles

A profile is user-visible information about something, such as a system, object, or link. The information included in an object profile depends on the object type. For a document-type object, the object profile includes some of the information stored in the Object Table along with information stored in the object itself, such as a font list, global format information, and printing parameters.

1.4 Resources

A "resource" is data that is used by a program but which is not stored as a part of the program's executable code. Examples of such data include icons, language dependent text, messages, text fonts, forms, date and time and presentation formats. A resource is therefore a means for storing such program data separately and independently from the program with which it is associated.

The placing of program data in resources allows the information therein to be customized or changed without affecting the program's executable code. English, French and German language versions of word processing, data base and spreadsheet programs, for example, may be generated by simply providing English, French and German language versions of the corresponding resources. In each version of the programs only the program data residing in the associated resource is changed, the executable code of the programs remain unchanged. In addition, the use of resources allows object managers and other programs to share common program data, thereby reducing the sizes and memory requirements of the individual object managers and other programs.

Storing data in resources also makes possible easy customization for individual users of the appearance and operation of programs. A user-specific customized version of a resource can be stored in the user's user profile. A mechanism is provided by which any customized resources present in a user profile are automatically substituted for their standard counterparts automatically (and invisibly to the program using the resource) when needed by a program.

1.5 Operating System and Routine Packs

Computer systems typically include a group of programs which are referred to as an operating system. An operating system may be viewed as a collection of programs which control and facilitate the overall operation of a system and which provide selected, fundamental, general services and operations for users of the system. Examples of such operating system services and operations include process management, event management, memory management, input/output operations, logical to physical address translations, graphics/text and display operations, file access and management operations, and mathematical operations.

In the traditional view of operating systems, all functions and operations which are not specific, particular or unique to a particular application program are to be performed by the operating system. In addition, the traditional view regards the operating system as a tightly integrated and mutually dependent group of programs and the operating system is generally designed as a unitary structure of programs in which the designer attempts to anticipate all functions which may be desired, presently and in the future, by the applications programmers. Because of the relatively monolithic nature and complexity of an operating system and the resulting interrelationships of the programs comprising an operating system, it is therefore relatively difficult to modify, change, update or add features to an operating system.

The operating system of the present invention differs from the traditional operating system in that, firstly, the actual functions and services performed by the operating system are reduced to the minimum. As will be described in the following, the operating system of the present system essentially performs only the process, event and memory management functions and logical to physical address translations.

Secondly, other functions and services which would normally be performed by an operating system, together with many functions and operations which would normally be performed by the application programs themselves, are performed by libraries of routines. These libraries of routines, referred to herein as "packs", exist independently of both the operating system and the application programs. As will be described in the following descriptions, the routines contained within the packs are comprised of short, generic, single purpose routines designed to be of wide general applicability and usefulness for both operating systems services and application program support functions. Examples of services and functions performed by pack routines include, but are not limited to, input/output operations, graphics/text and display operations, file access and management operations, and mathematical operations.

As will also be described, each pack contains a set of routines or functions which are related by the type of operation they perform or the type of object they operate upon. In addition, all routines of a given pack are provided with a uniform interface, or calling and return sequences, and the packs are required to conform to a uniform format, in particular with regard to pack header files and control blocks, that is, blocks of information regarding the objects controlled by the packs.

The use of packs of routines for many operating system type services and functions and for many operations normally provided within application programs greatly enhances the flexibility of the system architecture and configuration. Functions and services may be added or altered easily and quickly and without disturbing or otherwise impacting other functions of the system. In addition, the use of packs reduces the size and complexity of application programs in that many operations or functions normally incorporated into each individual application program may now be shared by many application programs. Also, the use of routine packs with standardized interfaces facilitates integration of different applications in that many operations and interfaces to the system, the user, and other application programs are defined by and conform to the defined, standardized routine pack interfaces.

In the preferred embodiment, these routines are stored in a shared subroutine library are dynamically linked as needed at runtime. In some cases, it may be desirable to include copies of routines from pack libraries in the executable code of a program; however, this approach increases the physical size of application programs.

When reference is made in the following discussion to a routine performing some function, it should be understood that the routine may accomplish this directly itself, or by making a system call, or by a series of inter-process communications with another process. For example, the APPACK routine APinvoke() accomplishes the invocation of an object manager by communicating with the application manager process which ultimately makes a system call that results in invocation of an object manager.

2 ARCHITECTURAL OVERVIEW

The present invention involves the manipulation of typed objects. Different objects are designed to represent different forms of information, such as the following. Document objects represent text and associated formatting information. Spreadsheet objects represent mathematical modeling information. Voice objects represent sound. Image objects represent photograph-type pictures.

For each type of object there is one or more "object manager" that can operate on objects of that type. Object managers roughly correspond to applications programs. For example, there may be spreadsheet program: this can be understood to be an "application", as distinguished from operating system program; it can also be understood to be a "manager" or "editor" of objects of type "spreadsheet".

Because it is an object's object manager(s) that define its structure and interpretation, the collection of object types is open-ended; existing types of information can be integrated with future types of information with the same each with which the existing types are integrated with each other. A new object type can be added to the system by adding a program (i.e., an object manager) that can manipulate objects of the new type. The ability to manipulate the new type of object need only be implemented once. Having added the new object manager, objects of the new type can be linked into, exchange data with, and otherwise appear integrated with objects of pre-existing types without modification to pre-existing object managers.

A convention that facilitates the open-ended integration is that for each object type there shall be an object manager that will support all of a standard set of requests. Further, these requests are communicated between object managers by a single standard protocol that is application-independent. Absolute adherence to this convention is not required. However, as the number of exceptions increases, the benefit obtained from this approach to data integration decreases.

If cases arise where the standard requests and protocols do not provide an adequate degree of integration, private requests and protocols can be defined to coexist with the standard set. Thus, this open-ended approach defines only the minimum level of integration, without precluding tighter coupling where appropriate. An example of a case where private protocols may be appropriate is communication between a spreadsheet application and a graphing application.

There is a set of Application Integration Services that are available to all the object managers. These services do not embody any "knowledge" of any particular types of objects. Rather, the service are used by the object managers to coordinate their manipulation of the various types of objects. In particular, these services facilitate bringing to bear an object manager embodying the appropriate object type specific "knowledge".

Application Integration Services are so-named because they are a mechanism by which an individual application (i.e., object manager) can appear to a user to integrate its operation and manipulation of data with that of other applications. To a user, the display of a page of a newsletter having both text and a picture indicates that the picture and text are integrated together in a single entity known to the user as a document. According to the present invention, this effect is accomplished by operation of two different object managers as coordinated by use of the Application Integration Services. The newsletter is stored in an object of type document, which is a type of object designed to store text and associated formatting information. The particular document object of this example includes a link to a separate object of type "image", an object designed to store photograph-type pictures. The display of the page is accomplished by a document object manager retrieving and displaying the text and an image object manager retrieving and displaying the picture. The information describing the link to the picture and the operation required (display) is communicated from the document object manager to the image object manager with the assistance of the Application Integration Services.

The computer system of the present illustrative embodiment includes the ability to run a plurality of programs effectively concurrently. This is known as multitasking or multiprocessing, and each of the concurrently executing programs is known as a task or process.

In the present system there is an Application Manager process. The Application Manager spawns the object manager processes. Thus, in general, the object managers are peers with each other and are children of the Application Manager.

The Application Integration Services services are provided in part by means of the Application Manager process and in part by a set of common subroutines or functions. There is a set of function calls available to be incorporated into the body of the source code of an object manager. This set of functions is known as APPACK. The APPACK function calls is the mechanism by which object managers avail themselves of the services of the Application Manager. In general, the AP- PACK functions send interprocess messages to and receive interprocess messages from the Application Manager process. The APPACK functions themselves may be called from a shared subroutine library or may be incorporated directly into the executable body of object managers at program link time.

The services provided by APPACK can be grouped into the following categories: invocation, data interchange, matchmaking, object management, and link management.

Among the most powerful of the Application Integration Services are the "invocation" services. The most general mechanism through which these services can be obtained is the APPACK function known as APinvoke(), which is described in greater detail below. Other APPACK functions are also available to cause invocation for specific purposes (e.g., APrqprint() to print data from an object, APrqupdate() to update data across a link).

The invocation services enables any object manager to specify some data (e.g., by means of a link specification) and an operation to be performed regarding that data and cause an appropriate object manager to be identified and invoked with the result that the desired operation is performed without the invoking object manager being in any way designed to handle that particular type of data. For example, a document object manager can cause a picture to be displayed or a voice message to be played, each with equal ease and without being designed to manipulate either image or audio data.

In addition to playing role in conducting standard protocols, the invocation services can also be used to establish communication between two object managers that will subsequently communicate according to a private protocol.

The data interchange services provide standard representations for common data types, for the purpose of transferring data between two object managers which may not share similar internal representations for the data. These services mask both the form of the data and the means of transfer, so that programs that use them need be concerned only with the semantic content of the data.

The matchmaking services are used to set up user-directed data transfers (operations that are completed using the data interchange services). These services facilitate negotiation between the source and the recipient of a data transfer.

Use of the object management services and the link management services is required for those object managers that take advantage of the system's object and link capabilities. The object management services define standards for object access, naming, and manipulation. The link management services enable an object manager to maintain links to objects of types about which the object manager has no direct "knowledge".

3 OBJECTS AND FILES

In the present system, for most object types each object is stored in a separate file (possibly more than one file). This is not a necessary requirement however. An advantage of implementing objects as files is that certain object operations can be easily done directly by the Application Integration Services (e.g., create object, copy object).

In the present system there is a limited form of inheritance. Certain object management operations that can be performed on file-based objects are supported directly by APPACK: create object, copy object, rename object, delete object, and freeze object. When one of these operations is requested on a file-based object, APPACK will perform the operation unless the Object Manager Table indicates that an object manager for that object will perform the operation, in which case the object manager is invoked and the operation request passed to it. As APPACK can only perform these operations for file-based objects, these operations cannot be inherited by non-file-based objects.

More general inheritance could be implemented by which each object type could identify another type as its parent. In such situation, operations not specifically defined for the child type could be performed on objects of the child type by an object manager of the parent type. This would have the advantage of facilitating creation of new object types. On the other hand, the system without generalized inheritance is lends itself to simpler, higher performance system.

4 DATA INTEGRATION

In understanding the advantages of the present invention for improved data integration, it is useful to understand the distinctions among a variety of closely related concepts. For example, a user can make existing data (that is all or a portion of a "source" object) appear in a new place (in a "destination" object, which may have previously existed or may be created solely to receive the data) by means of "copy", "move", or "share" operations; each of these operations has differences from the other two. Further, a copy or move operation may be accomplished such that the copied or moved data is either "internalized" or "encapsulated" at its destination (a distinction that is hidden from the user by the object manager responsible for the destination object).

"Sharing" of data to a destination object means that the data will appear to be in the destination object, but this will be accomplished by a link to the shared data; the shared data will not actually be stored within the destination. Further, the link will refer to the same data to which other links may already refer; in other words the same stored data is "shared". The effect of sharing is that when each link to the shared data is updated (the timing of which depends on link update flag value discussed elsewhere) it will manifest the alteration.

"Copying" differs from sharing in that storage of the copied data and the storage of the original data are distinct, so that either may be altered without affecting the other. In other words, a new copy of the actual data is made. Further, the copied data may be treated in two different ways: it may be "internalized" in the destination object or it may be "encapsulated" by the destination object. If the copied data is of a type that can be stored in the destination object, then the copied data will be internalized in the destination object, meaning that the data will be stored directly in the destination object's data structure; the internalized data becomes indistinguishable from any other data stored in the object. If the copied data is of a type that cannot be stored in the destination object, then a new object of a type that can store the data will be created, and a link to this new object will be added to the destination object; in this case (encapsulation), the destination object indirectly contains the copied data.

Each application must respond to a request to encapsulate data. The simplest way to respond is to make a copy of the entire object containing the data and provide a link specification referring to that newly created object. This simple approach will be inefficient where the data to be encapsulated is a very small fraction of the entire object. Thus, each application should be designed to respond to a request to encapsulate data by duplicating as little data as possible; in other words, if possible the application should copy less than the entire object, and preferably only the desired data. Because the chart application can only create the complete chart, encapsulating a chart requires a copy of the entire chart object even if only a corner of the chart is desired. On the other extreme, the document object manager can extract nearly just what is needed. The illustration object manager is yet a different case: it will not copy illustration elements that fall entirely outside the desired region, it will copy those elements that even in part fall within the desired region without clipping those elements to the size of the desired region; thus portions of the illustration outside the desired region will be represented in the encapsulated data.

"Moving" is like copying, except that the original data is deleted. If the destination of a move is only able to accept the data with significant data loss (e.g., where the destination does not support links), then the user should be so warned and given an opportunity to abort the move operation.

4.1 Appearance to User in Destination Object

The above discussion has focused on how a destination object will internally represent the presence of shared, copied, or moved data. A somewhat separate issue is how that data will be presented to the user. Once data has been internalized, it is no different from other data stored in the destination object; its appearance to the user need be no different and it can be edited along with the other data in the object. Data that is of a type that can be handled by the destination object but that is, nonetheless, linked (i.e. because it is shared) can be presented to the user in a manner indistinguishable from the data actually stored in the destination object; however, it is desirable to make it visually distinguishable in some way, because it cannot be edited in precisely the same way as the data that is directly stored in the object. Data that is linked (whether or not it is of a type foreign to the object into which it is linked) is edited by separately invoking an edit operation on the linked data.

Some data that is linked is of sufficiently different type that it cannot interact with the native data, but can still visually appear along with the native data (in order to create the display of the foreign data, the object manager of the destination object would, via APPACK, invoke an object manager capable of displaying such data); this is known as "isolated" data. There are situations where data isolation is used even when the isolated data is the same type as other data in the object; for example, a caption associated with a picture in a document may simple appear in a fixed location, not subject to modification, not subject to being formatted with the other text in the document; thus, the caption can effectively be treated as an image, rather than text.

If isolation is not possible, then the minimal form of integrated presentation is "display by icon", in which an icon representing the presence of linked data is displayed in an appropriate location in the display of the destination object. All applications that support link to other objects should at least support display by icon. When the link does not indicate data exchange (i.e., the link does not include a link specification) display by icon is the best that the linking application can do. Thus, folder objects never appear to a user as other than icons.

4.2 An Example Illustrating Certain Data Integration Concepts

The following example illustrates some of the above-discussed data integration concepts.

A first document includes a chart; this is accomplished by the document object containing a link to an object suitable for storing a chart. A user creates a second document. The user selects the chart in the first document (e.g., by moving a mouse and clicking associated buttons) and then presses a "share" key (or by some other means invokes a share command). The user then points to the location in the second document where the chart is to appear and then presses a "place" key (or by some other means invokes a place command). The chart will then appear in the second document. The user then, from within the second document, selects the chart and presses and edit key, invoking the chart object manager. The user makes changes in the chart. The user then re-opens the first document and views the chart, which includes the changes the user just made from within the second document. In this example, there is one copy of the chart itself; the share operation resulted in creation in the second document of a copy of the link to the chart so that there are two links to a single chart.

Continuing the example further, the user desires to use in the second document some paragraph of text similar to that in the first document. The user points to the place in the second document where this text is to appear and presses the place key. (Note the destination operation (place) and the source operation (copy, move, or share) can be invoked in either order.) The user then goes to the first document, selects the paragraph of text, and presses the copy key. The user then returns to the second document and observes that the paragraph now appears at the desired location. The user edits that paragraph. The user later returns to the first document and observes that the original text is unchanged—i.e., the editing of the copied text in the second document resulted in no change to the original text in the first document.

Continuing the example still further, the user desires to incorporate in the second document a picture existing in the first document; the use wishes to do this such that like the above-described text and unlike the above-described chart each of the appearances of the picture can be changed without changing the picture in the other document. The user accomplishes this by selecting the picture in the first document, pressing the copy key, pointing to the desired location in the second document, and pressing the place key. This results in creation of a copy of the picture object that contains the picture and creation in the second document of a link to this newly created picture object.

Continuing the example one step further, the user wants a sentence of text in the first document to always appear in identical form in the second document, with any changes made in the sentence appearing in both documents. The user accomplishes this by selecting the desired sentence, pressing the share key, pointing to a location in the second document, and pressing the place key. A link is created in the second document that includes a link specification that identifies the object storing the first document and identifies (in a way that can be understood by a document object manager) the sentence of text that was selected.

The distinction between "internalization" and "encapsulation" of data can be illustrated with reference to the above example. Because a document object is designed to store text, the paragraph of text that was copied to the second document is internalized in the document object that stored the second document. This means that the copied text is stored directly with other text stored in that second document. In contrast, the picture copied to the second document is encapsulated, this is because the destination object (a document object) is not capable of directly storing picture data. Because the chart and the sentence are each shared (rather than copied), they are each encapsulated in the second document (rather than internalized).

When an object internalizes data, this data becomes indistinguishable from data already existing in the object; the internalized data can be edited and otherwise manipulated directly along with the pre-existing data. In order to edit encapsulated data, the user must select the encapsulated data and issue an edit command thereby invoking an object manager capable of handling objects of the type in which the encapsulated data is stored; because of this difference, encapsulated data will typically be visually marked for the user (e.g., delimited by a box or displayed with a characteristic attribute).

In the above example, the user will not necessarily be aware that the picture data is stored separately from the text data; however, the user will observe that editing the picture requires an extra operation that results in opening of a new window.

Another point that is illustrated by the above example is that one can perform these data integration operations on all or a portion of an object. As discussed above, when an object is "copied" and that data is "encapsulated", a new object is created to store that data and a link to the new object is created in the destination object. In the case where the data selected by the user to be copied is only a portion of an object, the newly created object may contain (1) a copy of the entire original object, (2) only the desired portion, or (3) more than selected but less than the entirety; the amount of data in any particular case will depend on the type of object and possibly the relationship between the selected an non-selected portions. In cases where the new object contains more than the selected data, the link specification will identify the selected portion.

5 LINKS

5.1 Link Updating

5.1.1 When Do Updates Occur?

Linking makes data from a child object appear in a parent object. Conceptually, wherever the linked data in the child is modified, that modification should be manifested in the parent. Implementations that achieve linking in a straightforward manner can make heavy performance demands on a system.

The present system uses link parallel files and a variety of alternative link Update States to reduce the load linking places on the system while achieving for the user the benefits of linking. A link parallel file is a convenient repository for the parent object to store a easily accessible copy of linked data. If this copy was continuously effected, then the parent would always reflect exactly the data in the child object. However, as a practical matter the same result can be achieved if the copy in the link parallel file is updated only at certain important times, for example whenever the data in the child is changed or whenever an operation is to be performed on the parent. Each link has an associated Update State that can be selected to match the situation of that link. Update State is a field in entries in Link Parallel Files, discussed elsewhere in this Detailed Description. The presently defined values for Update State are Manual, First Time, and Dynamic. Generally no changes will occur in the children during the time the user is viewing the parent; thus, most links only need be updated once each time the user works on the parent object, i.e., Update State of "First Time". If a user wishes to view a document with numbers linked from a spreadsheet at the same time the user is working on the spreadsheet and the user wants to see the document always reflect the current spreadsheet values, then the Update State of that link should be set to be "Dynamic", which will result in update operations each time the spreadsheet is modified.

5.1.2 A Link Update Operation May Require Recursion

A link update operation may require recursion. Embedded in the data involved in a link update be a further link. Depending on the state of the update state flag in this further link, it may be necessary to perform an update operation on this further link in order to complete the original update operation. The data referenced by the further link may itself include an embedded link. Thus, completion of a link update operation may involve completion of nested update operations to whatever depth is indicated by links.

As links and objects are not limited to being organized in a hierarchy, it is possible for a series of links to form a dependency loop. A simple example is where a first object contains a first link referencing a portion of a second object that includes a second link referencing a portion of the first object containing the first link. The present system detects that an update operation is circular and issues an error; the alternatives include cycling just once, cycling until the data stabilizes (which may never happen), or cycling perpetually.

5.2 Copying Data Having Embedded Links

When copying an object that itself includes links to other objects, the question arises as to how to treat this referenced data: either the link or the data itself can be copied. The user may desire different results in different situations, as illustrated by the following examples.

In the present system, there is a "Copy Flag" associated with each link. The value of the Copy Flag determines how the link is treated when the object containing the link is copied. When a link is created, the initial value of its Copy Flag is set according to a default rule, unless the user or the application creating the link specified otherwise. The result is such that copy operations often achieve the result expected by the user. The default rule for setting the Copy Flag is the following: if the linked object is created from within the object containing the link, then the Copy Flag is set such that the linked data will be copied; otherwise, the Copy Flag is set such that the link (not the linked data) will be copied.

5.3 Link Markers

Link Markers are included in the body of an object's data to indicate the presence of linked data. As an object's data is stored in a format that is typically unique to that object type (a format that need only be "known" to the object's object managers), the format of a link marker is also application dependent. A link marker must at least enable the application reading the object data to determine the value of the Link ID. The Link ID enables further information about the link to be retrieved from the Link Table.

An application designer may choose to include the Object Type of the child object in the Link Marker. This may enhance performance by eliminating a search of the Object Table (by Application Integration Services to retrieve the type information, which is needed to identify the child object's object manager) prior to calling the child object's object manager.

A Link Marker format should be designed so that when data in the object containing the Link Marker is modified, the location of the Link Marker relative to the remaining data corresponds as closely as possible to the user's expectations. Consider the following two implementations: (1) a table of Link IDs with byte counts indicating where in the data file the link was logically located; (2) an escape sequence followed by a Link ID embedded at the relevant location in the data. Links identified with markers according to the first example would appear to move when data preceding the Link Marker is added or deleted. At least for documents, the second alternative would correspond more closely with a user's expectations.

Note that as is illustrated by the first implementation suggested in the previous paragraph, a link marker need not by physically stored at the location in the parent's data where the linked data is to appear.

5.4 Link Specifications

For every link across which data can pass there is a link specification. Links to folder objects never contain link specifications; link specifications are not needed because folders are objects that are used to create organizations of objects and folders do not themselves contain any substantive data.

A link specification can indicate that the linked data is the entirety of the linked object, or it can identify a specific portion. The interpretation of a link specification is done by the linked object's object manager—i.e., link specifications are application specific. It is desirable to design link specification implementations such that the interpretation of a link specification after the linked object has been modified corresponds as much as possible to a user's expectations. The following ways of implementing link specifications illustrate this point.

The link specification for a data base object is a query specification. This type of link specification achieves particularly well the desired result of matching a user's expectations.

The link specification for an illustration is of the form: page 3, starting 1 inch down and 2 inches across, use the rectangular portion 2 inches long and 3 inches across. This specifies a window into a certain page of the illustration. A result of the picture on that page being shifted is that different data will specified in the link.

The link specification for a spreadsheet is a range of cells, specified either in absolute coordinates or as a named range. Changes to the spreadsheet will affect which of the cells are specified by the link specification in a manner that will be readily understood by a spreadsheet user (e.g., when absolute coordinates are used, the set of specified cells will change when a column to the left of the range is deleted).

The link specification for document objects takes a significantly different approach. When a portion of a document is selected to be linked: the selected portion of the document is removed from its present location and placed on a "shelf" within the document; at the location where that portion previously resided is placed a reference to the newly created shelf; the link specification identifies this shelf. The document editor treats material on a shelf somewhat like a linked material: the material on the shelf is displayed in the document at the appropriate location, but the material on the shelf cannot be edited without specifically invoking an edit operation on that shelf. Thus the user will easily understand how changes to the document will be manifested in another object that is sharing some of the document's text: changes outside the shelf will have no effect, and changes on the shelf will be directly change data as seen across the link.

5.5 Freezing Objects and Links

Objects can be frozen. An object that has been frozen can never be modified; the convention on the present system is that once an object is marked as frozen, it will not never again be marked as not frozen. A copy may be made of a frozen object and the copy may be modified. An object is identified as frozen by setting the "frozen" flag in that object's record in the object catalog.

Links can be frozen: this is done by setting the link Update State to Manual. The data produced by a link with a Manual Update State will remain constant until the next time a request is made for the link to be updated with new data. When a link's Update State is Manual the data associated with the link will be a copy that is stored in the destination object's link parallel file; this data will remain unchanged until such time as an user requests an update operation, at which time a new copy of the data will be made. At the time a link's Update State is set to Manual, an update operation is performed, assuring that there is data in the Link Parallel file.

A frozen link to an object does not affect the modifiability of that object. It only freezes the view of that object seen through that particular link: the data comprising that view is stored in a link parallel file (associated with the destination object, i.e. the object containing the link); the object to which the link is made (the source object) can still be modified.

6 PHYSICAL ORGANIZATION (FIGS. 1A, 1B AND 1C)

Figure 1C:
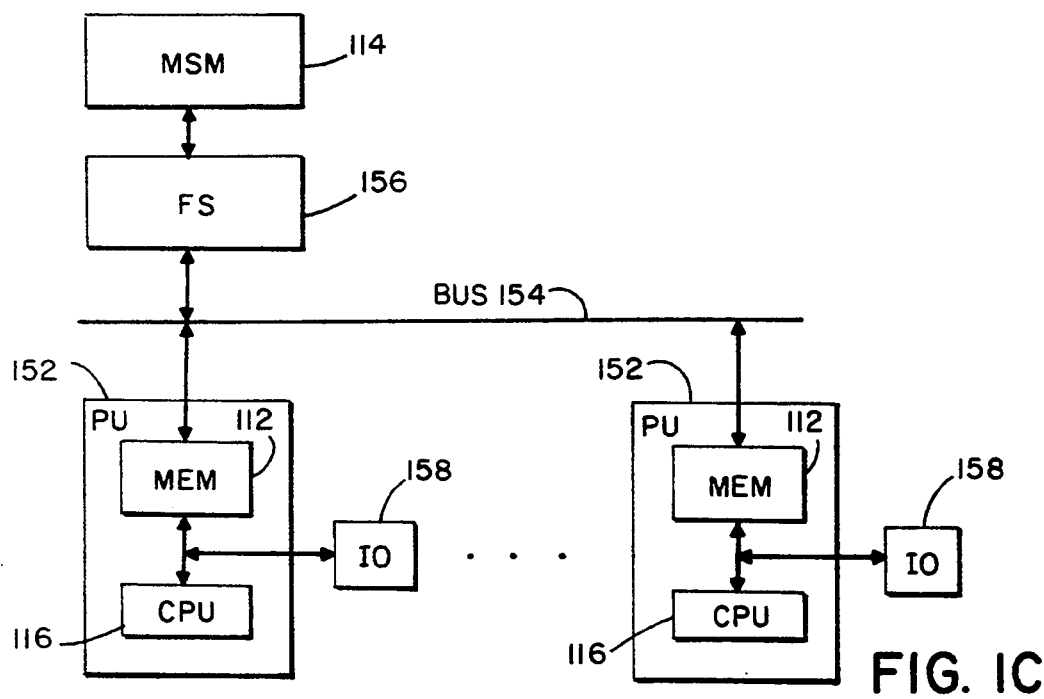

FIGS. 1A, 1B, and 1C are block diagrams of information processing systems which may incorporate the present invention.

Referring to FIG. 1A, a host computer 170 with substantial disk storage capacity 172, printers 174, and other shared peripheral devices 176 is connected to a plurality of intelligent workstations 178. Each workstation 178 includes a computer with memory management to support virtual memory. A workstation may include locally connected peripheral devices, but more typically will use peripherals 174 and 176 connected to the host 170. A workstation 178 may include local disk storage 180, in which case the virtual memory system can page locally, rather than to disks 172 on the host.

In a particular configuration, the host 170 is a Wang VS minicomputer connected to each workstation 178 via a high speed (4 Mbit/sec.) serial data link 182, and the workstations each include a Motorola 68020 processor. In this configuration the host runs the VS Operating System 186, uses a general purpose relational data base system 188 for management of the object catalog and some of the system database tables, and uses simpler tools for the rest of the system database. A catalog server process 190 (described further below) runs in the VS. Each disk 172 is organized as one or more volumes, each of which can be used to store objects and other files and which includes a corresponding object catalog. One volume includes the system database. Each workstation 178 runs a multitasking kernel 192, a Application Manager process 194, an one or more Object Managers 196, as needed. The APPACK routines 218 and RESPACK routines 222 are present in the workstations and are called by the various Object Managers 196 executing there.

In an alternative configuration (FIG. 1C), the workstations are connected as peers on a local area network 154, to which are also connected servers for shared resources (e.g., file server 156, printer server) and shared computing resources such as mini- or mainframe computers.

In a further alternative configuration (FIG. 1B), dumb workstations (including a keyboard 118 and a display 120) are attached to a host (including memory space 110 and central processing unit 116). In this configuration, the object managers and Application Manager run on the host, rather than in the workstations.

Referring to FIG. 1B, therein is presented a block diagram of a general information processing System 100, that is, a computer system for performing operations upon data or information under the control of programs and as directed by a user of System 100. As shown, System 100 includes a Memory Space 110, that is, the memory space accessible to and usable by System 100 in performing operations, wherein reside data structures to be operated upon and programs for performing various operations upon corresponding data structures at the direction and control of the user. As indicated, Memory Space 110 is comprised of a Main Memory 112 for storing presently active data structures and programs, and a Mass Storage Memory 114, such as one or more disk drives, for storing presently inactive data structures and programs. Also included in System 100 is a Central Processing Unit (CPU) 116 which is responsive to the programs for performing the system's operations. A Keyboard 118 is provided for user inputs and a Display 120 for visual representations of operations to the user. System 100 may also include one or more Peripheral Devices 122, such as telecommunications and networking interfaces and printers, for providing information inputs and outputs to and from System 100. It should be noted that certain of these Peripheral Devices 122 may also be included within System 100's Memory Space 110.

Referring now to the programs and data structures residing in System 100's Memory Space 110, these elements include programs 124 which perform operations upon the data structures at the direction of the user, and the Data Structures 126 which are operated upon. Also included are operating system programs 128, which provide functions for directing, supervising and coordinating the operations of the system, and input/output programs 130 for controlling transfer of information between the system and Keyboard 118, Display 120 and Peripheral Devices 122.

Referring to FIG. 1C, therein is represented a second information processing system (System 150) which may also incorporate the present invention. System 150 differs from System 100 in that, instead of a single CPU 116 and Main Memory 112 which may be shared by a number of users, System 150 provides a plurality of CPUs 116 and Main Memories 112, each of which may serve a single user. Like System 100, however, System 150 provides a single Mass Storage Memory 114 for storing presently inactive programs 124 and Data Structures 126, the single Mass Storage Memory 114 again being shared by all the users of the system.

As indicated, System 150 includes, in general, the same fundamental elements as System 100 of FIG. 1B. System 150, however, is comprised of a plurality of Processing Units 152 which are connected through a Bus 154 to a File Server 156 which, in turn, is connected to System 150's centrally located Mass Storage Memory 114. Each Processing Unit 152, or workstation, is in turn comprised of a CPU 116, a Main Memory 112 and input/output Devices 158 which may include, for example, a Keyboard 118, a Display 120 and Peripheral Devices 122.

As in System 100, presently active programs 124 and Data Structures 126, the operating system programs 128 and the input/output program 130 reside in each Processing Unit's 152 Main Memory 112 and execute operation under the direction of the users interacting with the Processing Units 152 through their input/output Devices. The inactive programs 124 and Data Structures 126 reside in the single, centrally located Mass Storage Memory 114 and are transferred between Mass Storage Memory 114 and the individual Main Memories 112 of the Processing Units 152 by means of File Server 156 and Bus 154. In this regard, File Server 156 is responsive to read and write requests from the Processing Units 152 to read and write Data Structures 126 and programs 124 between Mass Storage Memory 114 and the Processing Units 152 as required by the operations of the users. In addition, operating system programs 128 and input/output programs 130 may also be stored in Mass Storage Memory 114 and loaded from Mass Storage Memory 114 to the Main Memories 112 of the Processing Units 152 as required, for example, at Processing Unit 152 initialization. For these purposes, File Server 156 may be comprised, for example, of a dedicated purpose file server such as an intelligent disk drive system or may be comprised of a general purpose computer capable of performing additional operations at the direction and request of the system users.

7 SOME ELEMENTS OF AN ILLUSTRATIVE SYSTEM

Some of the elements of the present system are: system data structures, Applications Pack (APPACK) 218, resources with associated Resource Pack (RESPACK) 222.

Figures 2, 3:
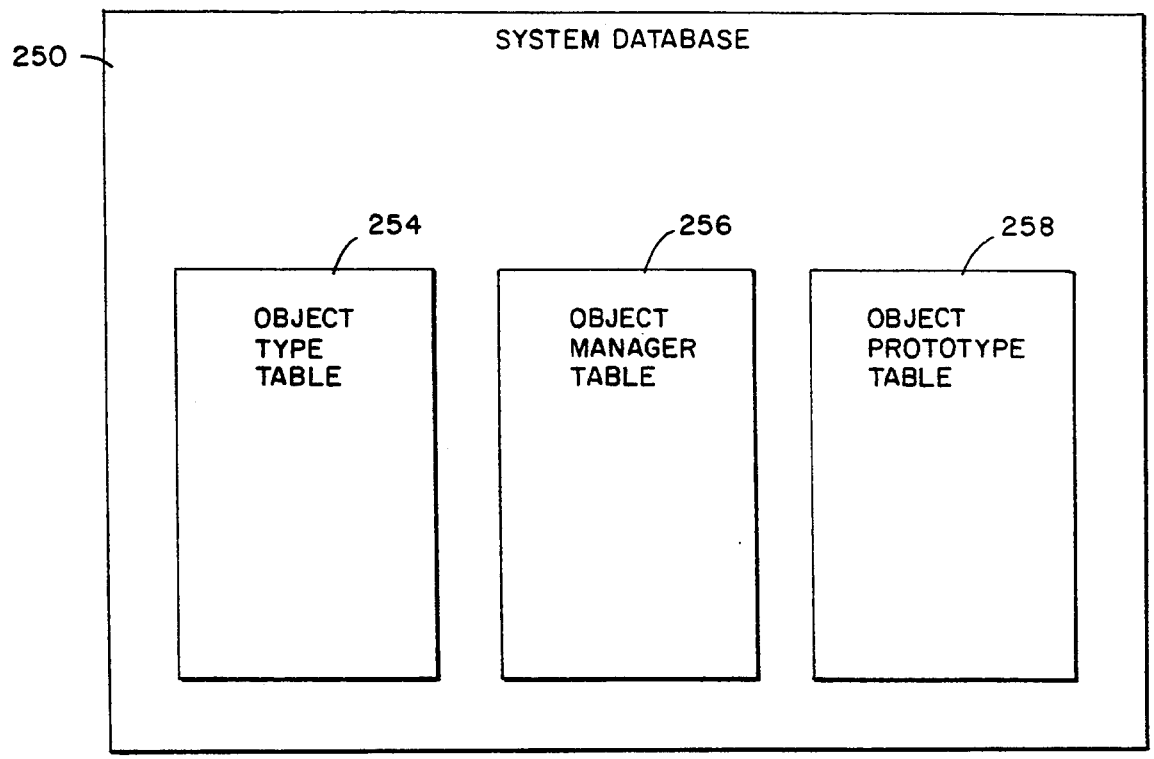
FIG. 2 is a diagrammatic representation of a system database of the present invention.
FIG. 3 is a diagrammatic representation of an object manager table of the present invention.
Figures 4, 5:
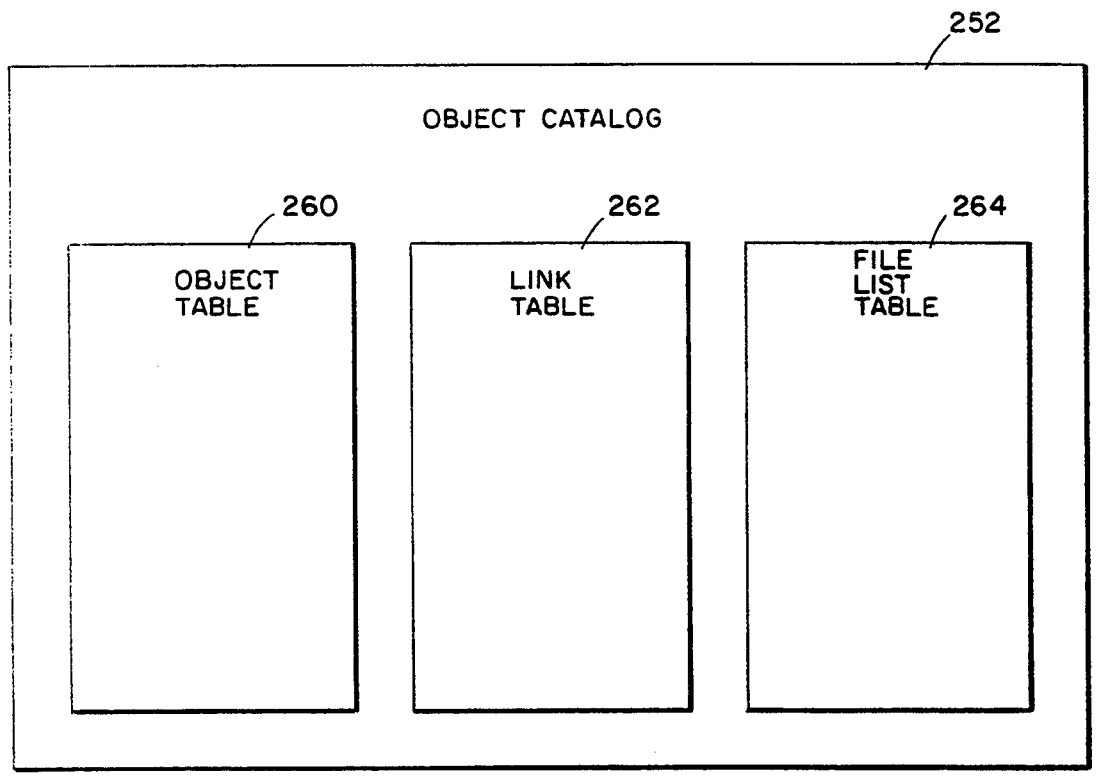
FIG. 4 is a diagrammatic representation of an object prototype table of the present invention.
FIG. 5 is a diagrammatic representation of an object catalog of the present invention.

System data structures are a plurality of data structures related to the management of the system, the objects therein, and the object managers and resources. System data structures include a system primary folder, a system database 250, and one or more object catalogs 252. As shown in FIG. 2, the system database 250 includes an object type table 254, an object manager table 256, and an object prototype table 258. As shown in FIG. 5, the object catalog 252 includes an object table 260, a link table 262, and a file list table 264. To the extent that they contain publicly available information (e.g., update state, display state, and display mode fields), link parallel files 266 are also system data structures.

APPACK 218 in turn is comprised of a pack of services and functions for the integration of object managers, object management, object manager invocation, and object manager "matchmaking" and data interchange between objects.

In certain cases, the objects and files in a particular system are organized into "volumes" and a particular object catalog may contain entries for the objects within a given volume, there being more than one object catalog in the system if there is more than one volume. In other systems, objects and files may be cataloged in a single object catalog. The object catalog includes an object table, indexed by object identifier, of all objects residing in a volume. In addition, the object catalog includes basic information regarding each link to or from each object having an entry in the object table.

There is a link parallel file 266 for each parent object in object catalog 252 having a data link therefrom. The link parallel file 266 associated with a particular object resides in the secondary data files of that object.

When a user selects to perform an operation upon a given object, the routines of APPACK 218 read the corresponding entry for that object type, operation, and, if applicable, language, from the object manager table to determine the corresponding object manager to be invoked. The particular object manager invoked to operate upon a particular object may depend upon the type of operation to be performed and certain object managers may operate with more than one type of object.

The object prototype table identifies prototype objects. An object prototype includes the fundamental, default characteristics of an object of corresponding type. The object prototype table provides a means for identifying prototype copies of each type of object installed in the system for which prototypes exist. New objects of any type for which there exists a prototype may be created by making copies of the object prototype, the copy of the prototype object then becoming a new object which may be modified or operated upon by the user. A profile editor may used to create a corresponding new profile for the new object and to modify the copy of the basic profile as necessary to reflect the modified characteristics of the object.

The user may create new types of objects having data already therein, for example, form letters. The user creates a new blank object by making a copy of the appropriate type of prototype object as described above. The user then enters the data that is to appear in the prototype object, modifying the object profile as required, and places an entry for this new prototype object in object prototype table. This new prototype object may then be used to create objects in the same manner as a blank prototype object, by making copies of the prototype object, and the data entered by the user in the prototype will appear in each copy of the prototype.

Resources are blocks of data that are used by programs but which are not stored as a part of any program's executable code. These resources may include one or more system resources, which are used by the system in general, for example, by various operating system and user interface functions, and one or more application-specific resources, which are used by the individual programs. In addition, the resources may include one or more resources which are particularly associated with one user of the system (stored in the user's profile).

RESPACK is a pack of services and functions used to access and modify the resources. Any program or user may use the facilities of RESPACK to create a resource, or to copy an existing resource and to modify the copied resource to meet the particular requirements of the program, function, or user. In these cases, the customized resource becomes particular to the program, function or user for which it was created or modified and, as will be described, becomes associated with that program, function, or user through a corresponding modification of the program's or user's associated profile. Thereafter, the customized resource will be used in place of the original, unmodified resource.

8 SYSTEM DATA STRUCTURES

The following describes various system data structures storing information relating to objects and links. This information is organized as tables of records, each record being organized into a set of fields.

8.1 System Database

There is one of each of the following for each system.

8.1.1 Object Type Table

The Object Type Table includes a record for each object type.
- 1.1(a) Object Type—4 bytes.
- 1.1(b) Object Class—4 bytes—This associates object types with categories familiar to users. Object type distinctions are generally hidden from users. Object "class" is intended to correspond to user-perceived distinctions. For example, the association of objects with object classes makes it easy to display to a user a list of all the user's "documents", despite the fact that these may have been created using two or more incompatible document editors (each corresponding to a different object type).
- 1.1(c) Display Name—the Resource ID of a resource containing the name of an object type for display to a user.
- 1.1(d) Display Icon—the Resource ID of a resource containing the icon associated with the object type.
- 1.1(e) Prototype ID—64 bytes—an Object Permanent ID of the primary prototype for objects of the associated Type.
- 1.1(f) Description—50 bytes—text description of the object type.
- 1.1(g) Create Flag—1 byte—set if users can create objects of this type.

8.1.2 Object Manager Table

The Object Manager Table is used to identify a program capable of performing a specified startup request for a specified type of object.
- 1.2(a) Object Type—4 bytes.
- 1.2(b) Request—4 bytes. This field can have a special value "all" to easily handle the simple case where a single program is used to handle all of the requests for a particular object type. Examples of other values for this field are:
  - start: perform the default startup operation for the specified object type.
  - edit: allow the user to edit the object.
  - read: allow the user to view the object without being able to modify it.
- 1.2(c) Request Name—Resource ID of a resource containing text describing the startup request, to be displayed in the Utility Menu for the associated object type. This field is only used when the startup request is not a standard request, but is application specific.

1.2(d) Object Manager ID—64 bytes—the file name of the program that can perform the associated request on objects of the associated type. If the value of this field is null, then when a startup request is made, the primary data file of the specified object is executed (i.e., the object is directly executable).

8.1.3 Object Prototype Table

The Object Prototype Table includes a record for each object prototype. There may be a plurality of prototypes for each object type. This table is used by Application Integration Services when performing an object create operation on file-based objects.

1.3(a) Object Type—4 bytes—code representing the object's type.

1.3(b) Location Code—2 bytes—language (e.g., English) associated with the object.

1.3(c) Prototype ID—64 bytes—an Object Permanent ID of a prototype for objects of the associated Type.

8.1.4 Customization Table

The Customization Table includes a record for each possible resource customization (i.e., for each valid combination of Resource ID, Resource File, and Customization ID).

1.4(a) Customization ID—The Customization ID is used to determine what uses of a resource are altered by a particular customization.

1.4(b) Name—Resource ID of a resource containing a text string used to identify the associated Customization ID to the user.

1.4(c) Resource File—the name of a resource file containing a resource for which there is a customized version for the associated Customization ID.

1.4(d) Resource ID—identifies a resource within the associated resource file for which there is a customized version for the associated Customization ID.

8.1.5 Library Table

The Library Table includes a record for each document library which includes documents in the object catalog.

1.5(a) Library Type—1 byte (e.g., WP or WP Plus).

1.5(b) Library—8 bytes—name of the WP Plus library and the VS physical library.

1.5(c) Default Volume—1 byte—indicates whether a WP volume is the default WP volume.

1.5(d) Volume—8 bytes—name of the volume on which the library resides.

1.5(e) Document Library—1 byte—the WP name of the library.

1.5(f) Indexing—1 byte—indicates current state of the library: not indexed, only summary indexed, summary and WIT indexed.

1.5(g) Next Indexing—1 byte—the next index state. Has three possible values: not indexed, only summary indexed, summary and WIT indexed. The user sets this field to determine how the library should be indexed the next time indexing is performed.

1.5(h) Archivable Flag—1 byte—this is the default value for the Archivable Flag for objects created in the library corresponding to this record.

1.5(i) File Protection Class—1 byte—this is the default value for the File Protection Class for objects created in the library corresponding to this record.

1.5(j) Owner ID—8 bytes—the logon ID of the owner of the library corresponding to this record.

1.5(k) Folder ID—38 bytes—the Permanent ID and current location of the folder object to which documents created in the library corresponding to this record should be synchronized.

8.1.6 Volume Table

The Volume Table includes a record for each configured volume on the system (e.g., all active volumes and some archive volumes).

1.6(a) Volume—8 bytes—name of the volume.

1.6(b) Active Flag—1 byte—status of the volume: active or archive.

1.6(c) Volume Path Name—64 bytes—full path name for a volume on a system with volume names longer than 8 bytes.

8.1.7 System Configuration Table

The System Configuration Table contains a single record with information such as the following:

1.7(a) Record Access—1 byte—set to enable recording of date and time of accesses to objects.

1.7(b) Check ACL—1 byte—controls the checking of Access Control Lists during queries against the object catalog: never check, always check, or only check when the ACL Flag in the relevant object's record is set.

1.7(c) System Folder Volume—8 bytes—name of the volume on which the system folder resides.

8.2 Object Catalog

There is one of each of the following for each volume.

8.2.1 Object Table

The Object Table includes a record for each object in the catalog. Logically, there is a link count field for each record in this table, having the number of links to the object associated with the record. However, since this number can be determined by counting the records in the Link Table having the appropriate Child Object Permanent ID, the number need not be stored in the Object Table. It may be desirable to physically store the number in the Object Table to improve performance (i.e., to avoid counting records in the Link Table).

2.1(a) Object ID—4 bytes—the record serial number; uniquely identifies the object within the catalog. A new Object ID may be assigned if the object is moved so as to be indexed in another catalog.

2.1(b) Object Permanent ID—12 bytes; remains constant for an object even if the object is relocated. The first 6 bytes store the number of tenths of seconds since 1986 when the object was created; the second 6 bytes store the number of tenths of seconds since 1986 when the system on which the object was created was initialized for indexing.

2.1(c) Title—64 bytes—WIT ("word in text" indexed)—user definable free text.

2.1(d) Author—32 bytes—WIT—user definable free text.

2.1(e) Operator—32 bytes—WIT—user definable free text.

2.1(f) Comments—252 bytes—WIT—user definable free text.

2.1(g) Object Type—4 bytes—code representing the object's type.

2.1(h) Object Class—4 bytes—code representing the object's class. This could be determined by using the object's type as a key to the Object Class Table;

however, the Class is stored here to improve performance.

2.1(i) Type—20 bytes—WIT—user definable free text.

2.1(j) Department—20 bytes—WIT—user definable free text.

2.1(k) Physical Location—64 bytes—the name of the object (or its primary part, if there is more than one part) in its native name space, e.g., file name or combination of database name and record number. For objects made up of more than one part (e.g., a plurality of files or records), this is the location of the primary part.

2.1(l) Creation Date and Time—8 bytes.

2.1(m) Created By—8 bytes—logon ID of the user that created the object.

2.1(n) Modification Date and Time—8 bytes.

2.1(o) Modified By—8 bytes—logon ID of the user that last modified the object.

2.1(p) Accessed Date and Time—8 bytes.

2.1(q) Accessed By—8 bytes—logon ID of the user that last accessed the object.

2.1(r) Printed Date and Time—8 bytes.

2.1(s) Printed By—8 bytes—logon ID of the user that last printed the object.

2.1(t) Archived Date and Time—8 bytes.

2.1(u) Archived By—8 bytes—logon ID of the user that last archived the object.

2.1(v) Archived Flag—1 byte—indicates whether the object has been archived or has been copied. Three values are possible: archived, copied, neither.

2.1(w) Archivable—1 bit—indicates what to do when it is determined that the files corresponding to an object no longer exist. If such situation is detected and this flag is not set, then the object's record is deleted. If such situation is detected and this flag is set, then the object's record is retained and the Archived field is set to the value "archived".

2.1(x) Archived Permanent ID—12 bytes—the Object Permanent ID of the object that was archived to this object.

2.1(y) Archived Current Location—28 bytes—either the current location of the object that was archived to this object or the current location where this object was archived. The current location of an object is its Object ID (4 bytes), an identifier for the volume in which it is cataloged (8 bytes), and an identifier for the system (16 bytes) on which that volume is located.

2.1(z) Words In Text—1 byte—used during a WIT query operation.

2.1(aa) Object WIT Flag—1 byte—set if the object ever was WITed or if the object is to be WITed.

2.1(ab) Owner ID—8 bytes—logon ID of the object's owner.

2.1(ac) File Protection Class—1 byte.

2.1(ad) ACL Flag—1 byte—set if the object has an Access Control List.

2.1(ae) Logical Size—4 bytes—Kbytes used by the object.

2.1(af) Physical Size—4 bytes—Kbytes allocated to the object.

2.1(ag) Number of Edits—2 bytes—number of times the object has been edited.

2.1(ah) Delete Flag—1 byte—set if the object should be deleted.

2.1(ai) Frozen—1 byte—set if the object cannot be edited.

2.1(aj) Damaged Flag—1 bit—set if the object has been damaged and cannot be opened.

2.1(ak) Revision History—3 bits—indicates whether revision history information is to be recorded. The following are possible values:
  No: revision history information is not to be recorded.
  Modifications: information relating to modifications of the object are to be recorded.
  All: information relating to views of the object that may not modify the object is to be recorded as well as information about modifications.

2.1(al) Location Code—2 bytes—language (e.g., English) associated with the object.

2.1(am) Deletion Control—1 bit—determines what happens when the object's link count goes to zero; either the object and its record are deleted or just the record is deleted.

2.1(an) WP Synchronization Flag—1 bit—used for document objects to indicate if the object is synchronized with a document library, i.e., if some data about this object is duplicated in a document library.

2.1(ao) Print Defaults—default parameters used to print the object, such as:
  coordinates of place to start the text,
  orientation (landscape or portrait),
  form number,
  printer bin number,
  paper size,
  whether overlapping objects should cover each other or show through,
  whether the object should be clipped or should be shrunk to fit the paper,
  which print queue on which system.

8.2.2 Link Table

The Link Table includes a record for each reference to or by an object in the catalog. For a link between two objects in one catalog, there is a single link record in the Link Table of that catalog. For a link between objects in separate catalogs, there will be an entry in the Link Table of each of the two catalogs.

2.2(a) Parent Permanent ID—12 bytes—the Object Permanent ID of the parent.

2.2(b) Parent Current Location—28 bytes. The current location of an object is its Object ID (4 bytes), an identifier for the volume in which it is cataloged (8 bytes), and an identifier for the system (16 bytes) on which that volume is located. The identifier for the system is null if it is on the same system as this record. The identifier for the volume is null if it is on the same volume as this record.

2.2(c) Link ID—4 bytes—unique within the parent object. A Link ID is stored in a link marker in the parent object. It is this Link ID which enables an retrieval of the record from the Link Table corresponding to any particular link marker in a particular object.

2.2(d) Link Type—1 byte—possible values include:
  Child: the usual value.
  Version Of: the linked object is a version of the parent object.
  Replication Of: the linked object is a copy of the parent object.

2.2(e) Data Link—1 bit—set if there is an entry in the link parallel file entry corresponding to this link.

2.2(f) Child Permanent ID—12 bytes—the Object Permanent ID of the child.

2.2(g) Child Current Location—28 bytes.

2.2(h) Child Type—4 bytes. Object type.

2.2(i) Child Title—64 bytes—a copy of the child object's Title field maintained in the Link Record to improve performance.

2.2(j) Child Author—32 bytes—a copy of the child object's Author field maintained in the Link Record to improve performance.

2.2(k) Copy Flag—1 bit. If set, the child object is copied when the parent is copied; if not set, the link to the child object is copied.

2.2(l) Annotation—252 bytes—user definable free text to describe the link.

2.2(m) Delete Flag—1 byte—set if this link record should be deleted. The use of this is internal to the database system. This permits the physical deletion of link records to be postponed until a convenient time.

2.2(n) Synchronize Link Flag—1 bit—set if this link record should be synchronized with its copy on another volume or system.

8.2.3 File List Table

The File List Table includes a record for each part of an object other than its primary part; these parts are typically files, but they may be something else, such as records. Link parallel files are listed in this table.

2.3(a) Record Serial Number—4 bytes—unique identifier for this file list record.

2.3(b) Object ID—4 bytes—identifier for the object record for the object of which the object part (e.g., file) identified in this record is a part. 2.3(c) Object Part Location—64 bytes—the name of the object part (e.g., file, record) in its native name space (e.g., file name or combination of database name and record number).

2.3(d) Remote Flag—1 byte—set if the part is located on a different system from this table.

8.2.4 Folder Table

The Folder Table includes a record for each folder in the Object Table.

2.4(a) Folder Object ID—4 bytes—Object ID of a folder object.

2.4(b) Creation Location—64 bytes—location where objects created in this folder should be located.

2.4(c) Creation File Class—1 byte—the default file class of all objects created in this folder.

2.4(d) Creation Document Library—8 bytes—document library where document objects created in this folder should be located.

8.2.5 Field WIT File

The Field WIT File includes a record for each word in the WIT ("word in text") indexed fields of the Object Table.

8.2.6 Object WIT File

The Object WIT File includes a record for each word in the WIT indexed documents.

8.2.7 Deleted Objects Table

The Deleted Objects Table includes a record for each object that has been indexed in the Object WIT Table and has since been deleted.

2.7(a) Record Serial Number—4 bytes—unique identifier for the record.

2.7(b) Object ID—4 bytes—identifies the record in the Object Table of the deleted document.

8.3 Link Parallel Files

A volume may contain many link parallel files. There will be a link parallel file for each object in which is embedded at least one data link (a link that includes a link specification). A Link Parallel File includes information relating to those links capable of being used for data transfer. A link parallel file exists for each object that contains such links.

3(a) Update State—1 byte—controls when a link is updated. It can have the following values:

Manual: update occurs when specifically requested.

First Time: update occurs at most once per opening of the parent object and occurs the first time the child object is accessed.

Dynamic: update occurs whenever the child object is changed.

3(b) Display Mode—1 byte—controls what the user will see to represent the link.

Data: the linked data will be displayed.

Icon/Title: the title of the child object and/or an icon representing objects of the child's type will be displayed. The choice of icon or title is application dependent.

3(c) Display State—1 byte—when the Display Mode field indicates that linked data is to be presented to the user, the Display State field controls when the linked data will be displayed to the user. There may be a great deal of overhead associated with displaying linked data; for example, a user may prefer to be able to scroll quickly through a document rather than always have the pictures appear in the document. This field makes it possible for the user to express this performance preference.

Automatic: display linked data whenever the linked data falls within the user's.

On Request: display linked data only when specifically requested; otherwise, depending on the relationship between the linked data and the data in the parent, just the icon or title might be displayed, or an empty space might be displayed where the object would appear (e.g., an image in a document).

3(d) Link Specification Header—standard information preceding each link specification, includes the following fields:

Version: 8 bytes—identifies the version of child object's object manager that created the link specification. This facilitates revision of an application while still supporting link specifications.

Interchange Type: 4 bytes. The format through which the child's data is converted in passing it to the parent object.

Length: 4 bytes—the number of bytes of the following link specification information.

3(e) Link Specification Informationa—variable length—details depend on the type of the child object. This field is interpreted by an object manager of objects of the child's type (not by Application Integration Services or by the object manager of the object in which the link is embedded) in order to identify the data within the child object that is referenced by the link.

3(f) Linked Data Copy—variable length—includes a copy of the linked data.

9 OBJECT MANAGER INVOCATION 9.1 Invocation by Direct use of the Kernel

An object manager can be invoked by another program making a kernel call to directly invoke the object manager as a child process of the invoking program. However, invocation of an object manager is typically initiated by another program calling one of the AP-PACK invoke functions (e.g., APrqedit(), APinvoke()).

Even when two applications need to communicate via nonstandard protocol, there are advantages to choosing to using the APPACK invocation mechanism (using a private request) over direct invocation by kernel calls. For example, APPACK provides a higher level assistance in setting up communications between the applications. Further, the two communicating applications can detach from each other an both continue operation independently; this is because when AP-PACK invocation is used, both processes are children of the Application Manager process, rather than one of the two communicating processes being a child of the other.

9.2 Startup Requests

The present system supports a number of generic operations that may be performed upon objects. These operations are referred to as "startup requests" because, firstly, they are initiated as requests for operations to be performed and, secondly, each request results in the starting of an operation or process.

An important characteristic of the present system is that a set of operations is defined such that nearly any such operation can be performed on nearly all types of objects. The object managers of the present system are designed so that for each type of object as many of the standard requests as are practical or meaningful are supported. For file-based objects, some of the standard requests can be performed directly by APPACK; these are called optional requests, because these need only be supported by an object manager for those types of objects where the file-based operations performed by AP-PACK are inadequate.

Any application can be designed to support private requests, in addition to the standard requests, this permits any application to define whatever specialized requests it might need, while still using the basic invocation mechanism supported by APPACK. Because any particular private request will not generally be supported for a large number of object types, other applications will not typically make such requests. Nonetheless, certain combinations of applications will benefit substantially from specially tailored requests and therefore will jointly define and support their own idiosyncratic requests.

Essentially, the difference between private requests and standard requests is the number of applications that support the requests. The designer of a particular application could choose to widely publish the definition of a private request. Many others may find the request useful enough to modify object managers to honor the request. The result is that the request becomes a de facto standard request.

The standard requests (including the "optional" requests that are typically performed by APPACK directly) are as follows:

START: perform the default operation. For many types of objects, the default operation is to open the object for editing by the user. If no object is specified, then a typical default operation is to allow the user to create a new object.

EDIT: allow the user to edit the object.

READ: allow the user to view the object, but not modify it.

RUN: execute the specified object. The object manager functions as an interpreter or program loader.

PRINT: queue the object for printing. An option specified with this request indicates whether the user should be prompted to provide print parameters or whether default parameters should be used.

UPDATE LINK: communicate to the parent object the latest version of data designated by a particular link specification. If the link specification is not valid, the child object manager should open a window and allow the user to respecify the link.

RESPECIFY LINK: open a window and allow the user to change the link specification. The child object manager should display the relevant portion of the child object (indicating the currently specified data) and allow the user to specify different data.

EDIT OBJECT PROFILE: open a window and allow the user to edit the child object's profile. The nature of the information included in the object profile depends on the object's type.

CUSTOMIZE: allow the user to customize the behavior of the object manager receiving the request. Modifiable characteristics have associated data stored in resources; customized resources are the result of this operation. Most programs will not have customizable behavior options and therefore will not support this request.

CONVERT OUT: provide the entire contents of the specified object. Upon receipt of such a request, an object manager should post an APMMOPCONVERTOUT operation with the matchmaker, including a list of interchange formats that can be offered (in order of increasing information loss).

CONVERT IN: create a new object receive data. Upon receipt of such a request, an object manager should post an APMMOPCONVERTIN operation with the matchmaker, including a list of interchange formats that can be accepted (in order of increasing information loss). A match message will then be issued by the matchmaker and a connection between the two object managers made to transfer the data.

COMPACT: compact the data storage in the specified object. Send bulletins to the requester including at least confirmation of completion or an error message.

RECOVER: recover the data storage in the specified object. Send bulletins to the requester including at least confirmation of completion or an error message.

WORD LIST: compile a list of all words in the object and send bulletins to the requester. The words are returned using the vanilla text interchange format; their order is important, to support phrase-oriented indexing.

CREATE: (optional) create a new object.

COPY: (optional) create a copy of an existing object.

RENAME: (optional) change the user-visible name of an object.

DELETE: (optional) delete the object.

FREEZE: (optional) freeze the object (e.g., modify an field in the object's record in the Object Table).

IMPORT: (optional) take an existing file an make it into an object.

9.3 Invocation by APPACK

The sequence of steps involved in using invocation of an object manager by means of APPACK are generally as follows:

(a) The requester calls one of the APPACK startup request routines, identifying a link (more parameters may be specified, especially if the general purpose APinvoke() function is used).

(b) The APPACK routine sends the request to the Application Manager process, along with the mailbox name of the requester.

(c) The Application Manager determines which object manager is needed to handle the request (based on the type of the object to be operated on and which request is specified) and creates a creates a new process running an instance of the needed object manager (this is the "server" in this operation).

(d) As part of the newly invoked object manager's initialization, it asks the Application Manager for the request and associated information.

(e) If the request is acceptable, the server sends a reply to the requester (also known as the consumer, although data need not always flow in the direction server to consumer) indicating that the operation is to proceed. If specified by the requester or if implicit in the nature of the request, a connection is established between the requester and the server.

(f) If the request was for data, data exchange is performed over the connection. The Application Manager is no longer a part of the interaction.

(g) When the requester and the server have finished the operation, they terminate the connection.

The APPACK routines handle details of issuing a request. They define a mailbox to be used for communication, builds its own messages, and in the case of calls to the request-specific routines (e.g., APrqprint(), but not APinvoke()) performs all of the event processing necessary to complete the invocation (and in some cases complete operation, when no communication is needed). When the APPACK startup function that was called returns, either the operation has been aborted or a new object manager has been started and has issued a successful reply. If communications are required, the requester and server each have been given a common operation ID to use in further communications. When the operation is over, both call APopfinish().

When an object manager that supports any of the standard functions is started and prior to opening a window (as the request may not involve any user interaction), it should call APinit() to get the startup request and parameters. The object manager should then determine whether it can honor the request; this typically involves opening the specified object and validating the link specification (this should be done quickly, as the requester is still waiting for a reply). If the request cannot be honored, the object manager should call APreply() (giving a reason for refusing the request) and should clean up and exit. If the request can be honored, this should be reported using APreply(). Then, if communication is required with the requester, a message from the requester is awaited, after which the communication specific to the operation proceeds. If the operation does not require communication with the requester, then the object manager should proceed to complete the operation, reporting status using APopfinish() when complete.

10 OBJECT MANAGER TABLE (FIG. 3)

The particular object manager invoked to operate upon a particular object depends on the object type and may further depend upon the type of operation to be performed or, in language dependent operations such as word processing, the particular language used in the object to be operated upon.

Referring now to FIG. 3, therein is presented a diagrammatic representation of an object manager table 256, showing some of the data fields of the table. The object manager table 256 is comprised of a plurality of object manager table entries 500. Each object manager table entry 500, in turn, corresponds to a combination of an object type, a type of operation, that is, request, to be performed upon that object type, a language if applicable, and the identification of the corresponding object manager to perform the specified request. Each object manager table entry 500 includes an object type field 502, a request field 504, and an object manager identifier field 506.

Considering each of these fields in turn, the object type field 502 contains an object type code. The request field 504, in turn, contains a code corresponding to an operation which may be performed upon or with regard to objects of the type identified in that object manager table entry 500. Finally, the object manager ID field 506 contains the file name of the particular object manager which is to be invoked to perform the requested operation on the particular object.

The object manager table can be used in the following way. An object manager, in the course of reading data in one of its objects to display the object to a user, may come across a link marker. The link marker will include a link ID. This link ID can be used along with the permanent ID of the object in which the link marker is embedded (the "parent" object with respect to this link) to look up in the link table the record corresponding to that link. This link record includes a field identifying the type of the linked object (this field is not required, as the object type of the child object can be obtained by using the child permanent ID in the link record as key to the object table). This type code for the child object, together with the code for a "display" request are used to identify a record in the object manager table. The object manager ID field of that record is the file name for the program that can perform the needed display operation on the linked object.

11 OBJECT PROTOTYPE TABLE (FIG. 4)

Referring to FIG. 4, object prototype table 258 provides a means for accessing the stored prototype copies of each type of object installed in the system. As represented in FIG. 4, object prototype table 258 is comprised of a plurality of object prototype entries 600, with each object prototype entry 600 corresponding to a single, unique object prototype.

Each object prototype entry 600 is comprised of an object type field 602, a language field 604, and a prototype identifier field 606. The object type field 602 and language field 604 together comprise the "key" to access the object prototype entries 600, while the prototype ID field 606 contains, for each key, the information read from the object prototype entry 600 to identify the corresponding prototype object. Considering each of these fields in turn, the object type field 602 contains an identifier of the type of object whose prototype is identified by that object prototype entry 600. The language field 604 in turn contains a code identifying a particular language in those instances wherein the particular version of the type of object whose prototype is identified by the object prototype entry 600 is language dependent. For example, there may be several prototypes of 5 document type objects wherein the document objects, and thus their prototypes, are distinguished in that one type is an English language document, a second type is a German language document and a third type is a French language document. Finally, the prototype ID field 606 contains the file name of the file containing the prototype copy of that type of object.

A user may thereby create a new object of a given type by first identifying the object type, for example, through a menu pick, and the language version of the object, if applicable. The object type identifier and language code are then used as a key to locate the corresponding object prototype entry 600 in the object prototype table 258 and the name of the file containing the corresponding prototype object is read from the object prototype entry 600. The prototype file name is then used in invoking a file copy utility, which in turn makes a new copy of the prototype. An entry for the new object is then created in the object table.

The user may then invoke the object manager for that object type and operate upon the object or invoke a profile editor for that object type and customize the newly created object as necessary or desired. If the user has desired to create a new object type, the user may use the appropriate profile editor to customize the profile of the newly created object as necessary or desired and to enter whatever data is desired in the prototype. The user will then invoke a utility to create a new object prototype entry 600 corresponding to this new object type and place this new object prototype entry 600 in object prototype table 258. The user may then create new objects of this new type at will through the operations described above.

12 OBJECT CATALOG (FIGS. 5, 6, AND 7)

Referring to FIG. 5, therein is represented the structure and organization of an object catalog 252. Object catalog 252 is represented therein as including an object table 260, a link table 262, and a file list table 264; these contain information about objects and about links to objects.

Referring to FIG. 6, the object table 260 is comprised of one or more object records 360. There is one object record 360 for each object cataloged in the object catalog 252. Each object record 360 includes information organized in a plurality of fields, including object identifiers 362, object type codes 364, and object location indications 366.

Referring to FIG. 7, the link table 262 is comprised of one or more link records 370. There is one link record 370 for each link to or from an object that is cataloged in the object table 260. Each link record 370 includes information organized in a plurality of fields, including parent object identifiers 372, a link identifier 374, child object identifiers 376, a link type code 378, a data link flag 380, and a copy flag 382. A child current location may also be stored in the link table 262.

The copy flag field 382 is used in copying the object identified by the parent object identifiers 372. When a copy is made of the parent object 400, either the link must be copied along with the parent object, or the linked data of the object identified by the child object identifiers 376 must be copied. Whether the link or the data referred to by the link is copied depends on the stat of the copy flag field 382.

In the present system, the adopted convention is that if a linked object has been created from within a parent object then the child object, or the linked data therefrom, is copied, otherwise the link is copied. For example, if the user creates a chart, and thus a chart type child object, from within and as part of a document in a document type parent object, and then duplicates the parent object, then the copy of the parent object will include a new copy of the chart. This copy of the chart, like the copy of the parent object, may then be modified independently of the original version. If, however, the link was created between a previously existing parent object and a previously existing child object, then the link is copied rather than the linked data of the child object.

12.1 Catalog Server Process

In the preferred embodiment of the invention, the object catalog is implemented by use of a catalog server process 190 running on the host computer or file server (e.g., 170, 116, or 156 of FIGS. 1A, 1B, and 1C, respectively) that manages the central mass storage (e.g., 172, 110, 114). An alternative is to permit each process needing information from the catalog (or adding information to the catalog) to have direct access to the stored catalog data.

Some of the advantages of using a catalog server are as follows. The catalog server is a continuously active process that can keep the catalog file open at all times; thus, the use of a catalog server avoids the need for opening the catalog for each separate process that accesses the catalog. Similarly, the catalog server can provide buffering that would otherwise be more difficult to implement. If all the individual processes that needed access to the catalog were given direct access to the stored catalog data, it would be difficult to implement effective catalog security; the use of a catalog server process can provide greater security.

13 LINKS AND LINK PARALLEL FILES (FIG. 8)

As previously described, all information, data and programs in the system are contained within objects and objects, in turn, are related to one another through links. A link may be regarded as a means by which one object, referred to as a "child" object, is "connected" to another object, referred to as the "parent" object. Each object is typically a child with respect to at least one link. For example, each user has at least one primary folder object, a folder, to which all other objects associated with that user are directly or indirectly linked. Any number of objects, or portions of objects, may be chained together through links, and the sequence and direction of links is not hierarchically limited.

In addition to linking a child object to a parent object, a link may also be used to link all or a portion of a child object's data into a parent object. This linking of data from a child object to a parent object is distinct from the copying of data from one object to another in that the data which is linked remains a part of the child object rather than becoming an integral part of the parent object. As will be described, linked data may be edited only within the child object and only by an object manager designated for the child object type.

Figure 8:
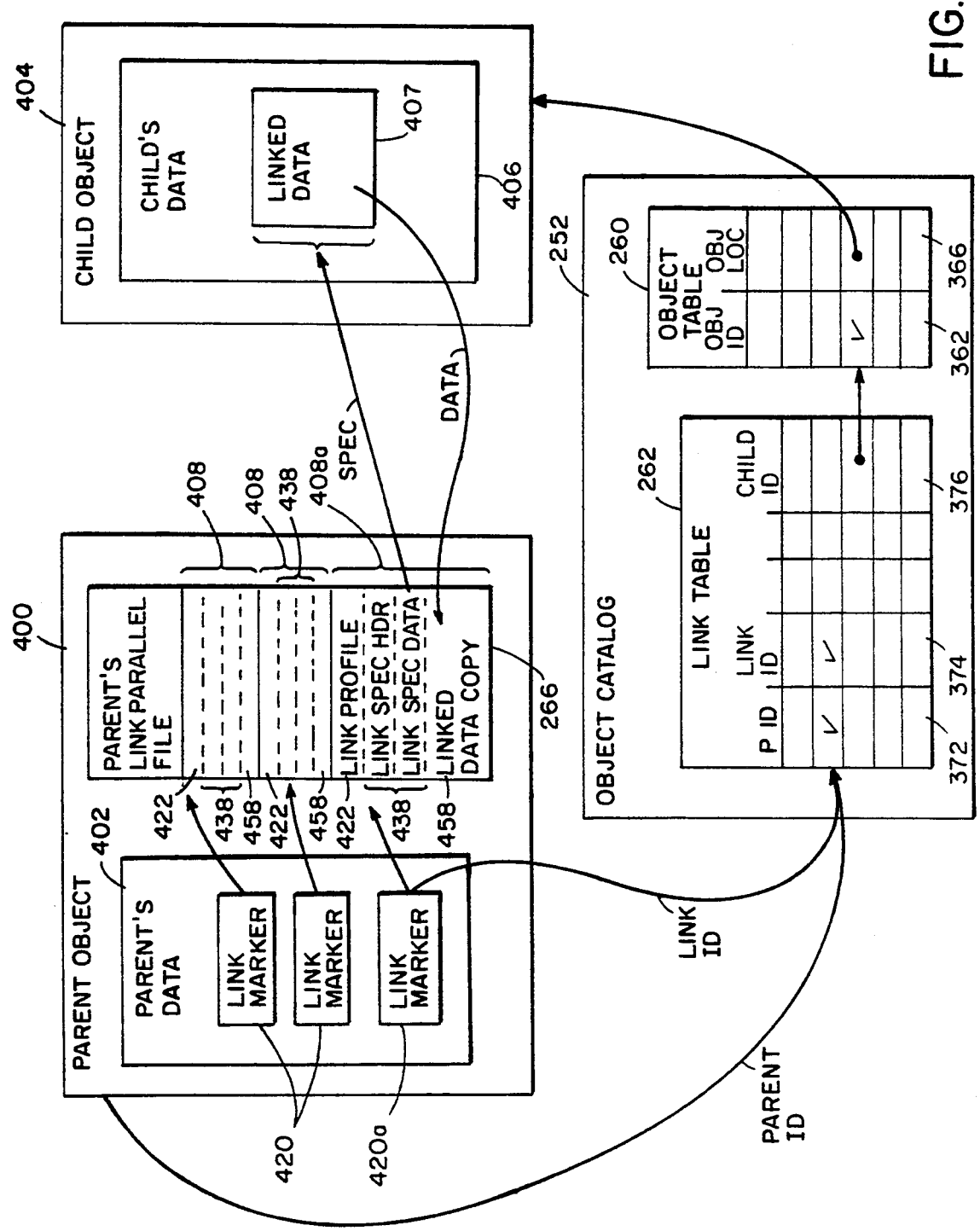
FIG. 8 is a diagrammatic representation of various data structures involved in links of the present invention.

Referring now to FIG. 8, therein is represented the structure and organization of a link parallel file 266 and a link between a parent object 400 and a child object 404 wherein linked data 407 (of child's data 406) from the child object 404 is linked into the parent object 400. It should be noted that the link structure and link parallel file 266 illustrated in FIG. 8 and described in the following is also apply to a link of non-data link (e.g., when linking an object to a folder type object), except that no link parallel file is involved and there is no linked data in the child object.

As represented in FIG. 8, the major elements of a link include a parent object 400 containing parent data 402, a child object 404 containing child data 406 and a link parallel file 266 containing at least one link parallel file entry 408. The portion of the child data 406 which is to be linked into the parent object 400 is represented in child data 406 as a linked data 407 and the location that this linked data 407 is to be linked into in parent data 402 is indicated by a link marker 420a that is one of the link markers 420 in the parent object 400.

Referring first to parent object 400 and in particular to link marker 420a, as previously described each link marker is a reference to an associated link through which a corresponding other object, or data in another object, is linked into a parent object such as parent object 400. Each link marker includes a link ID which uniquely identifies the corresponding link within the parent object. Further, each link marker marks the location in the parent object wherein the linked child object or the linked data from the child object is to "appear".

The link parallel file 266 of the parent object 400 includes link parallel file entries 408 for each data link embedded in the parent object 400. Each of these link parallel file entries 408 contains information identifying data in a child object that is to appear in the parent object 400.

Link profile fields 422 provides certain fundamental information regarding the status of the link and the linked data. In particular, link profile fields 422 contain information relating to the appearance and effects of the link and linked data in the parent object 400, including the fields update state, display mode, and display state.

The value of the update state field determines when the corresponding link 236 will be updated, that is, when a new, current copy of the child object 404 or the linked data from the child object 404 will be obtained and provided to the parent object 400. This updating of a link may be automatic, that is, without user intervention and upon the occurrence of certain events, or manual, that is, only when requested by the user, or a combination thereof.

When update state field is set for automatic updating, the parent object 400 object manager may automatically obtain and temporarily store a copy of the child object 404 or child object data at times determined by the parent object's object manager. This may, for example, occur each time the linked data 407 is to be displayed or printed or each time the parent object 400 is opened, that is, at the start of operations upon the parent object 400. The system may also allow dynamic updating, that is, updating initiated by operations upon the child object 404, so that changes made in the child object 404 will appear automatically in the parent object 400 when the child object 404 is changed. When update state field is set for manual update, however, the link will be updated only upon specific request or command by the user.

The display mode field contains a settable field which allows the selection of how the corresponding link will be displayed in the parent object 400. A link may be indicated by a display of the title of the object, an icon representing the object's type, the child object's data, or by any combination of these elements.

The setting of the display state field in turn determines whether the data included in the link specification, described below, is automatically displayed when the area reserved for the data in the parent object 400 is visible to the user, for example, in a visual display such as a CRT display. When display state field is set to "automatic display", the linked child object 404 data is displayed whenever the area in parent object 400 is visible to the user. When display state field is set to "on command display", the linked child object 404 data is displayed only upon a specific command to do so by the user. If the user does not command a display of the linked data while in the "on command" mode, the link will be represented, for example, by an outline of the area reserved for the linked child object 404 data and a brief indication of the linked data, such as an icon or the link title. It should be noted that the setting and effects of display state field are not applicable if the display mode field is set to not display the linked data, that is, to represent the link only by title or icon or the combination of title and icon.

The link specification fields 438 contain information describing the linked data from the child object 404, rather than, as described in link profile fields 422, the representation and effects of the link in the parent object 400.

The information contained in the link profile fields 422 is used by the parent object 400, or rather by the parent object 400's object manager, to determine how the linked data (linked data 407) from the child object 404 is to be displayed and used in the parent object 400. In contrast, and as described below, while the information in link specification fields 438 is provided in the link parallel file entry 408 and is thus associated with the parent object 400, the information therein is not used by the parent object's object manager. Instead, the information in link specification fields 438 is used by the child object's object manager to determine which of the child object's data is to be provided to the parent object 400, and in what form. For this purpose, the information residing in link specification fields 438 is returned to the child object's object manager by the APPACK 218 update routines each time the link is updated, as described above. The child object's object manager then interprets this information to determine which child object 404 data is indicated by the link specification, to determine the form in which the linked data to be provided to the parent object 400, and to provide the linked data to the parent object 400 in the expected form.

Referring to the link specification fields 438 is comprised of two blocks of fields, respectively referred to as header fields and link specification information fields. Header fields contain information primarily describing the child object 404 while link specification information fields contain information describing the child object's linked data.

Referring first to header fields, as indicated in FIG. 6 header fields include a version field, a length field, and an interchange type field. The version field identifies the particular version of the child's object manager which originally created the link specification. The length field indicates the length of the link specification data. The interchange type field indicates the data interchange format to be used in communicating the linked data from the child to the parent.

With regard to the interchange type field, each type of object may have a different type, form of format of data therein. It is possible, therefore, that the child object 404 and parent object 400 of a link may have different forms of data. For example, pictorial or graphic data, such as a picture or a chart or drawing, may be linked from a graphic type child object into a document type parent object. In many cases, the linked data may be of the same type as in the parent object, or sufficiently similar that the data may be partially or completely converted from the child data type to the parent data type with little or no loss of information. In other cases, however, the linked data may not be readily convertible into a type which is directly usable in the parent object.

The exchange of data between objects depends upon the types of data in the source, or child, object and the destination, or parent, object. If the data types are identical or sufficiently close, the data may be exchanged directly and used directly in the destination object with little or no conversion of the data and little or no loss of information. If the data types are sufficiently different, however, the conversion may be difficult or it may be that the data may not be used directly in the destination object, that is, as an integral part of the destination object's data. In this case, there may be some loss of information and the source object's data, as will be described, must be "fitted into" the destination object's data as best as possible.

A data exchange between objects can be performed with the assistance of an APPACK facility referred to as the "matchmaker". The matchmaker is used to help two the object managers associated with the two ends of a data exchange operation identify each other and identify a common data exchange format.

Referring now to the link specification information fields, as described these fields describe the data to be linked from the child object 404. The particular structure of link information fields depends on object type. In one format, link information fields include a location field which indicates the location of the linked data 407 in child data 406, for example, by indicating the beginning of the linked data 407 in child data 406 and a data identification field which identifies the portion of child data 406 contained within the linked data 407.

It should be noted that a child data 406 may be edited or otherwise changed or modified after an linked data 407 has been linked into a parent object 400, and that these changes in the child object 404 may effect with the location or identification of the linked data 407. It is therefore necessary that the manner in which the location and identity of the linked data 407 is indicated, that is, the type of information chosen to be placed in location field and data identification field, should be as insensitive as possible to changes to the child data 406. The manner in which the linked data 407 is located and identified should either allow the linked data 407 or the child data 406 surrounding the linked data 407 to be changed without invalidating the link specification, or should allow the child object 406's object manager to reestablish the location and identity of the linked data 407 after a change has occurred. For example, the information stored in the location field and data identification field may locate the identify the linked data 407 in terms of a region or regions of the child data 406. It should be further noted that the data identification should include an initial location for a cursor within the linked data 407.

Finally, and referring now to the last field of link parallel file entry 408, it is shown that a link parallel file entry 408 includes a linked data copy field 458. As previously described, the linked data from a child object 404 may be displayed to a user in a parent object 400 by means of an icon, a title, or the linked data itself, or a combination of any of these representations. The linked data copy field 458 is a means, for storing a copy of the linked data from the child object 404 in those instances wherein the linked data is visually represented by the data itself, whether in combination with an icon or title. It is the copy of the linked data stored in the linked data copy field 458 which is displayed when the linked data is to be visually displayed to the user. When the linked data is represented only by an icon or title, the linked data copy field 458 need contain no data.

A new and current copy of the linked data is received from the child object 404 and stored in the linked data copy field 458 when the link is created and each time the link is updated.

Also illustrate in FIG. 8, are the roles relative to a link of the link table 262 and object table 260. The link marker 420a and the ID of the parent object 400 are used to locate an entry in the link table 262. This entry include child identifier information that is used to locate the entry in the object table that corresponds to the child object 404. This entry in the object table 260 includes an information used to locate the child object 404.

14 COPY, MOVE AND SHARE

The following description of the copy, move and share operations which may be performed in the present system will summarize aspects of these operations which have been described previously, and will describe yet further aspects of these operations. It should be noted that the following descriptions of these operations will be particularly concerned with copy, move and share operations between different objects. These operations may be performed within an single object but, with the exception of sharing, the exact method and means by which the operation is performed within an object is determined by the pertinent object manager. Sharing data within an object, however, are performed in the same manner and by the same means as sharing between objects, although not all object managers support such intra-object sharing.

The copy, move, and share operations in the present system appear to the system user to be basically similar in that in each operation a copy of data from a source object appears in a destination object. Copy and move are similar in that a copy of the source data is "placed within" the destination object and becomes, within certain exceptions described below, a part of the destination object. Copy and move primarily differ in that, in a move operation, the original source data is deleted from the source object while, in a copy operation, the original source data remains unchanged in the source object. Copy and move are further similar and, as described below, in that the copied or moved data may be operated upon in the destination object to the extent that the destination object's object manager can operate with the type of data which was copied or moved.

The sharing of data from one object to another is distinct from the copying or moving of data from one object to another in that the data which is shared remains a part of the child object rather than becoming an integral part of the parent object; shared data is made available in the parent object by means of a link. Shared data may be edited only within the child object and only by the object manager designated for the child object type.

Sharing is further distinct from copying or moving data because a link can be "updated". There is no such ongoing character to a copy or move operation. The data that results from a share operation may change due to subsequent link update operations. A link may be set to be updated each time the destination object is operated upon, for example, opened, displayed, edited or printed. Or a link may be set to be updated whenever the source object is modified. Or a link may be set for manual update, in which case the shared data is effectively "frozen" until an update is specifically requested.

Copy and move further differ from sharing in the manner in which the copied or moved data residing in the destination object is treated when a copy or move operation is performed upon the portion of the destination object containing the copied or moved data. That is, the copied or moved data is, within the limitations described further below regarding data types, treated as a part of the destination object and may be copied or moved in the same manner as the other, original portions of the destination object. In this regard, it should be noted that, as previously described with regard to data exchanges, the data exchange formats have provision for changing data types during the data stream of a data exchange. That is, previously copied or moved data of a type different from that of the destination object may be found embedded in the portion of the destination object being copied or moved. In such cases, and as described, the convention adopted for data stream transfers in the present system is that there is an initial interchange type or data format for the stream, defined by the operations of the matchmaker 810. If another data type is to be inserted into the stream, such as a link marker or linked data, an indicator code indicating the change of data type and the new format is inserted into the stream and the appropriate data format conversions facilities called, or invoked, to switch the operations of the data transfer/conversion routines 808 to the new data type. The same operation is used when the data type changes again, for example, at the end of the inserted portion of the data stream, and the exchange formats revert to the original data type.

In contrast, while a link effectively transfers a copy of data from a source object into a destination object, the linked data is not in fact an integral part of the destination object. For example, the linked data may not be operated upon by the destination object manager but must be operated upon in the source object by the source object manager.

When a portion of an object containing data linked from another object is to be copied or moved, whether the link to the linked data or the actual linked data is copied or moved is determined by how the object with the embedded link was created. In the present system, the adopted convention is that if the source object has been created from within another object when the linked data is copied. For example, if the user creates a chart, and thus a chart type source object, from within and as part of a document in a document type object, and then duplicates the document object or the portion of the document object containing the linked chart type data to copy this portion of the document object, then the copy of the document object will include a link to a new copy of the chart. This copy of the chart, like the copy of the document object, may then be modified independently of the original version. If, however, the link was created between a previously existing document object and a previously existing chart object, then the link is copied rather than the linked data, resulting in a copy of the document with a link to the same chart object as the first document (i.e., changes to that chart will appear in both documents).

When the source data is similar to or identical to the destination data, either directly or after conversion, the copied, moved or shared source data will "blend into" or become "embedded" in the destination data. In the case of copied or moved data, the copied or moved data may be editable by the destination object manager. In the case of shared data, however, and while the shared data may be copied, moved or deleted, it may be edited only in the source object and only by an object manager for the source object. The destination object's object manager may convert the shared data into its own internal data format but may not incorporate the shared data into its own data, may not edit the source data in any way, and is required to "mark and hold" the shared data. The data should be visually marked for the user, so the user is aware that the data is shared, rather than directly a part of the object being edited. In the case of data that is "marked and held", an entry in the link parallel file of the destination object will contain (i.e., "hold") a copy of the linked data. This copy in the link parallel file cannot directly be edited; rather, this data is edited by editing the source object from which it is linked.

It should be noted that the destination object manager is not required to be able to edit copied or moved data in order to successfully execute a copy or move operation, but merely to be able to fit the source data into the destination object on some manner. It can "encapsulate" the copied or moved data, in which case the data is stored in a separate object of an appropriate type and a link to that object is embedded in the object that is the destination of the copy or move operation.

In a share operation, the destination object manager may not, by definition of a share operation, edit the source data in any way and is required to "mark and hold" the shared data. While the shared data may be copied, moved or deleted, it may be edited only in the source object and only by an object manager for the source object.

15 THE MATCHMAKER

15.1 Matchmaker Purpose and General Operation

In order to generate a data transfer or link between two objects, a user identifies both the source and destination objects and the operation to be performed. For example, the user selects the source data and presses a COPY key and then points to the destination and presses the PLACE key. When the source and data are in different objects, two object managers (each running in a different process) are involved. But since the cursor movements outside of a window owned by a process are not known to the process, neither process knows that the other processes half (e.g., COPY or place) of the operation has been performed by the user. This problem is solved by the matchmaker.

The Application Manager maintains a matchmaker that has two sides for each potential operation: a server side (i.e., having something) and a consumer side (i.e., wanting something). For data exchange operations, the object manager that posts the server side (e.g., COPY, MOVE, SHARE) lists what data interchange formats it will provide. The object manager that posts the consumer side (e.g., PLACE) lists the data interchange formats it will accept.

Once a COPY, MOVE, or SHARE has been posted, no other COPY, MOVE, or SHARE will be accepted until a PLACE has been posted. If a PLACE has been posted when there is no posted COPY, MOVE, or SHARE, then no further PLACE can be posted until a COPY, MOVE, or SHARE is received (or until the object manager responsible for the posted operation aborts the operation).

If other distinct operation pairs are defined, there could be concurrently posted on the matchmaker halves of these distinct operations, each of which will result in a match when a satisfactory other half is posted.

When a match occurs (matching sided of an operation are posted), an APPACK match message is sent to both the server and the consumer. These then each call APmmconnect() to get the information needed to communicate and exchange data directly with each other. The Application Manager then clears the matchmaker and can accept further while the data exchange resulting from the first match goes on.

15.2 Matchmaker Protocols

15.2.1 Source Protocol

When an object manager receives a COPY, MOVE, or SHARE event, the object manager takes the following steps.
  (a) Post the operation.
    Call APmmreserve() to determine whether an operation of the same type is already in progress. If there is, display an error message and go back to normal processing.
    Conduct whatever interaction with the user is necessary to select data. However, if the operation is a SHARE and the call to APmmreserve() indicates that the other side has been posted and does not require link data (i.e., the SHARE is to create a link to an object as a whole, not to any data in the object), the user should not be prompted for data selection.
    Call APmmpost() with a list of interchange formats that can be supplied, with the list in order of increasing information loss.
    If APmmpost() indicates that a match is impossible (e.g., there are no common formats and the destination does not support links, making even encapsulation impossible), display a suitable error message, call APmmclear(), and return to normal processing.
    If APmmpost() indicates that there is a match (i.e., a PLACE has already been posted), then start processing the operation (skipping "To where?" processing).
    If APmmpost() indicates that there is no match yet, do "To where?" processing.
  (b) Determine a destination ("To where?").
    Display the "To where?" prompt.
    If a PLACE event is received (by this object manager), then the operation is internal (i.e., from one place to another within a single object); call APmmclear() to clear the matchmaker, and process the operation.
    If a MATCH event is received from the matchmaker, then start processing the operation (as follows).
  (c) Start processing the operation.
    Call APmmconnect() to connect to the other object manager. Once both object managers have called APmmconnect(), the matchmaker's involvement in the operation is over.
    Wait for a request from the other object manager. The request may be for a link, data in a specific interchange format, or an encapsulation.
    For a link, build a link specification and then use APPACK link interchange routines to send the link specification.
    For data, call the appropriate APPACK or other data interchange routines to send it (depending on the interchange format requested).
    For an encapsulation:
      * Either call APrqcopy() to copy the entire object, or call APrqcreate() (to create a copy of the prototype) and move or copy (as indicated by the operation) the selected data into the newly create object. (Note that depending on the type of object, it may be necessary to include the entire object in the copy, even if only a portion is to be linked.)
      * Build a link specification to the selected data in the new object (required even if all of the data in the new object is linked) and then use APPACK link interchange routines to send the link specification.
  (d) Terminate the operation.
    If the operation is a COPY or a SHARE, call APopfinish() to terminate the operation. (An UNDO operation on a SHARE or COPY would not require involvement of the consumer, therefore communication is no longer necessary.)
    If the operation is a MOVE, the object manager should keep the operation alive until:
      * The user performs an operation that supersedes a possible UNDO of the MOVE, in which case the object manager calls APopfinish() to terminate the operation and inform the consumer that an undo is no longer possible.
      * The user requests an UNDO of the operation, in which case the object manager communicates with the consumer to retrieve the moved data and thereby reverse the MOVE operation.
    If a CANCEL event is received prior to a match occurring, call APmmclear() to clear the matchmaker; then return to normal processing.

15.2.2 Place Protocol

When an object manager receives a PLACE event, the object manager takes the following steps.
  (a) Post the operation.
    Call APmmreserve() to determine whether an operation of the same type is already in progress. If there is, display an error message and go back to normal processing.
    Call APmmpost() with a list of interchange formats that will be accepted, with the list in order of increasing information loss.
    If APmmpost() indicates that a match is impossible (e.g., no common formats), display a suitable error message, call APmmclear(), and return to normal processing.

If APmmpost() indicates that there is a match (i.e., a COPY, MOVE, or SHARE operation has already been posted), then start processing the operation (skipping "Place what?" processing).

If APmmpost() indicates that there is no match yet, do "Place what?" processing.

(b) Wait for data selection ("Place what?").

Display the "Place what?" prompt.

If a COPY, MOVE, or SHARE event is received (by this object manager), then the operation is internal (i.e., from one place to another within a single object); call APmmclear() to clear the matchmaker, and process the operation.

If a MATCH event is received from the matchmaker, then start processing the operation (as follows).

(c) Start processing the operation.

Call APmmconnect() to connect to the other object manager. Once both object managers have called APmmconnect(), the matchmaker's involvement in the operation is over.

Issue to the source object manager a request for a link, data in a specific interchange format, or an encapsulation.

After the request is acknowledged, use one of the APPACK or other type-specific data interchange services to accomplish the interchange.

If the request is for a multiple object transfer (AP-DATAMULTIPLE), the following extra steps are required:
* Call APmmreserve() to reserve the matchmaker for a multiple object transfer.
* Use the APPACK multiple exchange services to loop through the supplied list of objects, interacting with each one to retrieve its contents.

(d) Terminate the operation.

If the operation is a COPY or a SHARE, call APopfinish() to terminate the operation.

If the operation is a MOVE, the object manager should keep the operation alive until:
* The user performs an operation that supersedes a possible UNDO of the MOVE, in which case the object manager calls APopfinish() to terminate the operation and inform the consumer that an undo is no longer possible.
* The user requests an UNDO of the operation, in which case the object manager communicates with the consumer to retrieve the moved data and thereby reverse the MOVE operation.

15.2.3 Processing UNDO after an Interobject MOVE Operation

In order to undo an interobject MOVE operation, both the source and destination object managers must keep the operation active until an UNDO is requested or the operation is no longer reversible (e.g., superseded by another operation). While an interobject (external) MOVE is still active, an object manager does the following:

If an UNDO event is received from the user, send a MOVE UNDO request to the other object manager and proceed to reverse the MOVE.

If a MOVE UNDO message is received from the other object manager, proceed to reverse the MOVE.

If the user performs an operation which supersedes the external MOVE as the current reversible operation, call APopfinish() to terminate the operation.

If an operation termination message is received, then call APopfinish(). Now only one side of the MOVE can be undone. If a user UNDO event is subsequently received before the MOVE has been superseded, the user is warned that only half of the MOVE can be undone and prompted for confirmation.

16 DATA INTERCHANGE (FIG. 9)

As will be described in the following descriptions of data exchanges, the exchange of data between objects depends upon the types of data in the source and destination objects. If the data types are identical or sufficiently close, the data may be exchanged directly and used directly in the destination object with little or no conversion of the data and little or no loss of information. If the data types are sufficiently different, however, the conversion may be difficult or it may be that the data may not be used directly in the destination object, that is, as an integral part of the destination object's data. In this case, there may be some loss of information and the source object's data, as will be described, must be "fitted into" the destination object's data as best as possible.

Data exchanges between objects can be assisted by an APPACK facility referred to as the "matchmaker". The matchmaker enables two object managers to determine that they are matching ends of a data exchange operation. As part of the source and destination object managers' interaction with the matchmaker these object managers indicate to the matchmaker the formats or forms in which the objects may provide and accept data. These formats and forms may include the native data types of the objects. The object managers for the respective objects may also have the capability to perform certain data conversions and may accordingly provide or accept data in other formats and forms than their native formats. A data format for the exchange will be agreed upon through a dialogue between the source and destination object managers and the matchmaker, and the exchange executed in the agreed upon format with whatever data conversions are required by either object.

In a data exchange across a link, the data type in which the child object's data is to be provided will be recorded in the interchange type field of the link's link parallel file entry 408 for subsequent use by the child object 404 in subsequent data exchanges for that particular link. Although the matchmaker may be involved in a share operation that initially creates a link, the matchmaker is not involved in link update operations.

Figure 9:
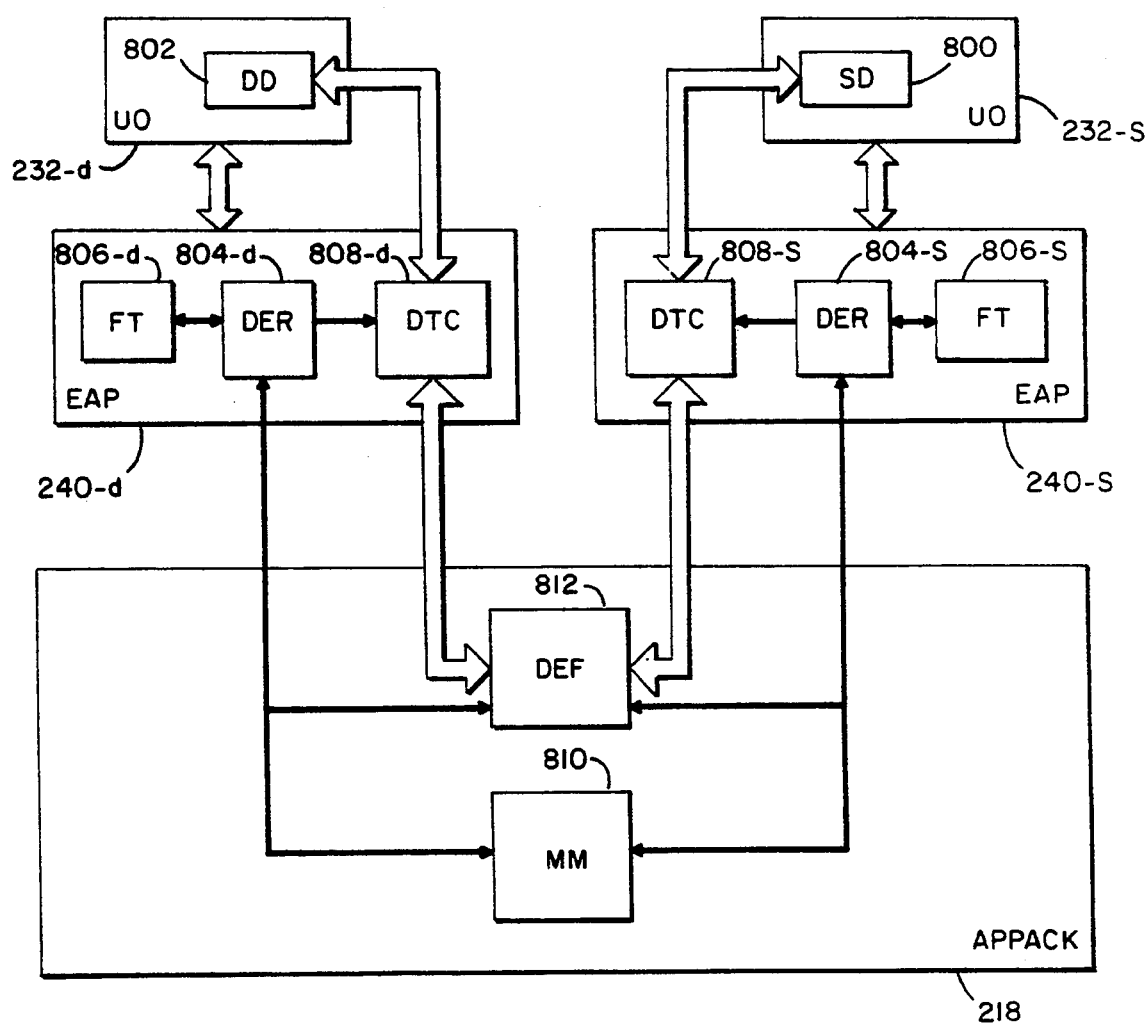
FIG. 9 is a diagrammatic representation of a data exchange of the present invention, including a matchmaker of the present invention.

Referring to FIG. 9, therein is presented a diagrammatic representation of a data exchange of APPACK 218 wherein data is to be moved, copied or shared from a source object to a destination object. Therein is represented a source user object 232-s and associated object manager program 240-s, a destination user object 232-d and associated object/manager program 240-d, and Applications Pack (APPACK) 218. User object 232-s is represented as containing source data 800, which is the data to be copied, moved or shared to user object 232-d, while user object 232-d is represented as containing destination data 802, which represents both the site which the exchanged data is to occupy in user object 232-d and the exchanged data itself.

Referring to object/manager programs 240-s and 240-d, each of these object/manager programs 240 is represented as operating upon their respective user objects 232. The executable code of each object/manager program 240-s is represented as including a module containing data exchange routines 804-s, an associated format table 806-s, and a module containing data transfer/conversion routines 808-s. Likewise, object/manager program 240-d includes a data exchange routine 804-d, a format table 806-d and data transfer/conversion routines 808-d.

Now considering the operation of a data exchange, it was described above that a data exchange may be used in data copy and move operations as well as in data sharing. It should first be noted that all of these operations are, in many respects, very similar. The primary differences between the operations, which will be described in further detail in a following further description of copy, move and share operations, are in the manner in which the operations are initiated and in the manner in which the data is handled after the operation.

In this latter regard, all three operations, that is, copy, move and share, may be regarded as being essentially copy operations. That is, in each operation certain data is identified and copied from a source object and placed in an identified location in a destination object. The move operation differs from the copy operation in that the data in the source object is deleted at the end of the operation, that is, the data is copied from the source object to the destination object and the original copy of the data in the source object is deleted. The share operation is again similar to a copy operation except that a new copy of the data from the source object is made and placed in the destination object each time the link is updated, as previously described.

With regard to the initiation of a data exchange operation, the first steps are the initialization of the operation, the identification of the location where the data is to appear in the destination object, and the identification of the data to be exchanged in the source object. As will be described, copy, move, and share operations are typically initiated manually by the system user, usually by a menu pick or by a command entered through the keyboard. The sequence of identification of the source object data and the destination object location for the data then depends upon whether the operation is a "from" or "to" operation, with the user's view of the operation moving between the source and destination objects are required by the sequence of the operation (i.e., the user can first identify the source data or the user can first identify the destination location).

Further, data exchanges across a link are also initiated upon the occurrence of a link update, that is, either upon command of the user if manual update has been chosen or upon display or printing of the portion of the destination object containing the linked data if automatic update has been chosen (in addition to the update that occurs when a share operation initially creates the link).

In connection with the user's selection of data in the source object and identification of a location in a destination object where the data is to go, source and destination object managers will have been invoked.

The source and destination objects must then exchange the data from the source object to the destination object, which is the subject of the present description. The present description illustrated in FIG. 9 assumes that the user's actions (i.e., identifying the destination location) have already been performed.

Upon the initiation of a data exchange operation, the source and destination object's object managers call their respective data exchange routines 804, which are comprised of a group of routines for directing and controlling data exchange operations. There is a data transfer/conversion routines module 808 and a format table 806 associated with each data exchange routine 804. The data transfer/conversion routines 808 is comprised of a group of routines for transferring data between the object and APPACK 218's data exchange facility 812, that is, for reading and writing data from and to the object. A data exchange facility 812 may also include data conversion routines for converting data between the object's native data format and certain foreign data formats. The format table 806, in turn, contains a listing or table of all data formats which may be generated or accepted by the corresponding object, that is, by the data transfer/conversion routines 808 of the object's object/manager program 240. These formats will include at least the object's native data format and may include certain foreign data formats.

The data exchange routines 804 of each object manager provides matchmaker 810 with information from its associated format table 806 describing the various data formats which the data exchange routines' 804 associated data transfer/conversion routines 808 may accept or provide. These formats are presented in order of desirability and the matchmaker 810 selects a common data format for the exchange. The matchmaker 810 returns the selected data format for the exchange to the data exchange routines 804 and the transfer of data then occurs.

The next step in the exchange is the actual transfer of data from the source object to the destination object. The transfer is executed in a stream mode, that is, the transfer of an essentially unlimited stream of bytes of data wherein the bytes are not distinguished from one another by the transfer operation. That is, any significance to the bytes of the stream are determined by the exchange format rather than by the exchange operation itself.

To perform the data stream transfer, each data transfer/conversion routines 808 performs a series of "get" and "put" operations between its respective user object 232 and the data exchange facility 812 of APPACK 218. That is, data transfer/conversion routines 808-s "gets", or reads, a sequence of bytes of data from source data 800 and "puts", or writes, the fetched byes of source data to data exchange facility 812, performing any necessary data conversion operations as the source data is "gotten" from source data 800. Data transfer/conversion routines 808-d concurrently "gets", or reads, the bytes of source data from data exchange facility 812 and "puts", or writes, the bytes of source data into destination data 802, again performing any necessary data conversion operations as the data is "put" into destination data 802. In this regard, it should be noted that data exchange facility 812 is comprised of a set of registers and routines comprising a data channel for accepting data from a source, such as data transfer/conversion routines 808-s, and transferring the data to a destination, such as data transfer/conversion routines 808-d.

It should be further noted that the operations of data transfer/conversion routines 808 support the inclusion of embedded data of various types, such as link markers. The convention adopted for stream transfers is that there is an initial interchange type or data format for the stream. If another data type is to be inserted into the stream, such as a link marker or linked data, an indicator code indicating the change of data type and the new format is inserted into the stream and the appropriate data transfer/conversion routines 808 data format conversions facilities called to switch the operations of the data transfer/conversion routines 808 to the new data type. The same operation is used when the data type changes again, for example, at the end of the inserted portion of the data stream, and the data transfer/conversion routines 808 revert to the original data type.

Finally, it is apparent from the above that the data exchange formats are central to all types of data exchange, whether for link, move, or copy operations or for any other type of data exchange which may be conceived. As described above, once two object managers agree upon a common data exchange format the source object manager converts the source data from the source object internal data format to the exchange format, if necessary, and transmits the data to the destination object manager in the exchange format. The destination object manager receives the data and, if necessary, converts the data from the exchange format to the destination object internal data format, that is, internalizes the data to the destination object, and places the data in the destination object. It is further apparent that the complexities, "richness" and compatibilities of the formats involved in the exchange determine the complexity or ease of the exchange and the potential for information loss or distortion, if any.

Each object manager is allowed to determine the data format or structure with which it will operate internally. This permits the most powerful and efficient implementation of each object manager. An object manager will not typically use a system-defined data format for its internal use.

It is apparent from the above that any given pair of internal data formats may have different attributes and that the choice of an exchange format for a given source data format and a given destination data format directly effects the speed, efficiency and accuracy of a data exchange, including the potential for information loss or distortion. Retention of data content, that is, the ability to represent or translate the attributes of a given data format, is one of the most critical factors for the system user in accomplishing a data exchange and it is therefore important that each exchange be performed with the exchange format providing the highest possible retention of data content, that is, the exchange format best able to accommodate the attributes of both the source and destination internal data formats. As such, each object manager should support as high of levels of exchange formats as possible and should support as many exchange formats as possible. This will increase the probability that the most efficient possible exchange format is available for each given exchange and will increase the number and range of object managers that a given object manager may exchange data with at high levels. This will also increase the degree of integration between object managers and between object managers and the system.

Exchange formats are structured into three levels. The distinction between exchange format levels is based upon the degree of retention of data content achieved in the exchange, that is, upon the degree to which the exchange can support the different attributes of the source and destination internal data formats. The three format levels are respectively designated, in order of increasing level of data and attribute retention, as the "vanilla" format, the "category-specific" format, and the "private" format.

First considering the "vanilla" data exchange formats, these formats are intended to provide data exchanges between the full spectrum of data types which may appear in the system, but at such a level that the data exchanges are not excessively complex. In essence, a "vanilla" format is a generic data exchange format which represents the lowest common denominator of all data types which may appear in system, such as ASCII or binary files. That is, a generic format supports the greatest common set of internal data attributes for the greatest practical number of different internal data formats. These generic exchange formats are intended to be used when the data types associated with two object managers are of fundamentally different types, that is, wherein the internal data formats do not have a significant degree of commonality in their attributes. Examples would be exchanges between a graphic type object and a document type object, or between a spreadsheet or database type object and a document type object, or between a spreadsheet or database type object and a graphic type object.

In these cases, the internal representations of the data and the user models of the data are such that high level exchanges are simply not practical because the destination object cannot interpret or represent more than a relatively small subset of the source object data representation, that is, of the attributes of the source object data. It should be noted, however, that the generic formats are designed to support as great a range of data content and attributes as possible within the inherent limitations of the data types. In this regard, there may be cases where the generic formats may contain more information than can be accepted by the destination object. The generic formats have been designed, however, to allow the destination object's object manager to ignore those portions of the data content which it cannot use or interpret, thereby allowing each destination object to make the maximum possible use of the data provided to them.

Examples of vanilla exchange formats presently defined include a defined record format, an undefined record format, a text format, a picture format, a link format, and a sound format. Considering each of these generic formats in turn, the defined record format allows the definition of a record structure, including fields which may contain a variety of types of information, primarily numeric and textual. This format is not intended, for example, for detailed database conversions or spreadsheet formula exchanges, but to allow the transfer of meaningful information between record oriented object managers.

The undefined record format is a variant of the defined record format described above but does not include record descriptors, so that the contents of each record may vary from record to record. This undefined record format is defined as distinct from the defined record format because certain object managers may wish to refuse data in an undefined format.

The text format is intended to provide a simple representation of textual data, such as in an ASCII string format, but allowing the inclusion of some text attribute information and simple formatting information. In addition, a text format may be included, for example, as the contents of a field in a defined or undefined record format.

The picture format is intended to allow an object manager to provide a displayable "entity" which can be displayed by a destination object having little or no graphics capability. In the case of graphics data linked into a text object, for example, the graphic "entity" could be stored in the linked data copy 458 of the link parallel file entry 408 and represented in the destination text object by an icon or title, thereby not actually being present as graphics data in the text object itself. The graphics data would then be read from the linked data copy 458 for display when the portion of the text object "containing" the graphics data was to be displayed. The intent of this type of format is to provide a graphics display capability having a reasonably complete visual content but without semantic content or the capability of editing the graphics data.

The link format is intended to allow object managers to exchange links, as previously described with reference to the copying and moving of links. The link format is essentially a representation of the link structures described previously.

The sound format is intended to be similar to the picture format, but providing for the exchange of sound data, such as voice messages, rather than graphics data. Again, this format is intended to provide a capability of exchanging and "playing" sound data with a reasonably complete audio content, but without semantic content or the capability of editing the sound data.

Now considering category-specific formats, the "category specific" exchange formats are intended to provide data exchanges of significantly greater content and significantly greater retention of data attribute between objects having similar data models but different internal data storage formats. For example, different spreadsheet objects will have similar data models but may have very different internal data representations. As such, two different spreadsheets may perform a data exchange with significantly greater content than with a generic format, but could not exchange data directly in their internal data formats.

Each category-specific exchange format contains data and descriptive information which is meaningful to all object managers in the category which uses that category-specific exchange format. In this regard, the definition of a category is that a category is a group of one or more object managers which agree to provide, or to accept, or to both provide and accept data in a given category-specific format.

The number of possible category-specific exchange formats is essentially unlimited and new categories with new category-specific exchange formats may be created at will. For example, if it is found that it is necessary or desirable for two different object managers to exchange data with greater content than a generic format, then a category-specific format may be created for those object managers, thereby defining a new category. Any number of other, different object managers may then chose to use the new category-specific exchange format and thereby become members of that category. It should be noted, in this regard, that any given object manager may be a member of any number of categories.

Examples of category-specific formats defined may include the Wang Information Transfer Architecture (WITA) format, the database format, the spreadsheet format and the graphics format. Again considering each of these formats in turn, the WITA format is a further development of the WITA data exchange architecture developed by Wang Laboratories, Inc. of Lowell, Mass. In the present system, the WITA format is intended for use by document and text editors in exchanging primarily textual data containing extensive formatting information, and possibly links to other objects of various types. The WITA is also particularly suitable for converting textual and formatting information from one document type to another and is used for general data communication.

The database exchange format is intended for use by database type object managers. This format is intended for use in exchanging all conceivable database types of data, including, for example, database definitions, record structures, data records with information about connections between records, calculated and formula fields and links. The database format may also be used, for example, in converting and communicating certain types of document and spreadsheet objects.

The spreadsheet exchange format is intended for use by spreadsheet type object managers. Spreadsheet data to be exchanged or converted in the spreadsheet exchange format include all types of spreadsheet type data, including, for example, row, column and cell definitions, formulas and text and data fields.

Finally, the graphics exchange format is intended for use by graphics type object managers. This format is intended for use in exchanging all conceivable graphics types of data, including, for example, all forms of graphics data in bitmapped, vector, and "object-based" graphics and pictorial information. (It should be noted that the term "object" is used here in the graphics related sense rather than in the sense used in the remainder of the present description.)

Finally, "private" exchange formats are used in data exchanges between data objects using having exactly the same data structures and formats. In these cases, each of the object managers taking part in the exchange will know exactly what the internal data representation and attributes of the other object manager are and will accordingly know how to package and communicate the data so as to retain the maximum data content. Because of the requirement that the data structures be essentially identical, private exchange formats will therefore most generally be used for data exchanges between data objects created by the same object manager.

In private exchange formats the object manager is completely free to define its own private exchange format because there is no requirement to be compatible with any other object manager's internal data structure. An object manager having a private exchange format may, however, publish that private format and other object managers may choose to use that private format, thereby creating a new category-specific exchange format. Because the private format is closely defined by the object manager's internal data structure, however, making the private format into a category-specific format may restrict the extent to which the object manager may subsequently alter its internal data structure.

It should be noted that a given object manager is not required to use a private exchange format to communicate between its data objects, but may choose to use a category-specific format or even a generic format is these formats are adequate for the exchanges. In addition, any given object manager may concurrently have a private exchange format, belong to any number of categories and use the corresponding category-specific formats, and use generic formats.

Lastly, it should be noted that for each interchange format, whether generic, category-specific, or private, there may be any number of interchange options wherein each option will define how the data is to be arranged and how the data exchange is to take place. There may be options for the destination object manager to define and options for the source object manager to define. Which options are selected for a given exchange are defined by the source and destination object managers at the time the exchange takes place and all object managers which use a particular exchange format are expected to honor its options as much as possible.

17 RESOURCES

As described previously, an object manager may be regarded as being comprised of executable code and of data which is used by the program. Examples of such data may include icons, language dependent text, messages, text fonts, forms, date and time presentation formats. The present system provides "resources", which can be used to store data that one might desire to change or share separately from the program's code. A resource is therefore a means for storing such program data separately and independently from the program with which it is associated.

The placing of data in resources allows the information therein to be customized or changed without affecting the program's executable code. By this means, there may exist many versions of a given program wherein the executable code of the program is the same for each version and only the program data residing in the associated resources is different from version to version. In addition, the use of resources allows object managers and other programs to share common program data, thereby reducing the sizes and memory requirements of the individual programs.

17.1 Resource Files

Resources are typically stored many to a resource file. A resource file is a type of object. Resources will be grouped into resource files based on their intended uses. A program using resources may have a plurality of resource files open at one time. When a resource is requested, that program's currently open resource files are searched for a resource having the requested Resource ID. Thus, depending on which resource files a program opens, different resources can be used.

The following example illustrates some of the issues involved in grouping resources in files. One resource file might contain all of the user prompts specifically directed to spreadsheet operations in English. A second resource file might contain these prompts in French. Third and fourth resource files might contain general purpose prompts in English and French, respectively. A spreadsheet object manager would typically have open two of these resource files: the first and third for and English-speaking user; the second and fourth for a French speaking user. A document object manager might also open either the third or fourth resource files along with a resource file containing resources specific to document operations.

A Resource ID is unique within a resource file, but need not be unique across different resource files. Some ranges of Resource IDs are allocated to have fixed definitions; in other words, although there may be more than one resource having the same ID (e.g., one in a file of English-language resources and another in a file of French-language resources), all resources sharing one of these fixed definition Resource IDs will be for the same purpose (e.g., the same prompt). Other Resource IDs may be used by different programs for completely different purposes; a file of spreadsheet-related resources may use the same Resource IDs as are used in a file of database-related resources.

Each resource file is organized in three sections: indexing information, resource data, descriptive information.

The indexing information is stored at the front of a resource file. This includes the information necessary to determine whether a desired resource is located in the file. This index is organized as a series of arrays, each array including entries corresponding to a cluster of sequential Resource IDs. Each entry in the index portion of a resource file includes:
 the size of the resource,
 the resource's location within the resource file,
 resource type code, and
 flags, including a flag indicating whether the corresponding resource can be customized.

The resource data portion of a resource file may store resources an any order (the location of each of the resources is indicated in the index portion of the file). It may be desirable to store in physical proximity to each other resources that are likely to be used together; this may increase the likelihood that a requested resource will already be in main memory, reducing disk accesses.

The descriptive information is optional. It can include a text name for the resource, a text description of the resource, and a literal.

The literal (which may optionally be present) is used to match symbols in the source code of programs that reference resources with Resource IDs. This enables program source code to refer to resources with symbols that may be chosen for their mnemonic value and be independent of the numeric value of the Resource ID. A utility program reads resource files and creates program header files. For each resource for which a literal is defined in the resource file, an entry appears in a header file that defines that literal to be a symbol whose value is the corresponding Resource ID. Thus, a program that includes one of these mechanically generated header files, can use the literals, rather than Resource IDs to identify resources.

Figure 10A:
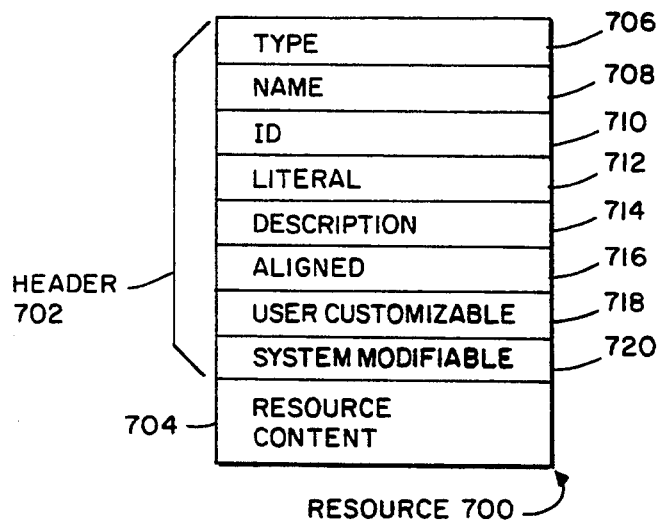
FIGS. 10A and 10B are diagrammatic representations of a resource and a resource editor of the present invention.

17.2 Resources (FIG. 10A)

Referring to FIG. 10A, therein is presented a diagrammatic representation of a resource 700 which is representative of all resources in the system. All resources 700 share a common structure comprised of a header 702, containing the information through which the system locates and accesses resources 700 through the routines of RESPACK 222, and a resource content 704 containing the actual resource data. As will be described below, there are certain defined types of resources wherein the internal structure of the resource contents 704 is determine by the type of the resource, although the information contained therein is determined by the editor which created the resource. There is also a free form resource type wherein both the contents and internal structure of the resource contents 704 is determine entirely by the editor that created the resource.

While the structure and content of the resource contents 704 of the various types of resources differs depending upon the type of resource 700, the header 702 of all resources 700 is uniform in structure and content. As indicated, header 702 includes a type field 706, a name field 708, an identifier field 710, a literal field 712, a description field 714, and three flag fields respectively designated as aligned flag field 716, user customizable flag field 718 and system modifiable flag field 720.

Type field 706 contains an identifier of the type of resource contained in the particular resource 700, for example, whether the resource is a form, message, pull-down menu, icon, window structure, or byte string of, for example, text or data. In this regard, a form is typically a representation of a screen, that is, a CRT display, containing informative or definitive text fields and, in many cases, and fields which may be filled in by the user. A message in turn may be a means for presenting information to the user, such as notice of events or actions to be performed by the user, and may be graphic, textual or audible. A menu is, as well known, a means for allowing a user to make a selection among a defined plurality of possible of actions or things. A pull-down menu is implemented such that the menu is displayed only when required, that is, either by choice of the user or upon determination by an object manager that a menu display is appropriate. "Pull-down" merely means that the menu apparently drops from the top of the screen. An icon is a graphical representation taking the place of a text string and may be used in almost any place where text would be used to present a message, represent an action or choice, or identify some thing. A window resource is a parameter block describing a window, that is, a defined portion of a screen containing a visual representation to the user, and is used by a "pack" to generate the corresponding window to be displayed to the user.

Other defined resource types may include font resources defining type fonts, language rules resources defining the syntactical and grammatical rules of particular languages, and keyboard translation table resources which define the functions and uses of the various keys of a keyboard. Finally, a byte string resource is a free-formatted byte string provided for storing any resource not within one of the above defined types. In this type of resource, the interior structure of the information is determined completely by the editor creating the resource.

Name field 708 is used to assign an optional identifying name to the resource 700. The name residing in name field 708 may be used, for example, to access the resource 700 through a command language.

Identifier field 710 contains an identifier which is used by RESPACK to access the resource when the identifier is referenced by a program's executable code. When a program needs a resource, the program passes the resource ID to a RESPACK routine (e.g., RESget()). Using the resource identifier, the RESPACK routine in turn locates the resource in one of the currently open resource files and provides the resource to the program.

The identifier residing in identifier field 710 need be unique only within the file in which the resource is grouped. Typically, the identifier will be unique within the sets of resource files open when the resource is to be used.

Literal field 712 contains a text string which is used as a label to refer to the resource ID of identifier field 710 within the source code of the program that uses the resource. The resource editor in turn provides a function to generate an "include" file corresponding to a given resource file.

Descriptor field 714 contains a text string which comprises a displayable description of the resource. The descriptor text string may be displayed in, for example, the index of resources in the resource editor and, for those users or object managers using the resource, the user or program profile.

Finally considering the flag fields of header 702, aligned flag field 716 contains a flag which when set causes the resource to be aligned on a block boundary within the resource file. In the present system, it is the default that newly created resources will not be aligned on block boundaries. Alignment may, however, be advantageous for certain resources, such as fonts, or desirable for efficiency if the resource file is large and contains many resources or if the resource itself is large.

User customizable flag field 718 and system modifiable flag field 720 are similar in that both contain flags indicating whether and by whom customized copies of the resource may be created. User customizable flag field 718 indicates whether the user may create a customized copy of the resource. System modifiable flag field 720 is similar but indicates whether the system administrator will be able to customize the resource in the system profile.

As described above, resource content 704 contains the actual resource data wherein the structure of the resource data is determined by the type of the resource. Further in this regard, it should be noted that a given resource may be comprised of one or more other resources. That is, the resource contents 704 of a resource 700 may include references, that is, the identifiers 710, of a plurality of other resources 700, thereby incorporating those other resources 700. For example, a form type resource may be comprised of groups of fields wherein each group of fields is a resource 700. Each group of fields, that is, each of the resources 700 defining a group of fields, may in turn be comprised of further fields or groups of fields and these fields in turn may include the references, that is, identifiers 710, identifying message type resources.

There are a plurality of types of resources and the structure and contents of the resource content 704 portions of a given resources 700 will depend upon the type of the resource. The header 702 portions of all resources 700, however, are uniform in structure and content and, through the type field 706, determine the types of the resources 700. Once the header 702 of a resource 700 is defined, therefore, the contents of the resource content 704 may be defined.

Figure 10B:
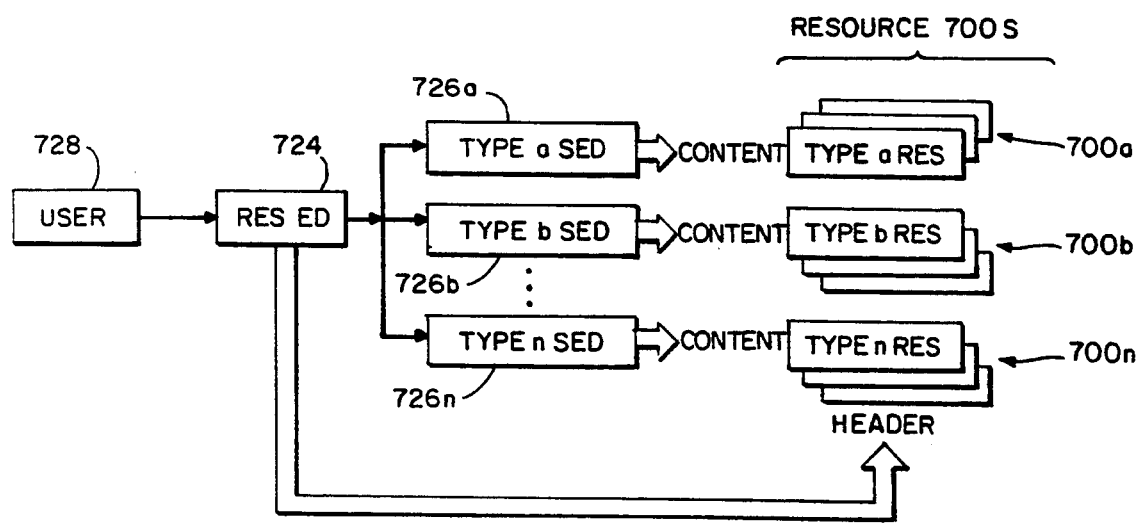
Figure 10C:
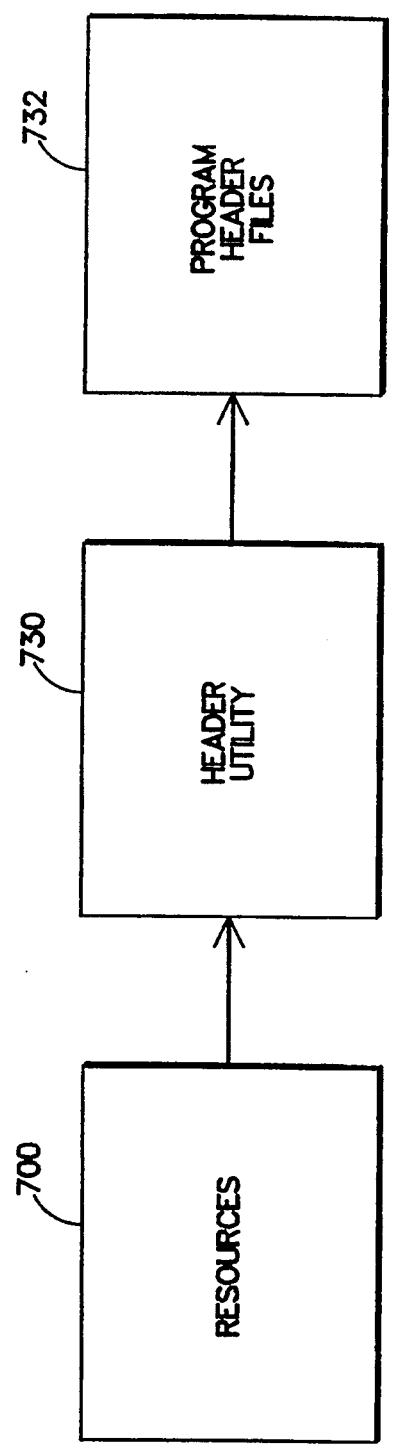
FIG. 10C illustrates the relationship between a utility program and the data with which it operates; the utility program creates program header files based on information in resource files.

17.3 Resource Editor (FIG. 10B)

Referring to FIG. 10B, therein is illustrated the structure and operation of the present system's resource editor for use in creating and editing resources 700. Therein is represented a plurality of resources 700 grouped by resource type and respectively designated as type-a resources 700a, type-b resources 700b, and so on, to type-n resources 700n.

The resource editor 722 is comprised of a main resource editor 724 and a plurality of type-specific sub-editors 726. There is a type-x sub-editor 726 for each resource type and the type-x sub-editors 726 illustrated in FIG. 10B are accordingly designated to correspond to the illustrated resource 700 types as type-a sub-editor 726a, type-b sub-editor 726b, and so on, to type-n sub-editor 726n.

As indicated, main resource editor 724 provides the primary interface to the user 728 and contains facilities for creating resources 700 and for defining and editing the header 702 portions of the resources 700. Main resource editor 724 is not used directly to edit and manage the resource contents 704 of the resources 700 but, once a resource 700 has been created and the header 702 thereof defined and edited, invokes a corresponding one of the type-x sub-editors 726 and provides an interface to the invoked type-x sub-editor 726. The invoked type-x sub-editor 726 is then used to define and edit the resource data residing in the resource content 704 portion of the resource 700.

The resource editor 722 uses many calls to RESPACK functions, which are responsible for accomplishing much of the actual resource manipulation. Other programs can create and modify resources by means of calls to RESPACK functions; however, the resource editor 722 is the primary means for creating and modifying resources.

18 RESOURCE CUSTOMIZATION

18.1 General Customization by Means of Customized Resources

In the present system, many different aspects of system behavior can be customized for individual users by use of single mechanism that automatically substitutes a customized resource for the original resource, as appropriate.

In the design of programs having customizable features, the program is arranged to use one or more resources to store data about each customizable feature. When a user changes a feature, a customized version of the corresponding resource(s) is created and stored in that user's User Profile. Thereafter, the feature appears for that user in customized form, while it appears for other users in the original form. This effect is accomplished by a mechanism that is independent of the program exhibiting the customization. In other words, when a program exhibiting customization is performing operations that involve possibly customized characteristics, there is no need for that program to concern itself with whether or not there has been customization. This is because customization of general characteristics is accomplished by use of customized resources. RESPACK will automatically effect the only changes needed, that is, RESPACK will automatically substitute customized versions of resources at the appropriate times (i.e., when an appropriate one exists in the current user's User Profile).

When RESPACK retrieves a specified resource (e.g., in response to a RESget() call), it searches indexing information in the currently open resource files for an entry corresponding to the Resource ID of the specified resource. If a there is a current Customization ID (i.e., as set by calling RESptcustid()) and if the Customization Flag in the entry indicates that a customized version of the resource could exist, then RESPACK determines whether the user's User Profile includes a customized resource with the specified Resource ID and the current Customization ID. RESPACK will retrieve the customized resource, if one exists, or will retrieve the resource in the resource file in which an appropriate entry was found.

18.2 Customization IDs

When a user customizes a resource a new version of the resource is created. This customized copy of the resource is stored as part of that user's User Profile. Each customized copy of a resource has associated with it a Customization ID and a Resource ID. The Resource ID is the same as that of the resource that was customized. The Customization ID is assigned by the program by which the user made the customization.

The Customization ID is not unique to any one customized resource; the same Customization ID will be used for group of resources for which the same scope of customization is desired. Typically, there will be a single Customization ID associated with each object type, this way all of the object managers for a type of object will all manifest the same user customizations. However, if it is desirable for a particular program to provide for customizations that appear only with that single program, there can be one or more separate Customization IDs associated with that program.

The following example illustrates the use of Customization IDs. Initially, a resource might be used by many different object managers (e.g., all spreadsheet object managers and all document object managers. A user might use the customization capabilities of a document object manager to customize the resource, creating a modified copy of the resource. This customized copy would be associated with a customization ID characteristic of document object managers. Whenever operating on documents, the customized version of the resource would be used. Whenever operating on spreadsheets, the original version of the resource would be used, because the spreadsheet object managers would use a different Customization ID.

19 APPACK FUNCTION CALLS

The following will provide detailed descriptions of some of functions provided by the Application Pack (APPACK). This will both illustrate the concept and use of "packs" to those of skill in the pertinent areas of the art and will provide further details of the previously described features and operations of present illustrative system.

19.1 Invocation Services

19.1.1 APrqstart()—Issue A Start Request

This function will invoke the application specified by a given link and send a START request to it. There are no request options for this request. When the invoked application calls APinit() it will receive the link and the optional link specification. This function expects a reply from the invoked application, and will return when the reply is received. It will not establish communications with the invoked application.

Input Parameters

Pointer to the object ID of the parent object for this link.

ID of the link to the object which is to be invoked. If this value is zero, the object identified by the pointer to the object ID will be invoked directly.

Length of the link specification, or zero if none is being provided.

Pointer to the link specification to be sent to the invoked application with the link, if desired. This can be obtained by calling LKFgtspec(), if the link has associated data. If this pointer is NULL, no specification will be sent.

Output Parameters
None

19.1.2 APrqedit()—Issue An Edit Request

This function will invoke the application specified by a given link and send an EDIT request to it. There are no request options for this request. When the invoked application calls APinit() it will receive the link and the optional link specification. This function expects a reply from the invoked application, and will return when the reply is received. It will not establish communications with the invoked application.

19.1.3 APrqread()—Issue A Read Request

This function will invoke the application specified by a given link and send a READ request to it. There are no request options for this request. When the invoked application calls APinit() it will receive the link and the optional link specification. This function expects a reply from the invoked application, and will return when the reply is received. It will not establish communications with the invoked application.

19.1.4 APrqrun()—Issue A Run Request

This function will invoke the application specified by a given link and send a RUN request to it. There are no request options for this request. When the invoked application calls APinit() it will receive the link and the optional link specification. This function expects a reply from the invoked application, and will return when the reply is received. It will not establish communications with the invoked application.

19.1.5 APrqcreate()—Issue A Create Request

This function will invoke the application specified by a given link and send a CREATE request to it. It is assumed that the link is to a newly created object. Besides the link, the caller must provide a list of data type specifications for links which can be accepted from the server application. Only qualified link data types should be provided. When the invoked application calls APinit() it will receive the link and the data type specification. This function expects a reply from the invoked application, and will establish communications with it. This function will return when either a negative reply is received, or communications are successfully established. After making this call, the application should proceed with the remainder of the object creation protocol.

19.1.6 APrqchangelink()—Issue A Change Link Request

This function will invoke the application specified by a given link and send a CHANGE LINK request to it. It is assumed that the link is to an existing object. Besides the link, the caller must provide a list of data type specifications for links which can be accepted from the server application. Only qualified link data types should be provided. When the invoked application calls APinit() it will receive the link, the optional link specification, and the data specification list. This function expects a reply from the invoked application, and will establish communications with it. This function will return when either a negative reply is received, or communications are successfully established. After making this call, the application should proceed with the remainder of the change link protocol.

19.1.7 APrqprint()—Issue A Print Request

This function will invoke the application specified by a given link and send a PRINT request to it. Besides the link, the caller must provide a number of request options, indicating the manner in which the request is to be performed. When the invoked application calls APinit() it will receive the link, the optional link specification, and the request options. This function expects a reply from the invoked application. Communications will be established if the print request mode is anything other than PRINT INTERACT. This function will return when either a reply is received or communications are successfully established, depending on the print request mode.

19.1.8 APrqupdate()—Issue A Link Update Request

This function will invoke the application specified by a given link and send a LINKUPDATE request to it. There are no request options for this request. When the invoked application calls APinit() it will receive the link and link specification. This function expects a reply from the invoked application, and will establish communications with it. This function will return when either a negative reply is received, or communications are successfully established. After making this call, the application should proceed with the remainder of the update link protocol.

19.1.9 APrqcopy()—Copy An Object

This function will copy the object specified by a given link or object ID. If so requested, a link to the newly created copy will be established from the specified parent. The new object can be created in one of three locations—in a location specified by the caller, near the parent, or near the original object. If the object has links to other objects, any of the child objects whose links bear a set copy state flag will also be copied. If so indicated in the object type definition, an object manager will be invoked to perform the actual copy operation, though the caller of APrqcopy() will not be aware of this.

19.1.10 APrqdeletelink()—Delete A Link

This function will delete a link from a specified parent. If the child object has no more parent links after the deletion, the child object itself will be deleted. If so indicated in the object type definition, an object manager will be invoked to perform the actual object deletion operation, though the caller will not be aware of this.

19.1.11 APrqrelocate()—Relocate An Object

This function will move the object specified by a given link or object ID to a specified physical location. All links to and from the relocated object will be adjusted so that other parents and children of this object will be able to find it. If so indicated in the object type definition, an object manager will be invoked to perform the actual relocation operation, though the caller will not be aware of this.

19.1.12 APrqimport()—Import A Foreign Object

This function will create an entry in the object catalog for a file which has been created outside of the APPACK object environment. The function will return a valid OBJID which can be used with OBJPACK to add information to the object record. If so indicated in the object type definition, an object manager will be invoked to perform the actual object record creation operation, though the caller will not be aware of this. This function will not create a link to the new object.

19.1.13 APinvoke()—Invoke An Application

This function will invoke the manager for the specified object and send the given request to it. The application will be given the link, any associated link specification, and caller-supplied request options. The caller can also ask to wait for a connection to be established with the invoked application for further communications.

The function will return when the application has been started and has acknowledged the request.

Note that this function should be called only when special interactions between programs are required. Most invocations of other applications should be performed by use of the standard request functions.

Input Parameters

Pointer to the object ID of the parent object for this link.

ID of the link to the object which is to be invoked. If this value is zero, the object identified by the pointer to the object ID will be invoked directly.

Request code to be sent to the invoked application. This code must not conflict with any of the standard request codes.

Reply flag: TRUE if a reply is expected from the invoked application, FALSE if not. If TRUE, the function will wait until a reply has been received from the newly started application, successful or not.

Connect flag: TRUE if communications with the invoked application is desired, FALSE if not. If TRUE, the function will wait until a connection has been established, or until a negative response to the request is received.

Length of the link specification, or zero if none is being provided.

Pointer to the link specification to be sent to the invoked application with the link, if desired. This can be obtained by calling LKFgtspec(), if the link has associated data. If this pointer is NULL, no specification will be sent.

Length of the request options to be sent along with the request, or zero if none are being provided.

Pointer to the request options to be sent along with the request. If this pointer is NULL, no options will be sent.

Pointer to a list of pointers to text strings to be passed to the new application as its 'environment' parameter. The list should be terminated by a NULL pointer.

Output Parameters

Pointer to a variable to receive an APOPID (APPACK operation ID), to be used for further communications during this operation. If no communications are expected or desired, this pointer should be NULL.

19.2 Operation Support

19.2.1 APinit()—Initialize Application Request Processing

This function initializes APPACK communications, so that the caller can process a startup request, perform matchmaker operations, or start other applications. It must be called before any other APPACK services are used. It will interpret the startup request sent to an application which has been invoked by the Application Manager, and return the contents to the caller. The function will return an operation ID to be used for further processing of this request. If the caller was not invoked by the Application Manager, the request code returned will be NONE, and no APOPID will be returned.

In addition to the request itself, this function will return any link associated with the request, and any request-specific options supplied with the request. The application is expected to call this function during its initialization, and should do so before performing any user-visible operations, in case the request is for non-interactive processing.

Input Parameters

None

Output Parameters

Request code issued by the invoking application. If the calling program was not invoked by the Application Manager, this value will be NONE.

Reply flag for this request—TRUE if a reply is expected, FALSE if not.

Connection desired flag for this request—TRUE if communications are desired, FALSE if not.

APOPID to be used for further activities during this operation. This ID should be presented to APreply() if issuing a reply.

Type of object specified by the provided OBJID, or zero if no object name is associated with the request.

Object ID of the object on which the request is to be performed. This field will not be filled in if the object type field is zero.

Pointer to a block of data containing attribute information from the object catalog record describing the specified object, allocated from the default heap. This pointer can be passed to OBJPACK to extract specific information about the object. When no longer needed, the space allocated for this block should be returned to the heap by calling HPfree(). A NULL pointer indicates that no object data has been provided.

Length of the link specification sent by the invoking application, if any. If this value is zero, no link specification was sent with the request.

Pointer to the link specification, allocated from the default heap. When no longer needed, the space allocated for the specification should be returned to the heap by calling HPfree(). A NULL pointer indicates that no link specification was sent.

Length of the request options sent by the invoking application, if any. If this value is zero, no options were sent with the request.

Pointer to the request options, formatted as one of the APPACK option structures or as an undifferentiated string of bytes, depending on the request issued, allocated from the default heap. A NULL pointer indicates that no request options were specified.

19.2.2 APreply()—Reply To A Request

This function will send a reply to a request received from APinit() or on an active operation. This function should be called whenever the 'reply' field of the APINIT structure is set to TRUE, as the invoking application will be waiting for a reply. If called after APinit() and the reply is not SUCCESS, the operation will be terminated and communications will not be established. If the reply is SUCCESS and both the invoking application and the caller wish to establish communications, an active connection will be established. If either the invoker or the caller does not want communications, none will be established. If called other than after APinit(), the 'connect' parameter will be ignored.

Note: If the reply status is other than SUCCESS, or if no connection is desired, the operation ID will be invalidated by this call. It is not necessary to call APopfinish() in such an instance.

Input Parameters

ID of the operation for which a reply is to be sent, as returned by APinit() or APmmreserve().

Error code to be returned to the requesting application, or SUCCESS if the request has been accepted.

Connect flag: TRUE if communications with the invoking application is desired, or FALSE if no connection is needed.

Output Parameters

None 19.2.3 APevinit()—Initialize APPACK Event Specification

This function will initialize a UIPACK event specification structure to allow the caller to wait for APPACK messages. This includes "match" messages, operation requests and replies, and buffer management events. This function will fill in one element of an array of structures. The caller should allocate or reserve space for an array of UIVSPEC structures, and pass a pointer to one of those structures to this function. It is the responsibility of the caller to fill in other elements of the array, including the list terminator. Events received using this specification should be passed to APmsgtest() to determine their purpose and contents. It is assumed that APinit() has been successfully called before calling this function.

Input Parameters

None

Output Parameters

Pointer to a UIVSPEC structure which is to be filled in with information necessary to allow waiting for APPACK message events.

19.2.4 APevaction()—Set Action Code For APPACK Events

This function will associate the given UIPACK action code and data with a previously prepared APPACK event specification list element. Since this element may contain more than one list entry, it is not practical for the caller to set these codes. This function should be called if an event specification list with an APPACK event list element is to be given to a high-level event processing package which supports event actions.

Input Parameters

Pointer to the UIVSPEC structure which was prepared by APevinit().

Action code to be associated with APPACK events.

Action data to be associated with APPACK events.

Output Parameters

None 19.2.5 APevremove()—Remove APPACK Event Specification

This function will free space allocated to an event specification element for waiting for APPACK messages. This function should be called if the previously prepared event specification is no longer to be used.

Input Parameters

Pointer to the UIVSPEC structure which was prepared by APevinit().

Output Parameters

None 19.2.6 APmsgtest()—Test An APPACK Message Event

This function will test a provided UIPACK event record to determine whether it is an APPACK message event associated with an ongoing operation. If so, this function will return a flag indicating the nature of the associated message, and the operation ID of the operation to which it belongs. Depending on the result, the caller is expected to call one of a number of other APPACK functions to further interpret the message.

Input Parameters

Pointer to the event record to be tested.

Output Parameters

Pointer to a variable to receive the ID of the operation to which the message event belongs. This variable will be set to NULL if the event record does not belong to an APPACK operation.

Pointer to a variable to receive a flag indicating the type of message event provided. The following is a list of possible types:
* APPACK matchmaker match message—posted operation was matched by another application.
* APPACK request message—call APmsgrequest() to interpret the message.
* APPACK operation termination message—call APopfinish() to terminate the operation.
* Request to undo the move operation recently completed—follow MOVE UNDO protocol.
* APPACK message containing a request for a new operation—call APmsgnewreq() to interpret the message.
* Data interchange stream message—call current interchange get function.
* Private protocol message sent by application at the other end of the operation—not interpreted by APPACK.
* Internal control message handled by APPACK—ignore it and continue.
* Not an APPACK message.

19.2.7 APrioinit()—Get A RIOID For An Active Operation

This function returns a RIOID which can be used to perform data interchange with any of the standard data interchange services that use RIOPACK services (redirectable I/O services upon which the various data interchange functions are built). The RIOID provided is based on the previously established connection associated with the specified operation ID. When data interchange has been completed, the caller can continue to use the operation ID for other APPACK activities, or can call APopfinish() to terminate the operation.

Input Parameters

ID of the operation for which a RIOID is to be returned.

Output Parameters

Pointer to a variable to receive a RIOID associated with this operation.

19.2.8 APmsgwait()—Wait For An APPACK Message

This function is provided for the benefit of those applications which wish to wait specifically for events associated with a particular operation. This function assumes that there is an active connection associated with this operation. It will wait for a message to arrive from the application at the other end of the operation. The caller can supply a list of events which should cause APmsgwait() to return before the desired message arrives. In addition, the caller can specify a time limit for the wait. When the message arrives, the message type as indicated by APmsgtest() will be returned. The event record pointer can then be passed to one of the APmsg() interpretation functions (such as APmsgrequest()) for further processing.

Input Parameters

ID of the operation on which the message is expected.

Pointer to an array of event specifications, describing events which should cause this function to return before the desired message arrives. See the UI-PACK specification for more details. If this pointer is NULL the function will wait until the message arrives or the time limit expires.

Number of milliseconds to wait before aborting the receive wait. A value of zero indicates that the APPACK default for this connection should be used. A value of WAIT FOREVER means what it implies.

Output Parameters

Pointer to a variable to receive a flag indicating the type of message event provided. The message types are the same as those returned by APmsgtest().

Pointer to a structure to be filled in with the event record which caused the function to return prematurely. This record will not be filled in if the desired message arrives, or if the function times out. This pointer may be NULL if the event record is not desired.

19.2.9 APoprequest()—Send An Operation Request

This function will send the specified request to the application at the other end of an operation connection, along with any caller-supplied request options. The application at the other end will receive a message event which APmsgtest() will interpret as type APMSGREQUEST. If a reply is desired, this function will return when the other application has received and acknowledged the request.

Input Parameters

ID of the operation on which the request is to be sent.

Request code to be sent to the other application.

Reply flag: TRUE if a reply is expected from the invoked application, FALSE if not. If TRUE, the function will wait until a reply has been received from the newly started application, successful or not.

Length of the request options to be sent along with the request.

Pointer to a structure containing request options to be sent along with the request. If this pointer is NULL, no options will be sent.

Output Parameters

None

19.2.10 APmsgrequest()—Interpret A Request Message

This function will interpret an APPACK message of type APMSGREQUEST, and return details about the request. In addition to the request itself, this function will return any request-specific options supplied with the request. The reply flag indicates whether the sending application expects a reply to this request before the request itself is processed.

Input Parameters

ID of the operation to which the request applies, as returned by APmsgtest().

Pointer to the event record for the message.

Output Parameters

Pointer to a variable to receive the request sent by the other application.

Pointer to a variable to receive the reply flag sent by the other application. It will be TRUE if a reply is expected, FALSE if not.

Pointer to a variable to receive the length of the request options sent by the other application, if any. If the returned length is zero, no options were sent with the request.

Pointer to a variable to receive a pointer to the request options, formatted as one of the APPACK option structures or as an undifferentiated string of bytes, depending on the request issued. A NULL pointer indicates that no request options were specified.

19.2.11 APopfinish()—Terminate An Operation

This function will terminate an ongoing operation. This function should be called whenever an operation is to be terminated, either for good reasons or bad, whatever the current state of the operation. If the operation currently consists of two connected applications, a message of type APMSGFINISH will be sent to the other application. The caller must supply an error code which indicates the reason for the termination, where SUCCESS implies a normal, consenting termination at the end of an operation. This function should also be called if an APPACK message of type APMSGFINISH is received, in order to obtain the other application's termination signal and free memory allocated to the operation. In this case, SUCCESS should be sent as the status.

Input Parameters

ID of the operation to be terminated.

Status code to be sent to the other application.

Output Parameters

Pointer to a variable to receive the termination status code sent by the other application. This value will not be returned if the caller is first to terminate the operation.

19.3 Matchmaker Operations

19.3.1 APmmreserve()—Reserve The Matchmaker For An Operation

This function reserves one side of the matchmaker for the specified operation. The matchmaker should be reserved while user specification of the details of half of an operation is in progress. Once user specification is complete, the operation should be posted by calling APmmpost(). No other APmmreserve() or APmmpost() requests for this operation will be allowed while it is reserved. If an operation is currently posted which prevents this request from being honored, an error code describing the operation in progress will be returned, so that the user can be suitably informed. If the matchmaker status is APMMYOURSELF, it indicates that the same process has the corresponding other side of the matchmaker posted. The caller can choose to terminate the operation at this point, or continue with APmmpost() and check for a match.

Input Parameters

Code for the operation for which the matchmaker is to be reserved:
* Copy operation
* Move operation
* Share operation
* Multiple copy operation
* Object convert out operation
* Place operation
* Place operation with only links allowed
* Place operation with no links allowed
* Object convert in operation Output Parameters Pointer to a variable to receive a flag indicating the current status of the other side of the matchmaker corresponding to the given operation. This variable will not be changed if the matchmaker cannot be reserved.
* Other side not yet posted

* Other side already posted and waiting
* Other side posted and expecting only a link
* Other side posted but cannot accept links
* Other side posted by yourself Pointer to a variable to receive an operation ID for the operation in progress. This ID must be passed to either APmmpost() or APmmclear() before any other use is made of it.

19.3.2 APmmpost()—Post An Operation On The Matchmaker

This function posts half of an ongoing interchange operation on the matchmaker. APmmreserve() must have been previously called to reserve the matchmaker for that operation. The caller must supply information describing the data interchange types which can be provided to or accepted from another application which agrees to complete the operation. If this function returns SUCCESS and the returned matchmaker status is APMMMATCH or APMMYOURSELF, it can be assumed that a match has occurred, and no match event will be arriving. If the status is APMMNOMATCH, the caller should call APopfinish() and notify the user.

Input Parameters
ID of the operation which is to be posted.
Pointer to an array of APDATASPEC structures, terminated by an entry with 'datatype' set to APDATALISTEND, describing the data types which can be provided or accepted by the posting application.

Output Parameters
Pointer to a variable to receive a flag indicating the current status of the other side of the matchmaker corresponding to the given operation. This variable will not be changed if the matchmaker cannot be posted.
* Other side not yet posted—wait
* Other side posted but no match possible
* Other side posted and a match was found
* Other side posted and matched by yourself Pointer to a variable to receive the operation code that the other application posted, if the matchmaker status is APMMMATCH or APMMYOURSELF.

19.3.3 APmmconnect()—Connect To Matched Application

This function establishes communications with the application which matched the caller's posted operation. It should be called after receiving an APMSGMATCH message from the Application Manager, or an APMMMATCH status from APmmpost(). The function will return the operation code posted by the other application, and a count and list of the data specifications which matched. The consumer application (normally the PLACE side) is expected to make a specific request for data after calling this function. The APOPID returned by this function can be used to send and receive data using any of the APPACK request functions and any data interchange services. APopfinish() should be called if this function fails. Otherwise, the matchmaker will be cleared when the connection is established.

Input Parameters
ID of the operation for which a connection is desired.
Output Parameters
Pointer to a variable to receive the operation code that the other application posted.

Pointer to a variable to receive a count of the number of data types which matched between the two applications.
Pointer to a variable to receive a pointer to an array of APDATASPEC structures, terminated by an entry with 'datatype' set to APDATALISTEND, describing the data types which matched between the two applications. If the pointer is NULL, no specifications will be returned. HPfree() should be called To return the space used by the array to the heap when it is no longer needed.

19.4 Link Interchange 19.4.1 LNXpinit()—Start Building Link Stream

This function starts building a link interchange stream. The new stream becomes the current interchange stream. Note that there can be only one link stream active at a time. After calling this function, the other LNXp() functions can be used to put links and link data into the stream.

19.4.2 LNXprestart()—Reset Stream To Link

This function resets the stream currently active on the specified connection to accept link interchange data. This function can be called either to insert embedded links into another type of interchange data, or to resume sending links after switching to another data type for a previous link's data. This function cannot create a new stream. The stream becomes the current link interchange stream. After calling this function, the other LNXp() functions can be used to put links and link data into the stream.

19.4.3 LNXplink()—Put A Link Into The Stream

This function puts an existing link into the current link stream. It is assumed that the parent object has previously defined the link, and that any associated link specification and data are stored in the previously identified link file. Besides the link, any specification and data associated with it are put into the stream. No calls to other interchange services are needed to complete the insertion of the link. This function may be called repeatedly to put a number of links into the current stream.

19.4.4 LNXpnewlink()—Put A New Link Into The Stream

This function builds a new link in the current link stream. The caller supplies the object ID of the object to which the link is to be established. The receiving application will formally establish a link to the object when it receives the link interchange information. If there is link data associated with the link, the data flag should be set and a valid data type and link specification should be provided. The caller should then use the appropriate interchange services to set the link data into the stream (starting with a call to an XXXprestart() function). When finished, LNXprestart() should be called to return to the link stream. This function may be called repeatedly to put a number of links into the current stream.

19.4.5 LNXpfinish()—Finish Building Link Stream

This function finishes building the current link interchange stream. If link interchange was embedded within another data type, that data type will become the current data type again, and its XXXprestart() function should be used to continue sending data. If the stream was initially a link interchange stream, this function will complete the stream and send any buffered data to the consumer at the other end of the connection. This function will not terminate the connection.

19.4.6 LNXginit()—Start Reading Link Stream

This function starts reading a new link interchange stream. The new stream becomes the current link interchange stream. Note that there can be only one stream active at a time. It is assumed that link interchange data will be arriving over the given connection. After calling this function, the other LNXg() functions can be used to get links and link data from the stream.

19.4.7 LNXgrestart()—Reset Stream To Link

This function resets the stream on the specified connection to read link interchange data. This function can be called either to read links embedded in another type of interchange data, or to resume reading links after switching to another data type for a previous link's data. The stream becomes the current link interchange stream. After calling this function, the other LNXg() functions can be used to read links and link data from the stream.

19.4.8 LNXglink()—Get The Next Link In The Stream

This function gets the next link in the current link interchange stream. It creates a link for the designated parent, stores any link specification and data associated with it in the designated link file, and returns a link ID to identify the new link. If the copy flag associated with the link so indicates, the object will be copied and the link will be established to the new object. The new link is registered with the object catalog, so that the parent is registered as bearing the new link. The function also returns the object type of the linked object, a flag indicating whether data is associated with the link, and the data type of the data if present. If no link file was specified when calling LNKginit() or LNXgrestart(), the link specification and data will be discarded. The flag and data type will be returned even if no link file is available for storage of the data. This function may be called repeatedly to get a number of links from the current stream.

19.4.9 LNXgpeek()—Look At The Next Link In The Stream

This function returns information about the next link in the current link interchange stream. It does not actually create a link. This function should be used if it necessary to examine the object type or data type of the link before accepting it. After calling this function, either LNXglink() or LNXgskip() should be called to process the link.

19.4.10 LNXgskip()—Skip The Next Link In The Stream

This function skips the next link in the current link interchange stream. It is assumed that LNXgpeek() was just called to examine the link, and that it did not return an error. After calling this function, either LNXglink() or LNXgpeek() should be called to process the next link.

19.4.11 LNXgfinish()—Finish Reading Link Stream

This function finishes reading link interchange data from the current stream. If the link interchange was embedded within another data type, that data type will become the current data type again, and its XXXgrestart() function should be used to continue reading data. If the stream was initially a link interchange stream, this function will terminate processing of the stream, and it will no longer be active. Normally this function should only be called after either LNXglink() or LNKgpeek() returns LNXEEND, but it may be called at any time while processing a link interchange stream.

19.5 Text Interchange

19.5.1 TXXpinit()—Start Building Text Stream

This function starts building a text stream. The new stream becomes the current stream. Note that there can be only one stream active on a given connection. After calling this function, the other TXXp() functions can be used to put text and text data into the stream. The defaults are transferred as part of the header information in the stream, and are remembered so that they can be referred to later.

19.5.2 TXXprestart()—Reset Stream To Text

This function resets the stream currently active on the specified connection to accept text. This function can be called either to insert text into another type of interchange data, or to resume sending text after switching to another data type for previous embedded data. This function cannot create a new stream. The stream becomes the current interchange stream. After calling this function, the other TXXp() functions can be used to put text into the stream.

19.5.3 TXXpstring()—Put Text String Into The Stream

This function puts a string of text into the current text stream. This string can contain line feeds and formfeeds to control the layout of the text. A stream without these characters will be handled differently depending upon the receiving application and context. It can also contain carriage returns which is useful if interline spacing is explicitly done with the vertical move down command.

19.5.4 TXXpchar()—Put Single Character Into The Stream

This function puts a single character into the current text stream.

19.5.5 TXXpfont()—Change Current Font

This function inserts a set font command into the current text stream to change the font of the characters following it. If a value of 0 is passed as the font id, the font will be set to the default font specified at the start of transmission, if any.

19.5.6 TXXpattrs()—Set Text Attributes

This function inserts an enable/disable attributes command in the current text stream. This command is used to set/reset the text attributes of bolding, underlining, double underlining, and strike thru. These values will remain in effect until changed again by this command.

19.5.7 TXXpdiacritic()—Insert Diacritic Mark

This function is used to insert a character with a diacritic mark into the current text stream.

19.5.8 TXXpstrikethru()—Set Strike-Thru Character

This function inserts a change strike-thru character command into the current text stream.

19.5.9 TXXpscript()—Set Script Offset

This function inserts a set script offset command into the current text stream. The set script offset command is used to set the distance and direction of the next script (super or sub) relative to the text baseline. A value of zero which is valid when printing (to set the script offset back to the default for the font size) will return an error if passed on text transmission.

19.5.10 TXXpvertical()—Put Vertical Move Down Command

This function will insert a vertical move down command into the current text stream. The vertical move down command can be used for interline spacing or for skipping large areas of whitespace. It does not affect horizontal position, so previous text should be followed by a carriage return.

19.5.11 TXXphorizontal()—Put Horizontal Move Command

This function will insert a horizontal move command into the current text stream. The horizontal move command allows motion to the left or right. Strike thru and underline attributes can be made to apply to white space (move with pen down) or not apply (move with pen up).

19.5.12 TXXpspacing()—Put Interline Spacing Command

This function inserts a set interline spacing command into the current text stream. The set interline spacing command is used to override the default spacing for a given font. If the value given is positive, that value will be used for autospacing; if the value is 0, no autospacing will be done; if the value is negative, the default value will again be used.

19.5.13 TXXplanguage()—Put Change Language Command

This function inserts a change language command into the input stream. This command is used to indicate that the text following it is in a different language.

19.5.14 TXXplink()—Put A Link Into The Stream

This function starts the insertion of a link to another object into the current text stream. After calling this function, LNXprestart() should be called to prepare for calls to other LNXp() functions. Inserting the link may involve other data interchange types as well, in order to include the actual data of the link. After the entire link has been sent, TXXprestart() should be called to resume sending the text stream.

19.5.15 TXXpfinish()—Finish Building Text Stream

This function finishes building text interchange data in the current stream. If the text interchange was embedded within another data type, that data type will become the current data type again, and its XXXprestart() function should be used to continue sending data. If the stream was initially a text interchange stream, this function will complete the stream and send any buffered data to the consumer at the other end of the connection.

19.5.16 TXXginit()—Start Reading Text Stream

This function starts reading a text interchange stream. It will wait for the first part of the stream to arrive from the other end of the connection, and then return default information about the text in the stream. The new stream becomes the current interchange stream. Note that there can be only one stream active on a given connection. After calling this function, the other TXXg() functions can be used to get text data from the stream.

19.5.17 TXXgrestart()—Reset Stream To Vanilla Text

This function resets the stream currently active on the specified connection to read text interchange data. This function can be called either to read text embedded in another type of interchange data, or to resume reading text after switching to another data type for previous embedded data. The stream becomes the current interchange stream. After calling this function, the other TXXg() functions can be used to read text data from the stream.

19.5.18 TXXgnext()—Get Next Type Of Data In Input Stream

This routine determines the next type of data in the input stream. It is then the caller's responsibility to process that data accordingly. A second successive call to this routine without retrieving the data will skip over the data and return the type of the next data in the input stream. This function will return an end of data indication.

Note: If the type is TXXLINK, then the LNXg() functions should be used to get the link, followed by a call to TXXgrestart() to continue obtaining text.

19.5.19 TXXgstringsize()—Get Next String Length

This function returns the length of the string of text which is next in the stream. This length should be used to prepare a buffer for a call to TXXgtext().

19.5.20 TXXgstring()—Get Text String From The Stream

This function gets a string of text from the current text stream.

19.5.21 TXXgchar()—Get Character From The Stream

This function gets a single character from the input stream.

19.5.22 TXXgfont()—Get The Current Font

This function returns the font specified in the set font command that is next in the input stream. If a set font command is not the next data type in the input stream, the current font as specified in the last set font command is returned. If no default font has been set, a zero font will be returned.

19.5.23 TXXgattrs()—Get Text Attributes

This function returns the attribute values from the enable/disable attributes command that is next in the input stream. If such a command is not next, this function will return the values from the last such command encountered or else the default values (i.e., all attributes off).

19.5.24 TXXgdiacritic()—Get Diacritic Mark

This function is used to get the character and the diacritic mark that is next in the input stream.

19.5.25 TXXgstrikethru()—Get Strike-Thru Character

This function gets the new strike-thru character from the current text stream.

19.5.26 TXXgscript()—Get The Script Offset

This function returns the value of the script offset from the set script offset command that is next in the input stream. If such a command is not next, this function will return the value from the last such command encountered.

19.5.27 TXXgvertical()—Get Vertical Move Down

This function will get the vertical move down command that is next in the input stream.

19.5.28 TXXghorizontal()—Get horizontal move

This function will get the horizontal move command that is next in the input stream. The horizontal move command allows motion to the left or right. Strike thru and underline attributes can be made to apply to white space (move with pen down) or not apply (move with pen up).

19.5.29 TXXgspacing()—Get Interline Spacing

This function returns the value of interline spacing in the set interline spacing command that is next in the input stream. If such a command is not next in the stream, the value in the last encountered command will be returned.

19.5.30 TXXglanguage()—Get Change Language Command The Stream

This function will get a change language command that is next in the input stream. If a change language command is not next, this function will return the value from the last such command or from the header.

19.5.31 TXXgfinish()—Finish Reading Text Stream

This function finishes reading text interchange data from the current stream. If the text interchange was embedded within another data type, that data type will become the current data type again, and its XXXgrestart() function should be used to continue reading data. If the stream was initially a text interchange stream, this function will terminate processing of the stream, and it will no longer be active.

19.6 Record Interchange

19.6.1 REXpinit()—Start Building Vanilla Record Stream

This function starts building a vanilla record interchange stream. The new stream becomes the current interchange stream. Note that there can be only one stream active on a given operation. After calling this function, the other REXp() functions can be used to put records into the stream.

19.6.2 REXprestart()—Reset Stream to Vanilla Record

This function resets the stream currently active on the specified operation to accept vanilla record interchange data. This function can be called either to insert embedded records into another type of interchange data, or to resume sending records after switching to another data type for a previous embedded data. After calling this function, the other REXp() functions can be used to put records into the stream.

19.6.3 REXpheader()—Build a Header Record

This function builds the header record into the current interchange stream. The record is built based on the input parameter values. Unknown values should be passed in as NULL.

The subtype field is intended to provide flexibility to applications. If an application intends to generate records with a subtype qualifier, they should register the subtype ids with APPACK. This allows the subtype field to remain a unique across all applications.

19.6.4 REXprinit()—Start Record Descriptor

This function builds the start of a record descriptor in the current interchange stream. It is called once per record descriptor.

The subtype field is intended to provide flexibility to applications. If an application intends to generate records with a subtype qualifier, they should register the subtype ids with APPACK. This allows the subtype field to remain unique across all applications.

19.6.5 REXpfdesc()—Build Field Descriptor

This function builds a field descriptor in the current interchange stream. It should be called once for each field in the record descriptor.

19.6.6 REXprfini()—End Record Descriptor

This function marks the end of a complete record descriptor. It is called once per record descriptor.

19.6.7 REXpdinit()—Start Data Record

This function initializes a data record. It is called once per data record.

The subtype field is intended to provide flexibility to applications. If an application intends to generate records with a subtype qualifier, they should register the subtype ids with APPACK. This allows the subtype field to remain unique across all applications.

19.6.8 REXpdata()—Build Data Field

This function builds a data field in the current interchange stream. The input data type is converted to its corresponding standard interchange format. This function is called for each field in the data record.

19.6.9 REXpdfini()—End Data Record

This function marks the end of a complete data record. It is called once per data record.

19.6.10 REXpfinish()—Finish Building Vanilla Record Stream

This function finishes building vanilla record interchange data in the current stream. If the vanilla record interchange was embedded within another data type, that data type will become the current data type again, and its APxxptreset() function should be used to continue sending data. If the stream was initially vanilla record interchange stream, this function will complete the stream and send any buffered data to the consumer at the other end of the operation. The stream will then be terminated and will no longer be active.

19.6.11 REXginit()—Start Reading Vanilla Record Stream

This function starts reading a vanilla record interchange stream. It will wait for the first part of the stream to arrive from the server at the other end of the operation. The new stream becomes the current interchange stream. Note that there can be only one stream active on a given operation. It is assumed that a request for vanilla record interchange data has already been sent to the server, and a successful reply was received. After calling this function, the other REXg() functions can be used to get records from the stream.

19.6.12 REXgrestart()—Reset Stream to Vanilla Record

This function resets the stream currently active on the specified operation to read vanilla record interchange data. This function can be called either to read embedded records from another type of interchange data, or to resume reading records after switching to another data type for previous embedded data. The stream becomes the current interchange stream. After calling this function, the other REXg() functions can be used to read records from the stream.

19.6.13 REXgtype()—Get Next Record Type

This function returns the value of the record type and subtype. It is the consumer's responsibility to determine what type of record is to follow and to process it correctly. It is important to note that the end of data transfer is returned as an error by this function.

19.6.14 REXgheader()—Get Header Record Information

This function returns the header record information in the current interchange stream.

19.6.15 REXgfdesc()—Get Next Field Descriptor

This function returns the next sequential field descriptor. It is important to note that the end of record descriptor is returned as an error from this function. It is the consumer's responsibility to process the field descriptor correctly based on the data type.

19.6.16 REXgdata()—Get Next Data Field

This function returns the field data and type. It is important to note that the end of data record is returned from this function. It is the consumer's responsibility to determine what type of data is to be processed. Refer to the APRXFDATA structure definition for the type dependent information, see Vanilla Record Data Structures.

19.6.17 REXgnext()—Skip to Next Record Type

This function finds the next record of the given type: record descriptor or data record. The type is designated by the user.

19.6.18 REXgfinish()—Finish Reading Vanilla Record Stream

This function finishes reading vanilla record interchange data from the current stream. If the vanilla record interchange was embedded within another data type, that data type will become the current data type again, and its APxxgreset() function should be used to continue reading data. If the stream was initially vanilla record interchange stream, this function will terminate processing of the stream, and it will no longer be active.

20 RESPACK FUNCTION CALLS

20.1 Resource File Access Functions 20.1.1 RESfopen()—Open a Resource File

This function opens an existing resource file for read-only access. An application may open any number of resource files.

20.1.2 RESfinit()—Open a List of Resource Files

This function opens a list of resource files specified by the caller. The name of each file is built from the a string passed in by the caller, the program's default language code, and the path information from the catalog or library that the program itself came from. The files are opened for read-only access.

The parameter list passed to this function is variable, and depends on the actions that should be performed. The first parameter is always an international location code. Following this are a number of flag/string pairs, where the flag specifies the type of file to be opened (system resource file, language-dependent application resource file or language independent application resource file), and the string specifies the name, or prefix, of the file to be opened. Some flag values do not require a following string pointer. The parameter list is always terminated with a flag of RESFNEND.

The format of the parameter strings and the method of building the file names are system dependent. This function does not return the file IDs of the opened files. It is assumed that the program will always search through all the available resource files for each resource. If an error is encountered in opening one of the files, all other files will still be opened, and the error will be returned.

20.1.3 RESfclose()—Close a Resource File

This function closes a resource file which was opened with RESfopen().

20.2 Resource Access Functions 20.2.1 RESget()—Get a Resource

This function locates a resource in a user profile or resource file and checks its type against the specified type. If the types match, it allocates space from the default heap for the resource, reads it into memory, and returns a pointer to the in-memory copy of that resource. If the types do not match, an error is returned.

If the type parameter is RESTANY, it will match any possible resource type, and no mismatch error will be returned.

In the case of success, the resource is read from the user profile, or one of the open resource files if it is not found in the user profile. When the caller is finished with the resource, it should be released by calling RESrelease(), so that that space in the heap can be reclaimed.

Input Parameters
The ID of the resource to be retrieved.
The expected type of the resource against which the actual resource type should be validated, or RESTANY.
Output Parameters
Pointer to the area where the pointer to the resource will be stored.
Pointer to the variable where the size of the resource will be stored. If NULL, the size will not be returned.

20.2.2 RESmget()—Get Multiple Resources

This function reads a number of resources into the default heap, and returns pointers to them. Under some circumstances, this can provide substantial performance benefits over calling RESget() for each resource to be accessed. No type validation is provided, and the resource sizes are not returned. If a resource is not found, the pointer to it is set to NULL and an error is returned, but all other resources are read in anyway. If any errors other than RESEUNDEFINED occur during reading, all pointers are set to NULL, all allocated space is freed, and the error is returned.

When the resources are no longer needed, RESrelease() should be called for each resource which was read in, to deallocate the space occupied by it.

Input Parameters
The beginning of the array of resource IDs to be retrieved.
The number of resources to be retrieved.
Output Parameters
The beginning of the array in which the pointers to the resources will be stored.

20.2.3 RESpoint()—Get a Pointer to a Resource

This function returns a pointer to part of a resource. This function should be called when the resource could potentially be very large, and when the application wishes to avoid the overhead of copying it to a buffer. The resource fragment will be made available to the application, but not modifiable. Any attempt to modify the resource may cause unpredictable results. RESrelease() should be called when the resource is no longer required.

Only a limited number of resource fragments can be mapped in at any one time. If the maximum number of fragments has been reached, any attempt to get a pointer to another fragment without calling RESrelease() on an existing fragment will cause an error.

If the specified offset is greater than the resource size, an error will be returned. If the specified offset plus length is greater than the resource size, a different error will be returned, and the resource will be mapped in anyway.

Input Parameters
The ID of the resource to be retrieved.
The offset within the resource to be retrieved.
The amount of resource data required, in bytes.
Output Parameters
Pointer to the area where the pointer to the resource will be stored.

20.2.4 RESrelease()—Release a Resource

This function releases an in-memory copy of a resource, so that the space can be reclaimed if necessary. This function should always be used rather than a direct call to HPfree().

Input Parameters
Resource data pointer returned by RESget(), RESmget() or RESpoint().
Output Parameters
None 20.2.5 RESread()—Read a Resource This function reads all or part of a resource into an area specified by the user. If the provided buffer is larger than the size of the requested resource, or if the resource is larger than the buffer, an error will be returned but the resource will still be placed in the buffer.

Input Parameters

The ID of the resource to be retrieved.

The offset within the resource at which to being reading.

The number of bytes of the resource to be read.

Output Parameters

Pointer to the area where the resource data will be stored.

20.2.6 RESlookup()—Find Resource with Given Name

This function returns the resource ID of the resource that has the specified name, and the file ID of the file in which the resource was found. If there is no resource with that name, an error will be returned. If a resource with the specified name is found, but there is another resource with the same resource ID in a more recently opened file, then the resource and file IDs will be set but an error will still be returned. This is because the resource ID cannot be used to access the resource.

20.2.7 RESgtinfo()—Get Information About Resource

This function returns information about a resource.

The user-specified information structure should contain pointers to the user variables that will be filled in with the requested information. If any field in the structure is NULL, that information is not returned; otherwise the information is set into the variable pointed at by the field. If the name, description or literal field is set, the appropriate text string is read into the default heap and null-terminated, and the caller's pointer is set to point at it. In this case the caller must release the allocated space with an HPfree() when the string is no longer needed. If there is no such string, then the caller's pointer is set to NULL.

20.3 Resource File Management Functions

20.3.1 RESfcreate()—Create a Resource File

This function creates a new resource file and allows editing operations to be performed on the file. minid and maxid define the minimum and maximum resource IDs that may be created in the file. Any attempt to create a resource in the file with an ID outside this range will cause an error to be returned. These values may never be changed once the file is created.

20.3.2 RESfedit()—Modify a Resource File

This function allows the resource editor to modify the contents of an existing resource file. This function will return the lowest and highest legal resource IDs for the file.

20.3.3 RESfview()—Peruse a Resource File

This function allows the resource editor to view the contents of a resource file, including scanning it with RESgtnext() and RESgtprev(), without interference from the user profile. The file will be open read-only, so no resources may be modified, but any of the other functions which apply to edited files may be used.

20.3.4 RESfcommit()—Commit Modifications to File

This function completes the modifications to a resource file that was opened by any of the functions that return a RESEFID. If the file is not a user profile, it is also closed.

Changes that have been made to a resource file can be incorporated into the permanent copy of the file, or the changes can be discarded leaving the file unchanged. If the file was opened by RESfedit() and the nochanges parameter is TRUE, then all the changes that have been made to the file are discarded. If the file was opened using RESfcreate(), it is also deleted. If the parameter is FALSE, the changes are incorporated into the permanent copy of the file.

If the resource file ID passed to this routine was created through RESsupedit(), the file ID will be deleted but the associated profile will not be affected. The caller is still responsible for closing the profile.

20.3.5 RESgtfinfo()—Get Information About File

This function returns several pieces of information about a resource file which is open for editing: the total number of resources in the file, the current lowest and highest resource IDs, and the external and internal file version numbers. These numbers take into account the number of resources that have been created and/or deleted during the current edit session. If any of the pointers are NULL, the corresponding pieces of information will not be returned.

The lowest and highest existing resource IDs are not the same as the IDs accepted by RESfcreate() and returned by RESfedit(), which are the lowest and highest possible resource IDs in the file.

20.3.6 RESptfinfo()—Put Information About File

This function modifies the minimum and maximum resource IDs that can be stored in the resource file. An error will be returned if the range includes illegal values, or if it excludes resources that already exist in the file.

20.3.7 RESavail()—Get Unused Resource ID

This function returns the lowest or highest resource ID in the file, within a specified range, which is not already in use by some resource. This will be used by the resource editor, in selecting system-generated resource IDs.

20.3.8 RESgtnext()—Get Next Resource Information

This function returns information on the resource located physically after the specified resource in the specified file. The argument can be RESIDBOF in which case the first resource in the file is returned. If the specified resource is the last resource in the file, an error will be returned.

20.3.9 RESgtprev()—Get Previous Resource Information

This function returns information on the resource immediately before the specified resource in the specified file. The argument can be RESIDEOF in which case the last resource in the file is returned. If the specified resource is the first resource in the file, an error will be returned.

20.3.10 REScheckpt()—Checkpoint Resource File Updates

This function records the current state of the specified resource file, before any further modifications are made. If RESrevert() is called, all the modifications performed between the REScheckpt() and the RESrevert() will be discarded. This operation provides support for "undo" operations on systems which require this capability.

Only one level of checkpointing is possible—once this function is called, a second call to it will cause the data recorded by the first to be forgotten. The caller of these functions must decide for itself what granularity of "undo" support is to be provided, i.e. what constitutes a single user operation that must be undone as a whole.

20.3.11 RESrevert()—Revert to Last Checkpoint

This causes the specified resource file to be returned to the same state it was in as of the last REScheckpt()—all the editing modifications that have been made since then are discarded.

20.3.12 RESfreeze()—Freeze a Resource File Version

This function modifies a resource file to prepare it for release and distribution. If the newver flag is set, the external version number will be incremented. If the clralter flag is set, the RESFALTERED flags on all resources will be cleared (including the resources that were modified during the current edit session). If the striplit flag is set, all literals will be removed from the resource file, to reduce its size.

20.3.13 RESgtfver()—Get Resource File Version Number

This function retrieves the version number string stored in a resource file. This version number must be an 8-character string. When a resource file is created by RESPACK, the version number will be set to "00.00.00", but it may be changed using RESptfver() at any time.

20.3.14 RESptfver()—Put Resource File Version Number

This function sets the 8-character version number string into a resource file. This string can be retrieved by RESgtfver().

20.4 Resource Editing Functions

20.4.1 RESrdcur()—Read Current Version of Resource

This function reads the current value of a resource from the specified resource file. This is in contrast to RESread(), which will return only the unedited version of a resource. The resource is read into a user-provided buffer. If the provided buffer is larger than the requested resource, or if the resource is larger than the buffer, an error will be returned but the resource will still be placed in the buffer.

20.4.2 RESgtcur()—Get Current Resource Information

This function returns information about the current state of the resource, as opposed to RESgtinfo() which returns information about the last committed version of the resource.

The caller may specify which file is to be searched for the resource, or may specify a search in all files which are open for editing. This function is the only editing function which can search among files for a resource. For all other editing functions, the file to be searched must be specified explicitly.

The information structure should contain pointers to the user variables that will be filled in with the requested information. If any field in the structure is NULL, that information is not returned, otherwise the information is set into the variable pointed at by the field. If the name, description or literal field is set, the appropriate text string is read into the default heap and null-terminated, and the caller's pointer is set to point at it. In this case the caller must release the allocated space with an HPfree() when the string is no longer needed. If there is no such string, Then the caller's pointer is set to NULL.

20.4.3 REScreate()—Create a Resource

This function creates a new resource in the specified file. The resource is created with the specified parameters, and will contain no data. If the resource is created with a non-zero size, then its data area will be filled with zeros. The resource can be created at any desired relative location in the file.

This is the only function that can create a new resource.

The information structure will contain values for the attributes of the new resource. The type and flags fields must be specified in the structure, or an error is returned. All other fields are optional. If the version is not specified, the resource version will be set to the internal resource file version.

20.4.4 RESwrite()—Write a Resource

This function writes data provided by the user into a specified resource in the specified file. The resource must already exist. If there is already data in the resource, the old data will be discarded, and the resource's size will be set to the specified count.

20.4.5 RESrewrite()—Overwrite a Resource

This function writes data provided by the user into an existing resource in the specified file. This can add to or partially overwrite the data already in the resource, if any.

The offset where writing begins must be less than or equal to the current size of the resource. Any larger value will cause an error to be returned. If the specified offset plus length is greater than the current resource size, then the size will be increased to contain the new data.

20.4.6 RESptinfo()—Put Information About Resource

This function sets information about a resource. If the size of the resource is increased, then the new resource space will be filled with zeros.

The information structure should contain pointers to the values to be set. If any field in the structure is NULL, the corresponding attribute of the resource is left unchanged. The RESFNAMED flag in the flags is not used, it is re-derived from the name pointer stored in the structure.

20.4.7 RESmove()—Move Resource to New Location

This function moves an existing resource to a new location in the resource file.

20.4.8 RESptnum()—Renumber a Resource

This function changes the resource ID of a specified resource.

20.4.9 RESmerge()—Merge a Resource List into a File

This functions merges a list of resources from one file into another. The resources are normally created in the destination file with the same information and data as the source file. Where conflicts exist, any existing resource in the destination file is first deleted. If an index is being copied, the caller has the option of specifying whether the old index is to be retained or destroyed, or whether the contents of the old and new indexes are to be merged.

This function needs further design.

20.4.10 RESdelete()—Delete a Resource

This functions deletes a resource from a file.

20.5 Resource Index Functions

A resource index is a simple list of entries of equal size, optionally sorted, all stored in a single resource identified by a single resource ID. An index entry contains three pieces of information: a key, an optional chunk of data, and a resource ID. Given a key, a caller can look for an entry with that key in a resource index, and receive as a result the data and resource ID associated with the key. If the index is sorted, all entries will be arranged in order of their key value. If the resource ID in the entry is defined to be the ID of another resource index, the index builder can create a many-level hierarchy of related resource indices.

20.5.1 RESixinit()—Start Building a Resource Index

This function will initialize the process of building a resource index. The caller specifies the key type and sorting behavior of the index and receives the ID to be used to identify the resource as it is being built. This function does not put the resource into a resource file.

The caller must do that in a separate operation, and must call RESixfini() before doing so.

The minid, maxid and restype parameters provide information on the resources which are to be indexed. These fields are not used by RESPACK at all, they are for the convenience of the caller, to store information about the index.

20.5.2 RESixprep()—Begin Modifying an Existing Index

This function takes a pointer to a resource index as it has been read in from a file, and returns a pointer to a modifiable copy of it. This should be done before any of the other RESix() functions are called. The input pointer is not modified in any way; if it was allocated from a heap (by RESget(), for example), the caller should release it.

20.5.3 RESixadd()—Add a Resource Index Entry

This function will build a new resource index entry with the specified key, data, and resource ID, and insert it into the given resource index. For a sorted list, the entry will be inserted at its proper position within the collating sequence. For an unsorted list, the entry will be appended to the end of the list. It is assumed that the RESIXID provided was returned by a call to RESixinit() or RESixprep().

20.5.4 RESixdelete()—Delete a Resource Index Entry

This function will delete a specified entry from a resource index. It is assumed that the resource ID provided was returned by a call to RESixinit() or RESixprep().

20.5.5 RESixfini()—Finish Building a Resource Index

This function completes the process of building a resource index, and returns a resource that can be added to a resource file. This is, in effect the reverse of the operation performed by RESixprep(). The returned resource will be allocated from the heap, so after it is inserted into a resource file, it should be released by calling HPfree().

20.5.6 RESixlookup()—Look up a Resource Index Entry

This function will get the specified resource index, look through it for an entry with the given key, and return the data and resource ID associated with that key. This function will release the resource index after it has finished searching through it. If multiple passes through a single resource index are necessary, it will be faster to use RESget(), RESixprep() and RESixget().

20.5.7 RESixulookup()—Look up a USHORT Entry

This function will get the specified resource index, look within it for an entry with the given key, and return the resource ID associated with that key. This function can only be used with resource indices with key type USHORT. Index entry data will not be returned by this function—to get entry data, use RESixget(). This function will release the resource index after it has finished searching through it. If multiple passes through a single resource index are necessary, it will be faster to use RESget() and RESixufind().

20.5.8 RESixllookup()—Look up a ULONG Entry

This function will get the specified resource index, look within it for an entry with the given key, and return the resource ID associated with that key. This function can only be used with resource indices with key type ULONG. Index entry data will not be returned by this function—to get entry data, use RESixget(). This function will release the resource index after it has finished searching through it. If multiple passes through a single resource index are necessary, it will be faster to use RESget() and RESixlfind().

20.5.9 RESixslookup()—Look up a String Entry

This function will get the specified resource index, look within it for an entry with the given key, and return the resource ID associated with that key. This function can only be used with resource indices with key type string. Index entry data will not be returned by this function—to get entry data, use RESixget(). This function will release the resource index after it has finished searching through it. If multiple passes through a single resource index are necessary, it will be faster to use RESget() and RESixsfind().

20.5.10 RESixufind()—Find a USHORT Entry

This function search the given resource index for an entry with the given key, and return the resource ID associated with that key. This function can only be used with resource indices with key type USHORT. Index entry data will not be returned by this function—to get entry data, use RESixget().

20.5.11 RESixlfind()—Find a ULONG Entry

This function will search the given resource index for an entry with the given key, and return the resource ID associated with that key. This function can only be used with resource indices with key type ULONG. Index entry data will not be returned by this function—to get entry data, use RESixget().

20.5.12 RESixsfind()—Find a String Entry

This function will search the given resource index for an entry with the given key, and return the resource ID associated with that key. This function can only be used with resource indices with key type string. Index entry data will not be returned by this function—to get entry data, use RESixget().

20.5.13 RESixget()—Get an Entry in a Resource Index

This function will search the given resource index for an entry with the given key, and return the data and resource ID associated with that key.

20.5.14 RESixindex()—Get an Entry in a Resource Index

This function will return an entry in a resource index, specified by its position within the index. If the specified entry does not exist, no information will be returned.

20.5.15 RESixinfo()—Get Info on a Resource Index

This function will return information describing a resource index. The resource index should already have been fetched by a call to one of the resource access functions.

20.6 Batch Style Resource Creation Functions

This section describes a set of resource file creation functions for use in batch-style resource file construction. These functions provide a simpler means of creating a resource file, providing that the file-building process is driven from a noninteractive script. No functions are provided for editing an existing file or modifying resources that have already been placed into a resource file.

20.6.1 REScccreate()—Create a Batch Style Resource File

This function will create a new resource file, and prepare it for resource insertion. The file must not already exist. The range of resources must fall within the defined limit.

20.6.2 REScadd()—Add a Resource to a Resource File

This function will add the given resource to the currently open resource file. The data portion of the resource will be inserted immediately after the previously inserted resource, and the given resource ID will be associated with it. All resources inserted by this function will be flagged as 'Visible', 'Modifiable', and 'Customizable'.

20.6.3 REScclose()—Finish Resource File Building

This function will finish building the current resource file and close it.

20.7 User Profile Support Functions

This section functions for interacting with user profile files through RESPACK. While reading resources, RESPACK may choose to substitute customized versions of a resource in place of the originals, if there are customized versions in the user's profile. Also, resources in a user profile may be edited as though they were stored in a resource file.

20.7.1 RESptcustid()—Set Customization ID

This function sets the customization ID that will be used by RESPACK in retrieving customized resources from the user profile. Only resources that have been customized through this customization ID will be returned by future RESPACK calls. The ID will be used through the remainder of the current program's execution. If this call is not given, no customized resource will ever be returned.

20.7.2 RESsupedit()—Edit Resources in a Profile

RESPACK allows resources stored in a user profile to be edited, as though they were stored a resource file. This allows resource editing to be done entirely through RESPACK routines, regardless of the type of file actually in use.

This function takes information about user profile, and returns a RESEFID which can be used as an argument to other RESPACK functions which require a RESEFID. All modifications will apply to the profile file.

Only a subset of the RESPACK functions can be used to edit a profile. These functions are: RESfcommit(), RESrdcur(), RESgtcur(), REScreate(), RESwrite(), RESrewrite(), RESptinfo() and RESdelete(). All other functions will return the error code RESEBADFID if called to modify a profile.

The foregoing description has been limited to a specific embodiment of the invention. Additional advantages and modifications will be apparent to those skilled in the art. The invention is, therefore, not limited to the specific details, representative apparatus, and illustrative example shown and described in this specification. Rather, it is the object of the appended claims to cover all such variations and modifications as come within the true spirit and scope of the invention.

What is claimed as new and desired to be secured by Letters Patent of the United States is:

1. A method for providing customized behavior of non-executing functions of a general purpose data processing system for performing a plurality of functions under control of a corresponding plurality of programs, comprising the steps of:
   (A) providing a program having non-executing behavior that depends upon the content of a resource, wherein
      the non-executing behavior of a program includes operations of the program which
         (a) do not affect execution of the program, and
         (b) do not affect operations of the data processing system in performing the operations under control of the program, and
      the content of a resource is data which
         (a) is used by the program, and
         (b) does not affect the execution of the program,
         (c) is not modified by the program using the resource, and
         (d) does not affect the operations of the data processing system in performing operations under control of the program,
   (B) providing an original version of the resource,
   (C) creating a modified version of the resource,
   (D) storing the modified version of the resource in a user profile associated with a user and containing information pertaining to the user in the data processing system, and when the resource is required by the program,
   (E) the data processing system determining whether the resource is customizable,
   (F) if the resource is customizable, the data processing system checking the user profile for a version of the required resource,
   (G) if a version of such resource exists in the user profile, then the data processing system automatically providing to the program, and without intervention by the user of the program, the version of the resource from the user profile, otherwise the data processing system automatically providing to the program, and without intervention by the user of the program, the original version of the resource, wherein each version of a resource will control the non-executable behavior of a program independently of other versions of the resource.

2. A general purpose data processing system for performing a plurality of functions under control of a corresponding plurality of programs and providing customization of non-executing functions of the data processing system, comprising:
   (A) a plurality of resources, including standard versions of resources,
   (B) a plurality of programs, each having non-executing behavior that depends upon the content of at least one resource, wherein
      the non-executing behavior of a program includes operations of the program which
         (a) do not affect execution of the program, and
         (b) do not affect operations of the data processing system in performing the operations under control of the program, and
      the content of a resource is data which
         (a) is used by the program, and
         (b) does not affect the execution of the program,
         (c) is not modified by the program using the resource, and
         (d) does not affect the operations of the data processing system in performing operations under control of the program,
   (C) resource customization means for creating customized versions of resources,
   (D) user profile means for storing customized versions of resources with indications of users with which the customized resources are associated, each user profile being associated with a user and containing information pertaining to the user in the data processing system,
   (E) retrieval means for receiving requests from the programs for the resources and in response thereto automatically providing resources to the programs, without intervention by the users of the programs, the version of any particular resource being provided to a requesting program depending upon determination by the retrieval means from a user profile, and without intervention by the users, of whether a customized version exists for a user of that requesting program, whereby a program, with the program itself distinguishing between users and without intervention by the users, will automatically behave in a customized way for a user for which an appropriate customized resource exists and will behave in a standard way for a user for which there is no appropriate customized resource and wherein each version of a resource will control the non-executable behavior of a program independently of other versions of the resource.

3. The system of claim 2 wherein resources customized for a particular user are stored in that user's user profile.

4. A general purpose data processing system for performing a plurality of functions under control of a corresponding plurality of programs and providing customization of non-executing functions of the data processing system, comprising:

(A) retrieval means for storing and retrieving resources having a data portion and a header portion, each resource having in the header portion a resource identifier having a value by which a resource to be retrieved can be identified to the means for storing and retrieving, and optionally including a resource literal, wherein the non-executing behavior of a program includes operations of the program which (a) do not affect execution of the program, (b) do not affect operations of the data processing system in performing the operations under control of the program, and the content of a resource is data which (a) is used by the program, and (b) does not affect the execution of the program, (c) is not modified by the program using the resource, and (d) does not affect the operations of the data processing system in performing operations under control of the program, (B) header generation means for using the retrieval means for storing and retrieving resources to access information in the header portion of the resources, when the resource includes a resource literal, and for producing program source code defining each resource literal to have the value of a corresponding resource identifier so that the source code for a program that includes the produced source code will refer to resources using the resource literals while an executable counterpart to the program that includes the produced source code will make resource requests using the resource identifiers, and wherein certain of the resources are customized for and associated with corresponding users of the programs and the resources associated with a user being stored in and associated with the user by means of a user profile associated with the user and wherein each version of a resource will control the non-executable behavior of a program independently of other versions of the resource.

5. The data processing system of claim 4 wherein resources are stored in resource files, and further comprising stripping means for producing a modified resource file by removing any resource literals in a pre-existing resource file.

* * * * *